United States Patent
Coulter et al.

(10) Patent No.: US 11,072,247 B2
(45) Date of Patent: Jul. 27, 2021

(54) MOBILITY DEVICE CONTROL SYSTEM

(71) Applicant: DEKA Products Limited Partnership, Manchester, NH (US)

(72) Inventors: Stewart M. Coulter, Bedford, NH (US); Brian G. Gray, Manchester, NH (US); Dirk A. van der Merwe, Canterbury, NH (US); Susan D. Dastous, Litchfield, NH (US); Daniel F. Pawlowski, Raymond, NH (US)

( * ) Notice: Subject to any disclaimer, the term of this patent is extended or adjusted under 35 U.S.C. 154(b) by 0 days.

(21) Appl. No.: 16/987,766

(22) Filed: Aug. 7, 2020

(65) Prior Publication Data
US 2020/0369163 A1 Nov. 26, 2020

Related U.S. Application Data

(63) Continuation of application No. 16/200,088, filed on Nov. 26, 2018, now Pat. No. 10,752,243, which is a
(Continued)

(51) Int. Cl.
*B60L 50/60* (2019.01)
*A61G 5/04* (2013.01)
(Continued)

(52) U.S. Cl.
CPC ............... *B60L 50/60* (2019.02); *A61G 5/04* (2013.01); *A61G 5/041* (2013.01); *B60L 15/20* (2013.01); *B60L 15/2045* (2013.01); *B60L 50/50* (2019.02); *B60W 10/08* (2013.01); *B60W 10/184* (2013.01); *B60W 10/20* (2013.01); *B60W 30/02* (2013.01); *B60W 30/09* (2013.01); *B60W 30/143* (2013.01); *B60W 50/10* (2013.01); *B62K 5/003* (2013.01); *G05B 13/048* (2013.01); *G05D 1/0077* (2013.01); *G05D 1/0238* (2013.01); *B60L 2200/34* (2013.01); *B60L 2240/423* (2013.01); *B60L 2240/461* (2013.01); *B60L 2250/24* (2013.01); *B60W 2300/38* (2013.01); *B60W 2420/42* (2013.01); *B60W 2420/52* (2013.01); *B60W 2520/16* (2013.01); *B60W 2520/18* (2013.01); *B60W 2530/10* (2013.01); *B60W 2554/00* (2020.02); *B60W 2710/083* (2013.01); *B60W 2720/106* (2013.01); *B60W 2720/24* (2013.01); *B60Y 2400/112* (2013.01); *G01P 15/02* (2013.01);
(Continued)

(58) Field of Classification Search
CPC ....................................................... B60L 50/60
See application file for complete search history.

(56) References Cited

U.S. PATENT DOCUMENTS 5,701,965 A * 12/1997 Kamen .................. B60L 50/52
180/7.1
6,003,624 A * 12/1999 Jorgensen ............. B60L 3/0069
180/6.5
(Continued)

*Primary Examiner* — Alex C Dunn
(74) *Attorney, Agent, or Firm* — Kathleen Chapman

(57) ABSTRACT

A mobility device that can accommodate speed sensitive steering, adaptive speed control, a wide weight range of users, an abrupt change in weight, traction control, active stabilization that can affect the acceleration range of the mobility device and minimize back falls, and enhanced redundancy that can affect the reliability and safety of the mobility device.

21 Claims, 42 Drawing Sheets

Related U.S. Application Data continuation of application No. 15/441,190, filed on Feb. 23, 2017, now Pat. No. 10,220,843.

(60) Provisional application No. 62/298,721, filed on Feb. 23, 2016.

(51) Int. Cl.

| | | |
|---|---|---|
| *B62K 5/003* | (2013.01) | |
| *G05B 13/04* | (2006.01) | |
| *B60L 15/20* | (2006.01) | |
| *G05D 1/00* | (2006.01) | |
| *B60L 50/50* | (2019.01) | |
| *B60W 10/08* | (2006.01) | |
| *B60W 10/184* | (2012.01) | |
| *B60W 10/20* | (2006.01) | |
| *B60W 30/02* | (2012.01) | |
| *B60W 30/09* | (2012.01) | |
| *B60W 30/14* | (2006.01) | |
| *B60W 50/10* | (2012.01) | |
| *G05D 1/02* | (2020.01) | |
| *G01P 15/02* | (2013.01) | |

(52) U.S. Cl.
CPC ...... *G05D 2201/0206* (2013.01); *Y02T 10/64* (2013.01); *Y02T 10/72* (2013.01)

(56) References Cited

U.S. PATENT DOCUMENTS

| | | | | |
|---|---|---|---|---|
| 6,062,600 A * | 5/2000 | Kamen | A61G 5/04 | 280/755 |
| 6,285,778 B1 * | 9/2001 | Nakajima | G05D 1/0248 | 180/167 |
| 6,377,906 B1 * | 4/2002 | Rowe | G01C 21/16 | 702/151 |
| 6,443,250 B1 * | 9/2002 | Kamen | A61G 5/04 | 180/7.1 |
| 6,484,829 B1 * | 11/2002 | Cox | A61G 5/061 | 180/8.1 |
| 6,538,411 B1 * | 3/2003 | Field | B60L 15/20 | 318/638 |
| 7,690,452 B2 * | 4/2010 | Kamen | B60L 15/2036 | 180/65.1 |
| 7,757,794 B2 * | 7/2010 | Heinzmann | B60L 15/2045 | 180/6.5 |
| 7,856,248 B1 * | 12/2010 | Fujisaki | H04M 1/6075 | 455/556.1 |
| 8,346,441 B2 * | 1/2013 | Miki | B62K 11/007 | 701/49 |
| 8,744,720 B1 * | 6/2014 | Fujisaki | B60W 30/16 | 701/96 |
| 2002/0121394 A1 * | 9/2002 | Kamen | A61G 5/061 | 180/41 |
| 2004/0007121 A1 * | 1/2004 | Graves | G01C 21/20 | 89/1.11 |
| 2005/0236894 A1 * | 10/2005 | Lu | B60W 10/20 | 303/139 |
| 2006/0259224 A1 * | 11/2006 | Auer | B62D 5/008 | 701/72 |
| 2006/0293850 A1 * | 12/2006 | Ahn | H04W 4/029 | 701/469 |
| 2007/0213900 A1 * | 9/2007 | Raab | B60W 10/18 | 701/38 |
| 2011/0123286 A1 * | 5/2011 | Van Roosmalen | A61G 3/006 | 410/7 |
| 2013/0188809 A1 * | 7/2013 | Jones | H04B 1/00 | 381/119 |
| 2014/0018994 A1 * | 1/2014 | Panzarella | A61G 5/043 | 701/25 |
| 2014/0187237 A1 * | 7/2014 | Li | H04W 16/14 | 455/424 |
| 2014/0277888 A1 * | 9/2014 | Dastoor | B60L 3/12 | 701/22 |
| 2014/0371979 A1 * | 12/2014 | Drew | G07C 5/008 | 701/32.3 |
| 2015/0060162 A1 * | 3/2015 | Goffer | A61G 5/104 | 180/41 |
| 2015/0119289 A1 * | 4/2015 | Chen | G16B 35/00 | 506/24 |
| 2015/0197247 A1 * | 7/2015 | Ichinokawa | B60W 30/143 | 701/93 |
| 2015/0198440 A1 * | 7/2015 | Pearlman | G01S 17/86 | 356/4.01 |
| 2016/0170411 A1 * | 6/2016 | Wei | G05D 1/0214 | 701/25 |
| 2016/0264019 A1 * | 9/2016 | Drako | B60K 17/043 | |
| 2017/0176188 A1 * | 6/2017 | Georgy | H04W 72/042 | |

* cited by examiner

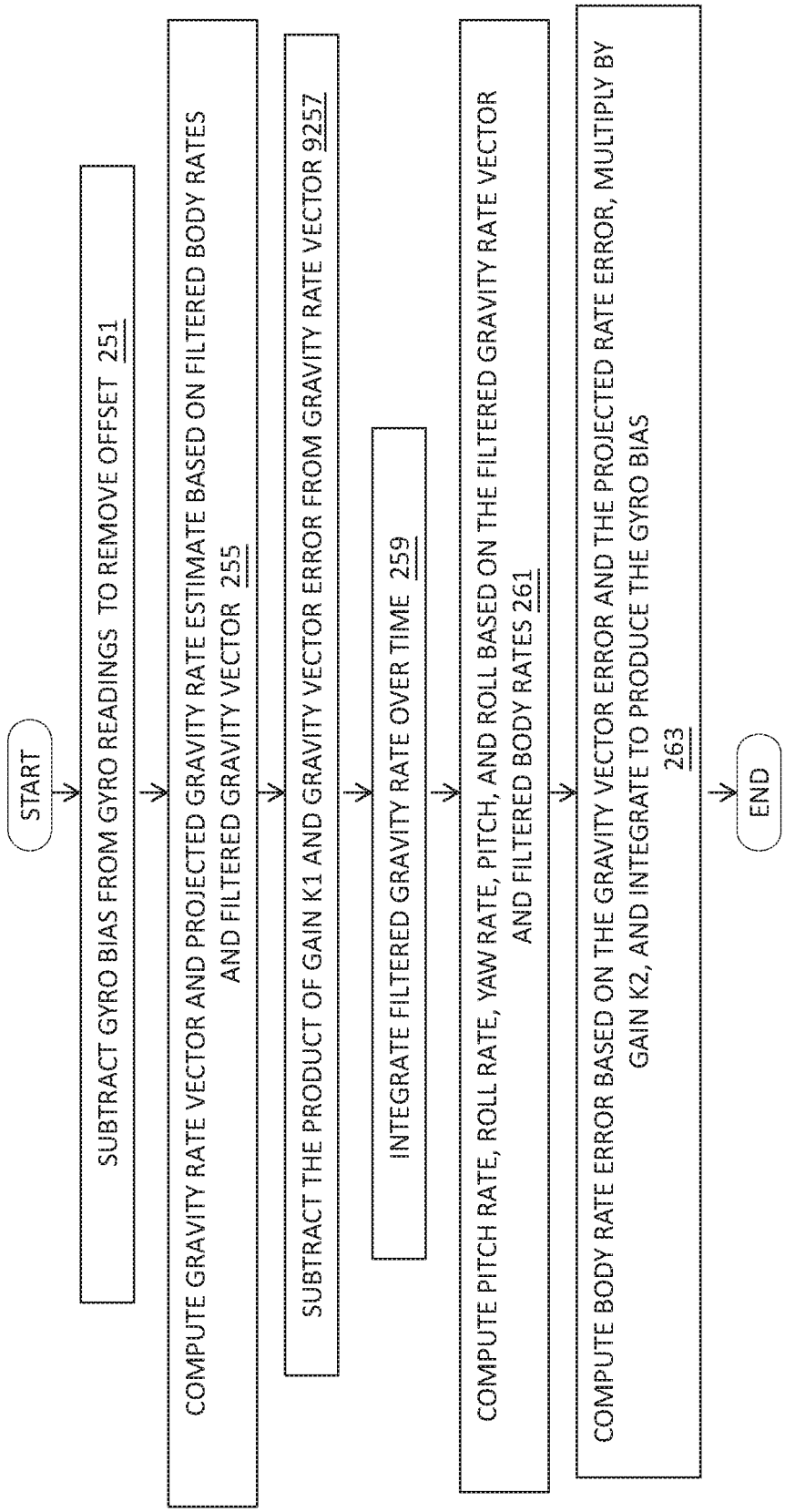

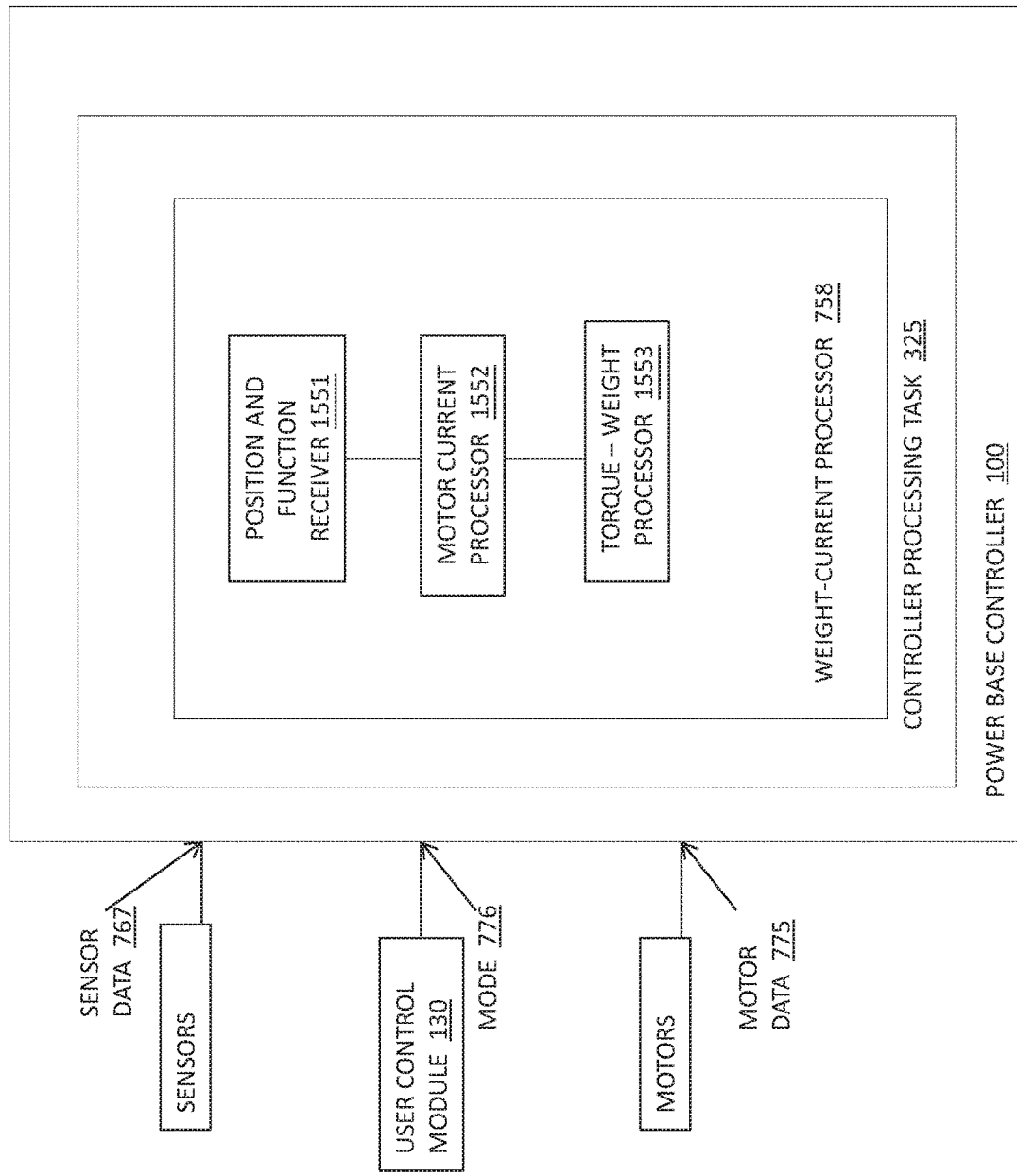

MOBILITY DEVICE CONTROL SYSTEM

CROSS REFERENCE TO RELATED APPLICATIONS

This application is a continuation of U.S. patent application Ser. No. 16/200,088 filed Nov. 26, 2018, entitled MOBILITY DEVICE CONTROL SYSTEM, which is a continuation of U.S. patent application Ser. No. 15/441,190 filed Feb. 23, 2017, entitled MOBILITY DEVICE CONTROL SYSTEM, which claims the benefit of U.S. Provisional Application Ser. No. 62/298,721 filed Feb. 23, 2016, entitled MOBILITY DEVICE CONTROL SYSTEM, all of which are incorporated herein by reference in their entirety.

BACKGROUND

The present teachings relate generally to mobility devices, and more specifically to control systems for vehicles that have heightened requirements for safety and reliability.

A wide range of devices and methods are known for transporting human subjects experiencing physical incapacitation. The design of these devices has generally required certain compromises to accommodate the physical limitations of the users. When stability is deemed essential, relative ease of locomotion can be compromised. When transporting a physically disabled or other person up and down stairs is deemed essential, convenient locomotion along regions that do not include stairs can be compromised. Devices that achieve features that could be useful to a disabled user can be complex, heavy, and difficult for ordinary locomotion.

Some systems provide for travel in upright positions, while others provide for ascending or descending stairs. Some systems can provide fault detection and of operation after a fault has been detected, while others provide for transporting a user over irregular terrain.

The control system for an actively stable personal vehicle or mobility device can maintain the stability of the mobility device by continuously sensing the orientation of the mobility device, determining the corrective action to maintain stability, and commanding the wheel motors to make the corrective action. Currently, if the mobility device loses the ability to maintain stability, such as through the failure of a component, the user may experience, among other things, discomfort at the sudden loss of balance. Further, the user may desire enhanced safety features and further control over the reaction of the mobility device to unstable situations.

What is needed is a reliable, lightweight, and stable mobility device that includes an automatic response capability to situations that are commonly encountered by a disabled user such as, for example, but not limited to positional obstacles, slippery surfaces, tipping conditions, and component failure.

SUMMARY

The mobility device of the present teachings can include enhanced safety features such as, for example, automatic responses to certain situations and environmental obstacles, and allowing user control of the mobility device's automatic response. Also, the mobility device of the present teachings can recognize if the user has fallen off of the mobility device and can take appropriate action to reduce the likelihood of unsafe conditions. On slippery surfaces, the mobility device of the present teachings can adjust the torque to the wheels to provide enhanced traction and improved safety. To minimize the likelihood that the mobility device will tip backwards, the mobility device can apply a correction to the wheel command to improve safety under tipping conditions.

The reliability of the mobility device of the present teachings can be improved by the use of redundant sensors, such as, for example, inertial measurement unit (IMU) sensors and motors. Choosing data from the redundant sensors and motors, and eliminating data that could potentially provide incorrect information to the mobility device, can improve the safety and reliability of the mobility device.

The mobility device of the present teachings can include, but is not limited to including, a power base, at least one power source controller, ground-contacting elements, a user control module, and a means for user support. The ground-contacting elements can be wheels arranged in clusters. The means for user support can include, for example, but not limited to, a seat. The mobility device can operate in several modes including, but not limited to, standard mode in which the mobility device can operate on one set of wheels and casters, and enhanced mode in which the mobility device can operate on two sets of wheels. The power base can include, but is not limited to including, at least one processor controlling the mobility device, at least one power source controller controlling power to the at least one processor and the at least one user control module, at least one user control module receiving commands, the commands suggesting motion of the mobility device, and at least one communications means communicatively coupling the at least one processor with the at least one power source controller and the at least one user control module. The at least one processor can include, but is not limited to including, at least one inertial sensor pack, at least one cluster motor drive, at least one wheel motor drive, at least one brake, and at least one position sensor.

In some configurations, the mobility device of the present teachings can maintain stability and reliability through redundant inertial sensors including low cost accelerometers and gyroscopes. The mobility device of the present teachings can include a filter to fuse gyro and accelerometer data to produce an accurate estimate of a gravity vector, and the gravity vector can be used to define the orientation and inertial rotation rates of the mobility device. The orientation and inertial rotation rates of the mobility device can be shared and combined across redundant processors of the present teachings.

The method of the present teachings for processing data using the filter, referred to herein as the inertial measurement unit (IMU) filter, can include, but is not limited to including, computing a gyro correction filter and filtering body rates by the gyro correction filter. The gyro correction filter can be computed by subtracting a differential wheel speed between the mobility device wheels from a projected gravity rate estimate to produce a projected rate error. Further, the cross product of a gravity vector error and a filtered gravity vector can be computed and added to the dot product of the filtered gravity vector and a projected gravity rate estimate error to produce a body rate error. The gyro correction filter can result from applying a gain to the integration over time of a body rate error. The method can further include computing the gravity rate vector and the projected gravity rate estimate based at least on the filtered body rates and the gravity vector. The method can still further include filtering the gravity rate vector by the combination of a gain and the gravity vector error, and can include integrating the filtered gravity rate over time. The gravity vector error can be based at least on the filtered gravity vector and a measured gravity vector. The method can further include computing a pitch rate, a roll rate, and a yaw rate as the cross product of the filtered gravity rate vector and the filtered body rate. The method can further include computing a pitch and a roll as the dot product of the filtered gravity rate vector and the filtered body rate.

In some configurations, the mobility device of the present teachings can include enhanced redundancy that can affect the reliability and safety of the mobility device. The method of the present teachings, referred to herein as "voting", for resolving which value to use from redundant of the at least one processor of the present teachings can include, but is not limited to including, initializing a counter, averaging values, for example, but not limited to, sensor or command values, from each processor (referred to herein as processor values), computing the absolute value difference between each processor value and the average, and discarding the highest difference. The method can further include computing differences between the remaining processor values and each other. If there are any differences greater than a preselected threshold, the method can include comparing the values that have the highest difference between them to the remaining value, voting out the value with the highest difference from the remaining value, comparing the voted out values to the remaining values, and voting out any difference above the pre-selected threshold and selecting one of the remaining processor values or an average of the processor values. If there are no differences greater than the pre-selected threshold, the method can compare the voted out value to the remaining values. If there are any differences greater than the pre-selected threshold, the method can include voting out the value voted out in the compare step, and selecting one of the remaining processor values or an average of the remaining processor values. If there are no differences greater than the pre-selected threshold, the method can include selecting one of the remaining processor values or an average of the remaining processor values. If a processor value is voted out a pre-selected number of times, the method can include raising an alarm. If the voting scheme fails to find a processor value that satisfies the selection criteria, the method can include incrementing the counter. If the counter has not exceeded a pre-selected number, the method can include discarding the frame having no remaining processor values and selecting a previous frame having at least one processor value that meets the selection criteria. If the frame counter is greater than the pre-selected number, the method can include moving the mobility device to a failsafe mode.

In some configurations, the mobility device of the present teachings can accommodate users of varying levels of physical ability and device acumen. In particular, users can adjust the response of the mobility device to joystick commands. In some configurations, the mobility device of the present teachings can allow user configurable drive options in the form of joystick command shaping that can allow individual users to configure the mobility device, including the user control module of the present teachings, for driving preferences. The mobility device of the present teachings can accommodate speed sensitive steering that can adjust the turn behavior of the mobility device as a function of the speed of the mobility device, making the mobility device responsive at high speeds and less jerky at low speeds.

The method of the present teachings for accommodating a continuously adjustable scale factor can include, but is not limited to including, receiving joystick commands, accessing profile constants and a merge value, and scaling the profile constants based at least on the merge value. The method can further include computing a maximum velocity based at least on the profile constants and a maximum joystick command, acceleration, and deadband, and computing a proportional gain based at least on profile constants and the maximum velocity. The method can still further include computing at least one wheel command based at least on the profile constants and the joystick commands, and providing the at least one wheel command to the wheel motor drives.

In some configurations, the mobility device of the present teachings can still further accommodate adaptive speed control to assist users in avoiding potentially dangerous conditions while driving. Adaptive speed control can reduce required driver concentration by using sensors to detect obstacles, and can help users negotiate difficult terrain or situations. The method of the present teachings for adaptive speed control of the mobility device can include, but is not limited to including, receiving, into the power base controller of the present teachings, terrain and obstacle detection data, and mapping terrain and obstacles, if any, in real time based at least on the terrain and obstacle detection data. The method can optionally include computing virtual valleys, if any, based at least on the mapped data. The method can still further include computing collision possible areas, if any, based at least on the mapped data, and computing slow-down areas if any based at least on the mapped data and the speed of the mobility device. The method can also include receiving user preferences, if any, with respect to the slow-down areas and desired direction and speed of motion. The method can still further include computing at least one wheel command based at least on the collision possible areas, the slow-down areas, and the user preferences and optionally the virtual valleys, and providing the at least one wheel command to the wheel motor drives.

In some configurations, the power base controller of the present teachings can include weight sensitive controllers that can accommodate the needs of users having different weights. Further, the weight sensitive controllers can detect an abrupt change in weight, for example, but not limited to, when the user exits the mobility device. The weight and center of gravity location of the user can be significant contributors to the system dynamics. By sensing the user weight and adjusting the controllers, improved active response and stability of the mobility device can be achieved.

The method of the present teachings for stabilizing the mobility device can include, but is not limited to including, estimating the weight and/or change in weight of a load on the mobility device, choosing a default value or values for the center of gravity of the mobility device and load combination, computing controller gains based at least on the weight and/or change in weight and the center of gravity values, and applying the controller gains to control the mobility device. The method of the present teachings for computing the weight of a load on the mobility device can include, but is not limited to including, receiving the position of the load on the mobility device, receiving the setting of the mobility device to standard mode, measuring the motor current required to move the mobility device to enhanced mode at least once, computing a torque based at least on the motor current, computing a weight of the load based at least on the torque, and adjusting controller gains based at least on the computed weight to stabilize the mobility device.

In some configurations, the power base controller of the present teachings can include traction control that can adjust the torque applied to the wheels to affect directional and acceleration control. In some configurations, traction control can be assisted by rotating the cluster so that four wheels contact the ground when braking above a certain threshold is requested.

The method of the present teachings for controlling traction of the mobility device can include, but is not limited to including, computing the linear acceleration of the mobility device, and receiving the IMU measured acceleration of the mobility device. If the difference between an expected linear acceleration and a measured linear acceleration of the mobility device is greater than or equal to a preselected threshold, adjusting the torque to the cluster/wheel motor drives. If the difference between an expected linear acceleration and a measured linear acceleration of the mobility device is less than a preselected threshold, the method can continue testing for loss of traction.

In some configurations, the power base controller of the present teachings can also include active stabilization that can minimize back falls. Active stabilization can also allow transition into enhanced mode while driving.

The method of the present teachings for controlling pitch rate can include, but is not limited to including, estimating the center of gravity based at least on the mode, estimating the pitch angle required to maintain balance based at least on the center of gravity estimate, and collecting calibration data at discrete points. The method can also include verifying the estimated pitch angle based at least on the collected calibration data, and controlling the pitch rate for pitch angles that are close to a tipping angle limit.

The mobility device control system of the present teachings can include, but is not limited to including, at least one user control device that can receive desired actions for the mobility device and at least one power base controller operably coupled with the at least one user control device. The at least one power base controller can receive the desired actions from the at least one user control device. The at least one power base controller can include at least two processors, and the at least two processor can each include at least one controller processing task. The at least one controller processing task can receive sensor data and motor data associated with sensors and motors that can be operably coupled with the mobility device. The mobility device control system can include at least one inertial measurement unit (IMU) that can be operably coupled with the at least one power base controller. The at least one inertial measurement unit can produce an inertial estimate based on low frequency data from the IMU accelerometer and high frequency data from the IMU rate sensor. The inertial estimate can be used to compute a pitch and a roll of the mobility device. The mobility device control system can include at least one power source controller that can be operably coupled with the at least one power base controller. The at least one power source controller can control power to the at least one power base controller, the IMU, and the at least one user control device. The at least one power source controller can be operably coupled with at least one battery, and the at least one battery can supply power to the at least one power source controller. The at least two processors can compute at least one value to control the mobility device based at least on the pitch and roll of the mobility device, where the pitch and roll are based on the inertial estimate.

The controller processing task can optionally include at least one voting/commit processor that can resolve which of the at least one value to use to compute a wheel command, and can include at least one adaptive speed control processor that can compute at least one wheel command based at least on sensor data. The at least one wheel command can be automatically modified depending on obstacles in the path of the mobility device. The controller processing task can optionally include at least one speed processor that can compute at least one wheel command based at least on parameters that can be adjusted according to at least one user preference, and at least one traction control processor that can automatically adjust the at least one wheel command based at least on a comparison between inertial and linear accelerations of the mobility device. The controller processing task can optionally include at least one weight processor that can automatically estimate the load on the mobile device. The weight processor can determine the center of gravity for the mobile device and the load, can compute gains based at least on the load and the center of gravity, and can compute the at least one wheel command based at least on the gains. The controller processing task can optionally include an active stabilization processor that can automatically compute at least one wheel command to decelerate forward motion and accelerate backward motion when the mobility device encounters an obstacle. The active stabilization processor can control a rearwards pitch rate of the mobility device. The controller processing can optionally include a center of gravity fit that can generating calibration coefficients to establish the center of gravity of the mobility device based on a pitch angle of the mobility device required to maintain balance. The pitch angle is measured when the mobility device is in pre-selected positions.

The mobility device of the present teachings can include at least one user control device and at least one a power base controller having at least two processors. The at least two processors can each having at least one controller processing task. The mobility device can have at least one sensor, at least one motor, and at least one IMU. The IMU can include an IMU accelerometer and an IMU rate sensor. The method of the present teachings for controlling the mobility device can include, but is not limited to including, receiving desired actions for the mobility device, and receiving, by the at least one controller processing task, sensor data from the at least one sensor, and motor data from the at least one motor. The method can include determining, by the at least one IMU, an inertial estimate based at least on a combination of low frequency data from the IMU accelerometer and high frequency data from the IMU rate sensor. The inertial estimate is used to compute a pitch and a roll of the mobility device. The method can include computing, by each of the at least one controller processing tasks, at least one value to control the mobility device. The at least one value can be based at least on the desired actions, the sensor data, the motor data, the pitch, and the roll.

The at least one value can optionally include at least one wheel command. The method can optionally include resolving which of the at least one value, from the at least one controller processing task, to use to control the mobility device, automatically modifying the at least one value depending on obstacles in the path of the mobility device, and computing the at least one value based at least on parameters adjusted according to at least one user preference. The method can optionally include automatically adjusting the at least one value based at least on a comparison between inertial and linear accelerations of the mobility device. The method can optionally include automatically estimating the weight of a load on the mobile device, determining the center of gravity for the mobile device and the load, computing gains based at least on the load and the center of gravity, and computing the at least value based at least on the gains. The method can optionally include automatically computing at least one value to decelerate forward motion of the mobility device and accelerate backward motion of the mobility device when the mobility device encounters an obstacle, and controlling a rearwards pitch rate of the mobility device. The method can optionally include (1) positioning a load on the mobility device and (2) moving the mobility device/load into a balance mode. The balance mode can be characterized by elevating the mobility device/load above a standard seated position. The method can optionally include (3) measuring data including a pitch angle required to maintain the balance mode at a pre-selected position of at least one wheel cluster operably coupled with the mobility device and a pre-selected position of a seat operably coupled with the mobility device. The method can optionally include (4) moving the mobility device/load to a plurality of pre-selected points, (5) repeating step (3) at each of the plurality of pre-selected points, (6) verifying that the measured data fall within pre-selected limits, (7) generating a set of calibration coefficients to establish the center of gravity at a plurality of positions encountered during operation of the mobility device, the calibration coefficients based on the verified measured data, and (8) storing the verified measured data in non-volatile memory.

The method of the present teachings for establishing the center of gravity for a mobility device/user pair over the range of usable cluster and seat positions, where the mobility device can include a mode including a balance of the mobility device/user pair, where the mobility device can include at least one wheel cluster and a seat, the method can include, but is not limited to including, (1) moving the mobility device/user pair into a balance mode, the balance mode characterized by elevating the mobility device/load above a standard seated position, (2) measuring data including a pitch angle required to maintain the balance at a pre-selected position of the at least one wheel cluster and a pre-selected position of the seat, (3) moving the mobility device/user pair to a plurality of pre-selected points, (4) repeating step (2) at each of the plurality of pre-selected points, (5) verifying that the measured data fall within pre-selected limits, and (6) generating a set of calibration coefficients to establish the center of gravity at any usable cluster and seat position during machine operation based on the verified measured data. The method can optionally include storing the verified measured data in non-volatile memory.

BRIEF DESCRIPTION OF THE DRAWINGS

The present teachings will be more readily understood by reference to the following description, taken with the accompanying drawings, in which:

FIG. 5 is a flowchart of the method of the present teachings for filtering gyro and acceleration data;

FIG. 12A is a schematic block diagram of the weight-current diagram of the present teachings;

DETAILED DESCRIPTION

Figure 1A:
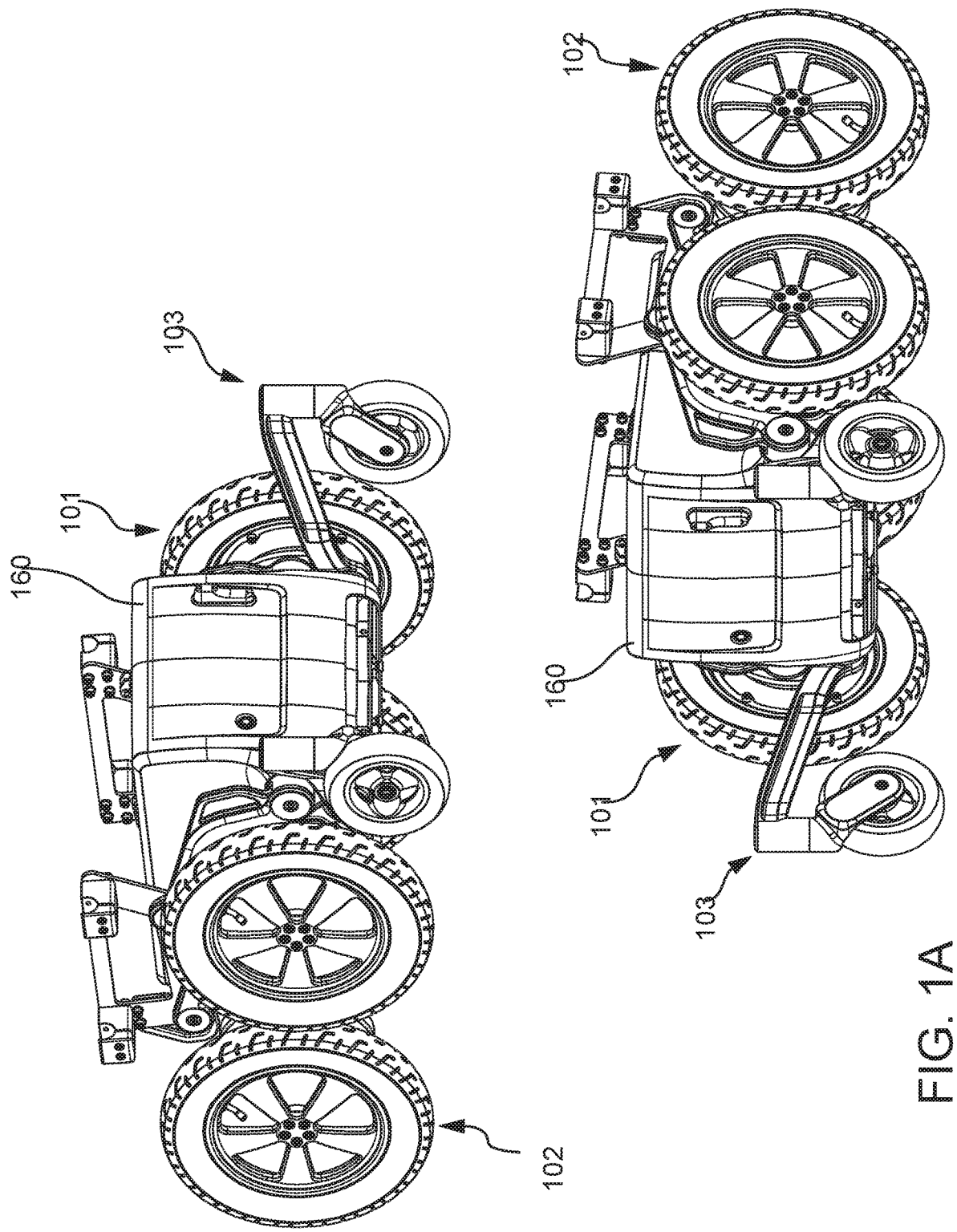
FIG. 1A is a pictorial representation of an exemplary automated wheelchair including the system of the present teachings.

Referring now primarily to FIG. 1A, mobility device 120 can include, but is not limited to including, power base 160, wheels 101/102, casters 103, and seat 105. Power base 160 can control wheels 101/102 through wheel commands 769 (FIG. 3E) and seat 105 through seat commands 773 (FIG. 3E) according to user commands and automated enforcement of requirements for safety and reliability. Mobility device 120 can operate in functional modes such as, for example, but not limited to, standard mode 201 (FIG. 3B) in which mobility device 120 can operate on drive wheels 101 and caster wheels 103, and enhanced mode 217 (FIG. 3B) in which mobility device 120 can operate on drive wheels 101 and drive wheels 102, can be actively stabilized through onboard sensors, and can operate having elevated chassis 104, casters 103, and seat 105. Mobility device 120 can also operate in balance mode 219 (FIG. 3B) in which mobility device 120 can operate on drive wheels 102, can have an elevated height of seat 105, and can be actively stabilized through onboard sensors. Mobility device 120 can further operate in stair mode 215 (FIG. 3B) in which mobility device 120 can use wheel clusters 121 (FIG. 1B) to climb stairs and can be actively stabilized. Mobility device 120 can still further operate in remote mode 205 (FIG. 3B) in which mobility device 120 can operate on drive wheels 101 and 102 and can be unoccupied, and can optionally operate in docking mode 203 (FIG. 3B) in which mobility device 120 can operate on drive wheels 101 and drive wheels 102 and caster wheels 103, therefore lowering chassis 104.

Figure 1B:
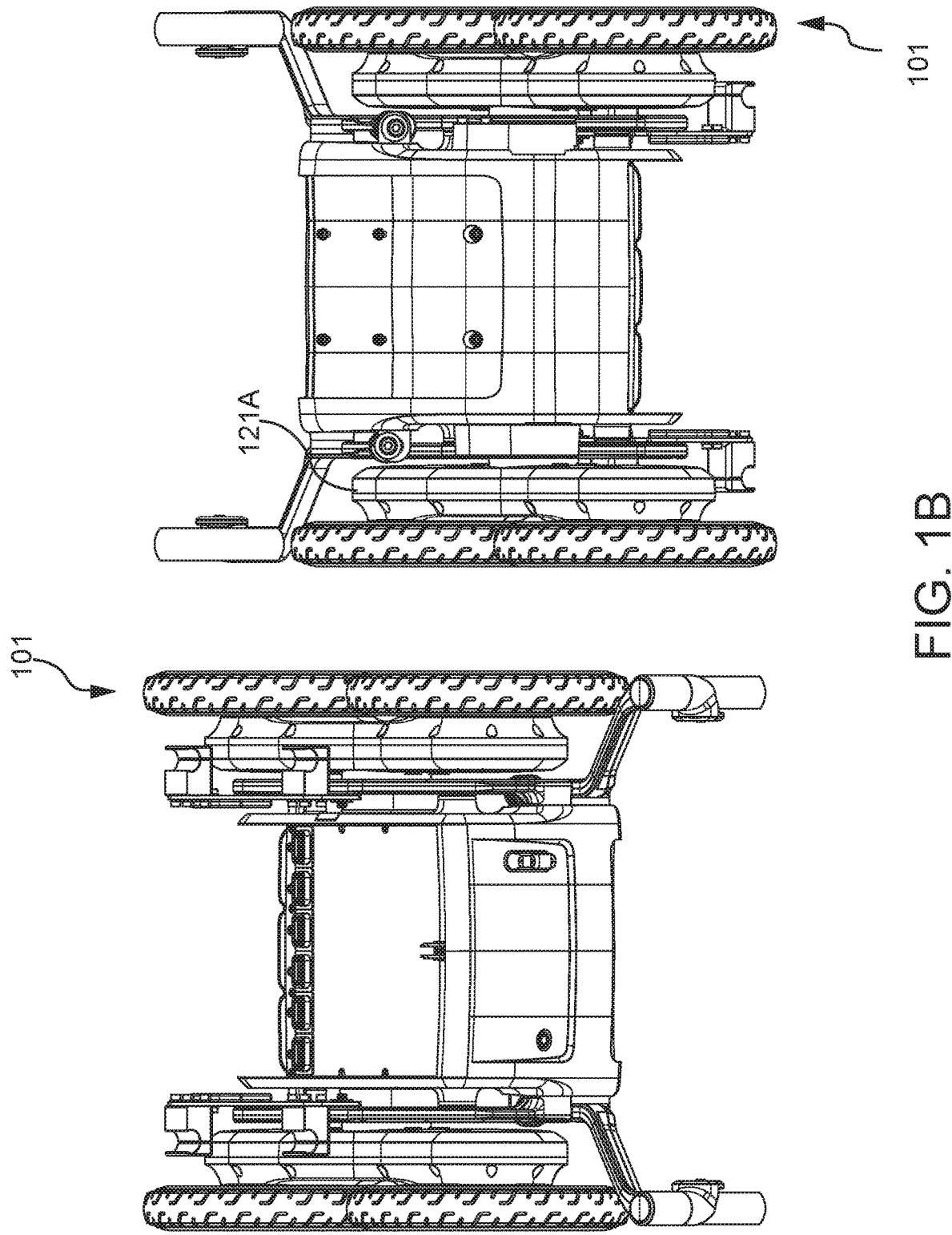
FIG. 1B is a pictorial representation of an exemplary wheel cluster of the present teachings.
Figure 1C:
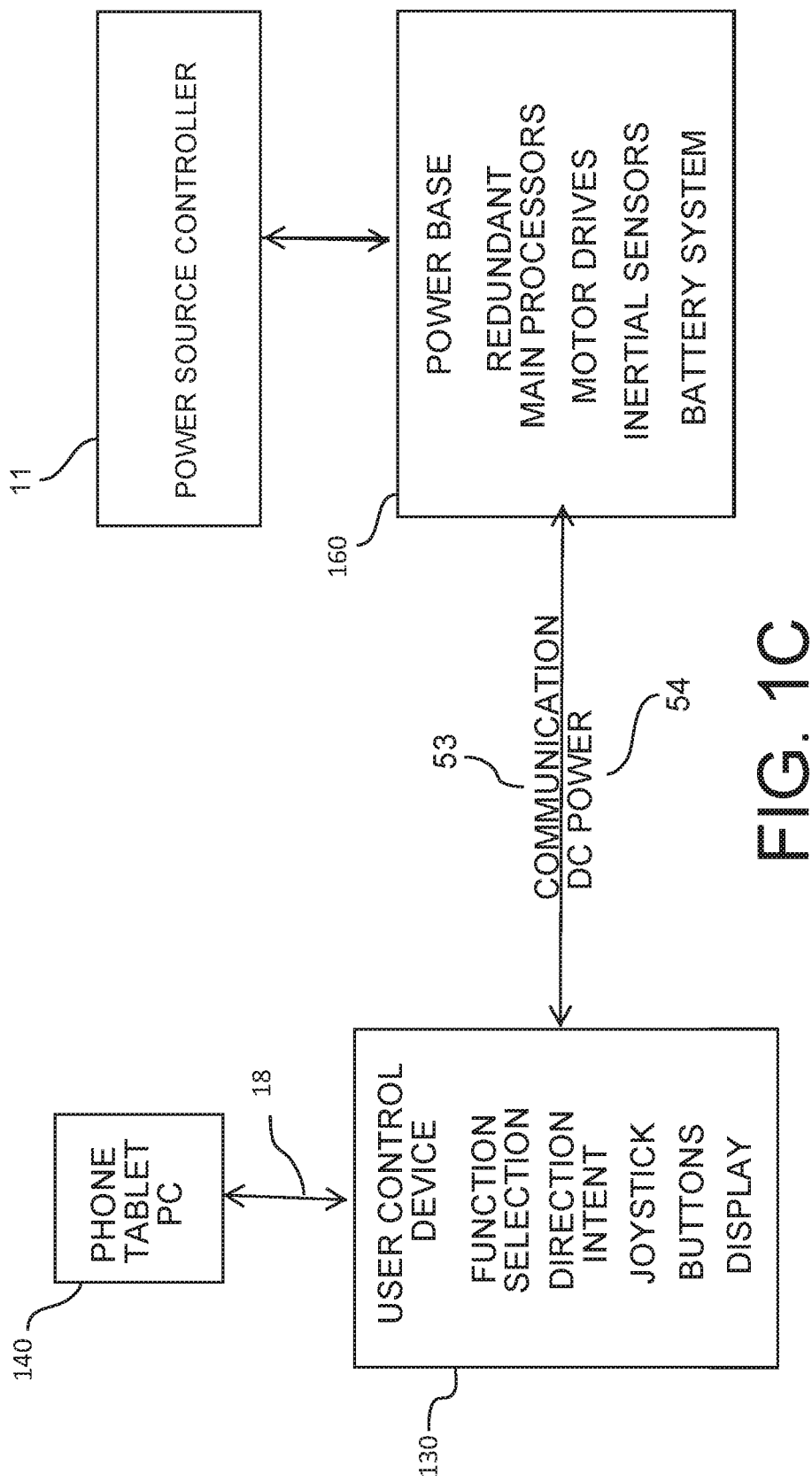
FIG. 1C is a schematic block diagram of an overview of the system of the present teachings.

Referring now to FIG. 1C, mobility device 120 (FIG. 1A) can include, but is not limited to including, power base 160, user control device 130, communications bus 53, remote control device 140, and power 54. Power base 160 can communicate with user control device 130 using communications bus 53 using a protocol such as, for example, but not limited to, the CANbus protocol. User control device 130 can communicate with remote control device 140 through, for example, but not limited to, a wireless technology such as, for example, Bluetooth technology 18 (FIG. 1C). In some configurations, power base 160 can include redundant elements. In some configurations, communications bus 53 and power 54 can operate inside power base 160 can be redundant therein. In some configurations, mobility device 120 (FIG. 1A) can include a separate communications bus 53 that can provide communications from power base 160 to components external to power base 160.

Figure 2A:
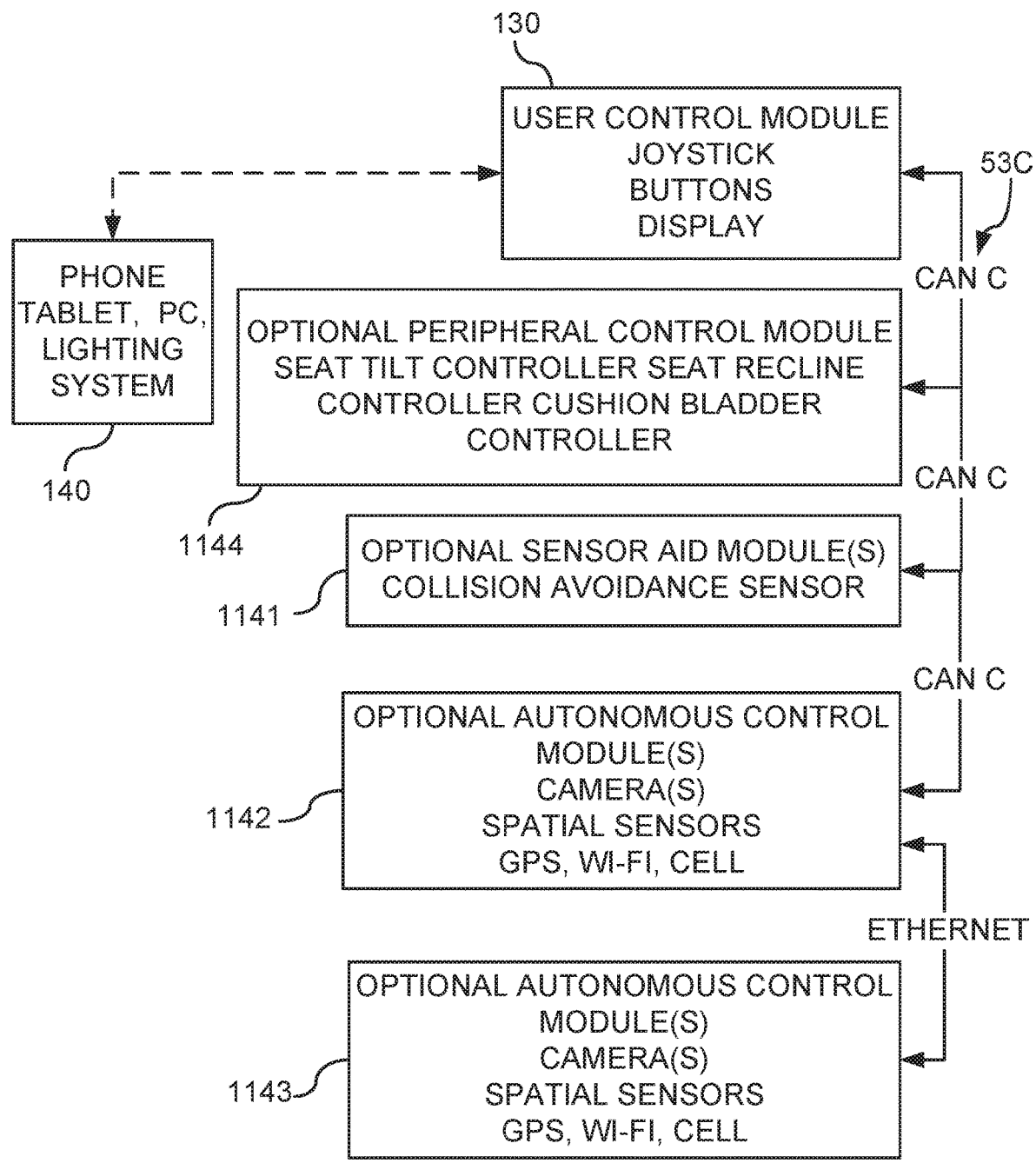
FIGS. 2A-2D are schematic block diagrams of details of the system of the present teachings.
Figure 2B:
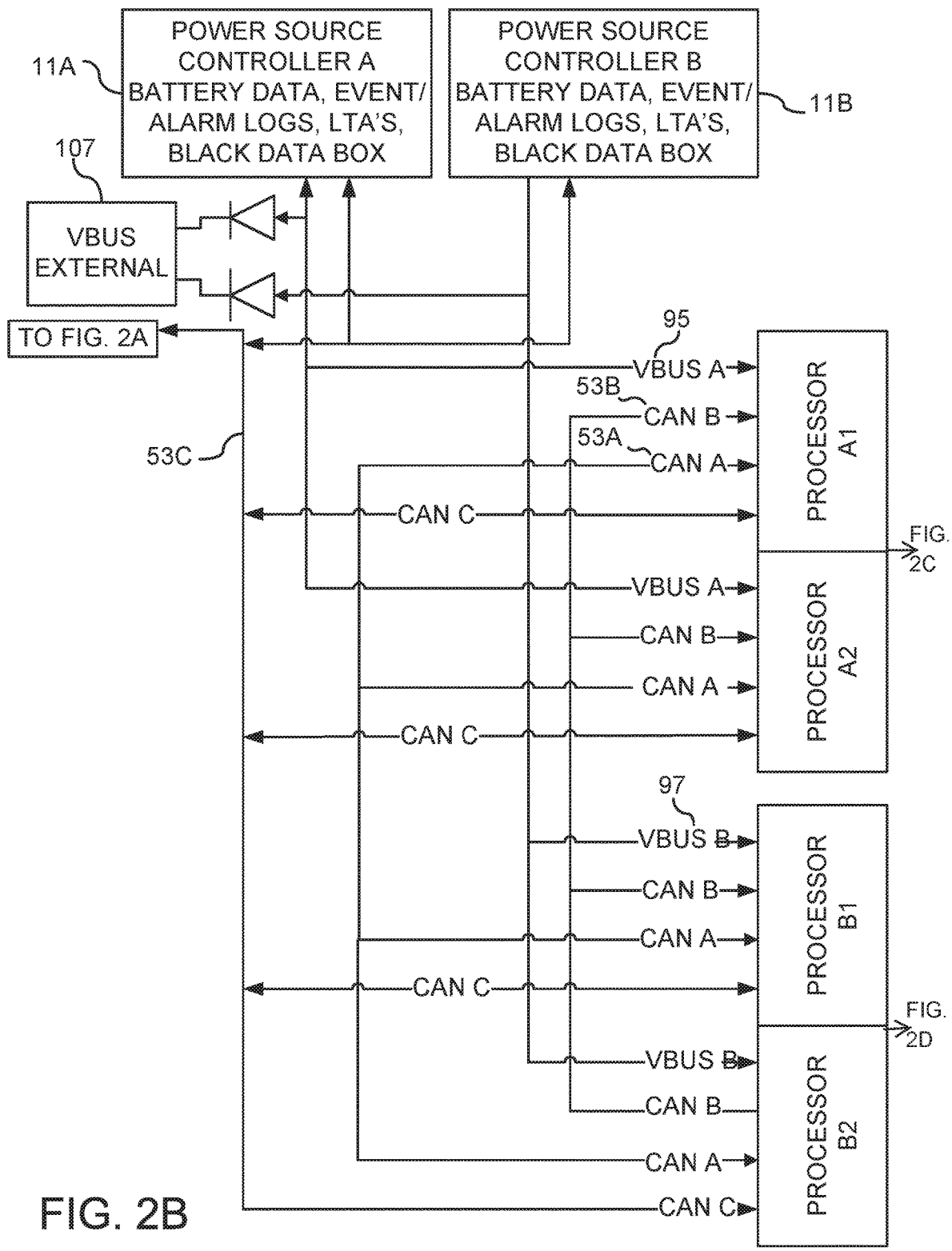

Referring now primarily to FIGS. 2A-2D, power base 160 (FIG. 1C) can include, but is not limited to including, at least one processor 43A-43D (FIGS. 2C/2D), at least one motor drive 1050, 19, 21, 25, 27, 31, 33, 37 (FIGS. 2C/2D), at least one inertial system 1070, 23, 29, 35 (FIGS. 2C/2D), and at least one power source controller 11A/B (FIG. 2B). Power base 160 (FIG. 1C) can be communicatively coupled with, for example, but not limited to, user control module 130 (FIG. 2A) through, for example, but not limited to, electronic communications means 53C and a protocol such as, for example, a CANbus protocol. User control module 130 (FIG. 2A) can be optionally communicatively coupled with electronic devices such as, for example, but not limited to, computers such as tablets and personal computers, telephones, and lighting systems. User control module 130 (FIG. 2A) can include, but is not limited to including, at least one joystick, at least one push button, and at least one display. User control module 130 can optionally be communicatively coupled with peripheral control module 1144, sensor aid modules 1141, and autonomous control modules 1142/1143. Communications can be enabled by, for example, but not limited to, a CANbus protocol and an Ethernet protocol.

Figure 2C:
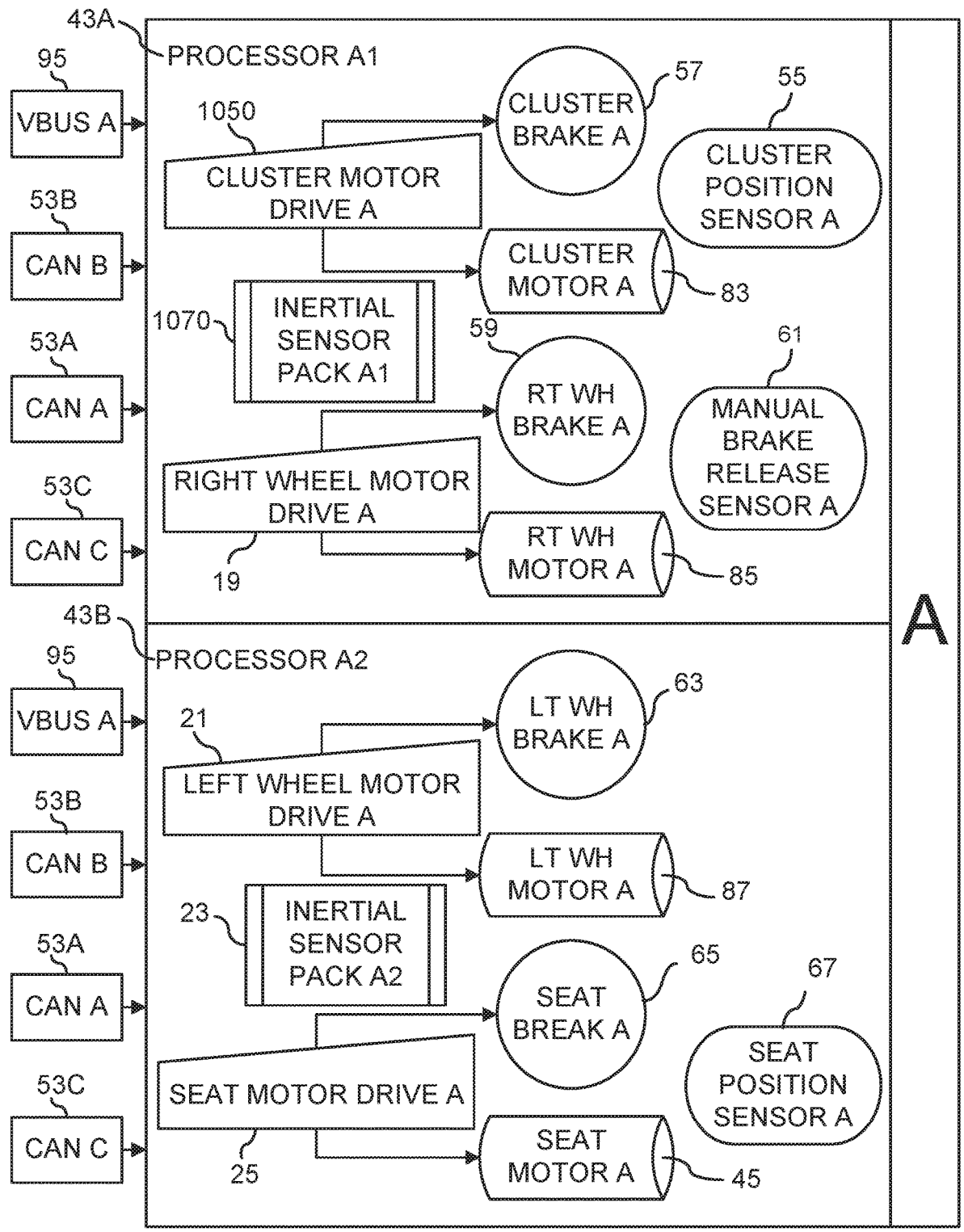
Figure 2D:
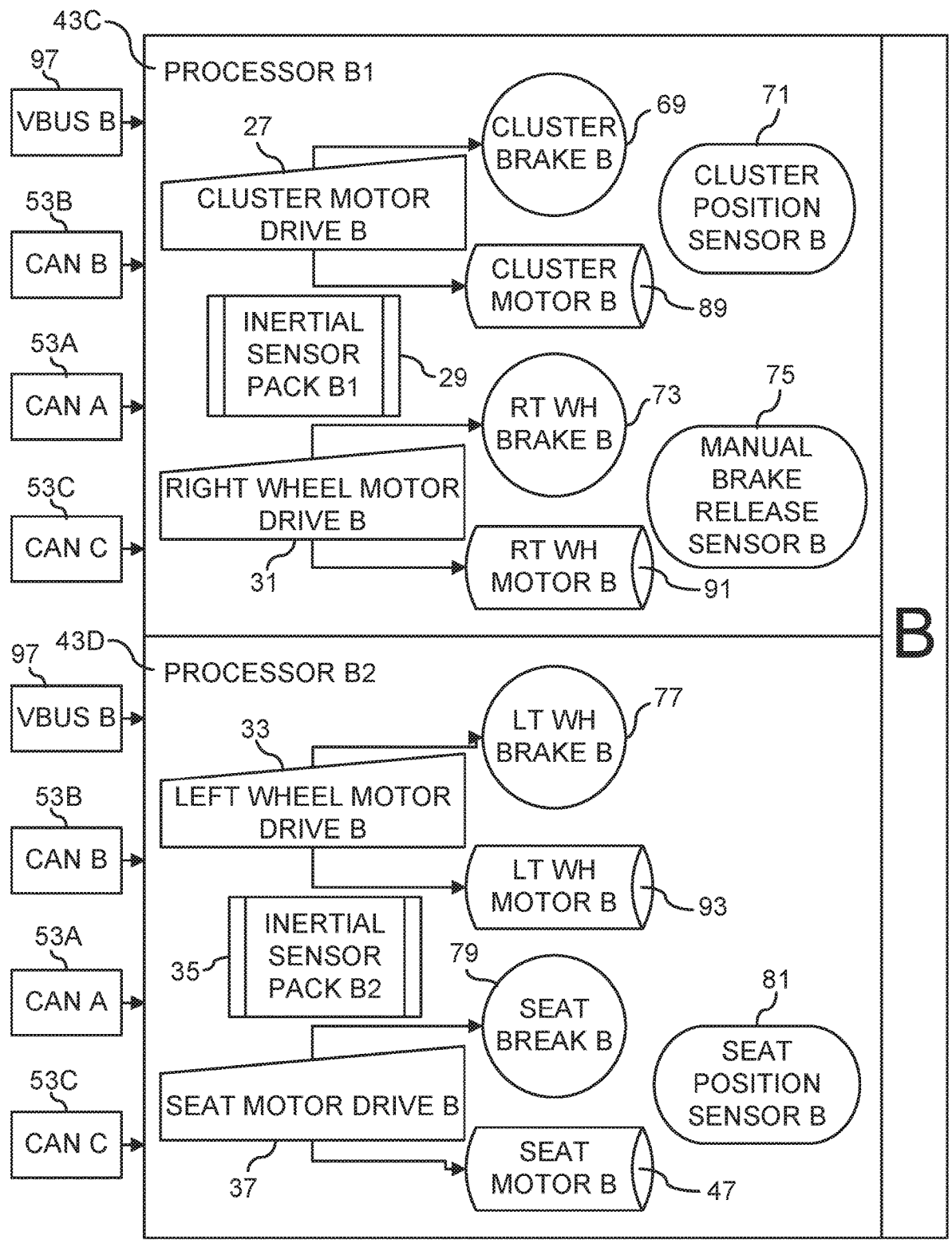

Continuing to refer primarily to FIGS. 2A-2D, in some configurations, each at least one processor 43A-43D (FIG. 2C/D) can include, but is not limited to including, at least one cluster motor drive 1050, 27 (FIG. 2C/D), at least one right wheel motor drive 19, 31 (FIG. 2C), at least one left wheel motor drive 21, 33 (FIG. 2C/D), at least one seat motor drive 25, 37 (FIG. 2C/D), and at least one inertial sensor pack 1070, 23, 29, 35 (FIG. 2C/D). Power base 160 can further include at least one cluster brake 57, 69 (FIG. 2C/D), at least one cluster motor 83, 89 (FIG. 2C/D), at least one right wheel brake 59, 73 (FIG. 2C/D), at least one left wheel brake 63, 77 (FIG. 2C/D), at least one right wheel motor 85, 91 (FIG. 2C/D), at least on left wheel motor 87, 93 (FIG. 2C/D), at least one seat motor 45, 47 (FIG. 2C/D), at least one seat brake 65, 79 (FIG. 2C/D), at least one cluster position sensor 55, 71 (FIG. 2C/D), and at least one manual brake release 61, 75 (FIG. 2C/D). Power base 160 (FIG. 2C) can be used to drive cluster 121 (FIG. 1B) of wheels forming a ground-contacting module. The ground-contacting module can be mounted on cluster 121 (FIG. 1B), and each wheel of the ground-contacting module can be driven by a wheel motor drive such as, for example, right wheel motor drive A 19 (FIG. 2C), or redundant right wheel motor drive B 31 (FIG. 2D). Cluster 121 (FIG. 1B) can rotate about a cluster axis, the rotation being governed by, for example, cluster motor drive A 1050 (FIG. 2C), or redundant cluster motor drive B 27 (FIG. 2D). At least one of the sensors such as, for example, but not limited to, at least one cluster position sensor 55/71 (FIG. 2C/D), at least one manual brake release sensor 61/75 (FIG. 2C/D), at least one motor current sensor (not shown), and at least one inertial sensor pack 17, 23, 29, 35 (FIG. 2C/D) can sense the state of mobility device 120 (FIG. 1A). Processors 43A-43D (FIG. 2C/D) can be electronically coupled to user control module 130 (FIG. 2A) for receiving user input, as well as to other controllers for controlling peripheral and extraordinary functions of the vehicle. Communications 53A-53C (FIG. 2B) among user control module 130 (FIG. 2A), power source controllers 11A/11B (FIG. 2B), and each of processors 43A-43D (FIG. 2C/D) can be according to any protocol including, but not limited to, a CANbus protocol. At least one Vbus 95, 97 (FIG. 2B) can connect at least power source controller 11A/B (FIG. 2B) to power base 160 (FIG. 2C) and components external to power base 160 (FIG. 2C) through external Vbus 107 (FIG. 2B). In some configurations, processor A1 43A (FIG. 2C) can be the master of CANbus A 53A (FIG. 2B). Slaves on CANbus A 53A (FIG. 2B) can be processor A2 43B (FIG. 2C), processor B1 43C (FIG. 2D), and processor B2 43D (FIG. 2D). In some configurations, processor B1 43C (FIG. 2D) can be the master of CANbus B 53B (FIG. 2B). Slaves on CANbus B 53B (FIG. 2B) can be processor B2 43C (FIG. 2D), processor A1 43A (FIG. 2C), and processor A2 43B (FIG. 2C). User control module 130 (FIG. 1C) can be the master of CANbus C 53C (FIG. 2B). Slaves on CANbus C 53C (FIG. 2B) can be power source controller 11A/B (FIG. 2B), processor A1 43A (FIG. 2C), processor A2 43B (FIG. 2C), processor B1 43C (FIG. 2D), and processor B2 43D (FIG. 2D). The master node (any of processors 43A-43D (FIG. 2C/D) or user control module 130 (FIG. 1C)) can send data to or request data from the slaves.

Referring primarily to FIG. 2C/D, in some configurations, power base 160 can include redundant processor sets A/B 39/41 that can control cluster 121 (FIG. 1B) and rotating drive wheels 101/102 (FIG. 1A). Right/left wheel motor drives A/B 19/21, 31/33 can drive right/left wheel motors A/B 85/87, 91/93 that drive wheels 101/102 (FIG. 1A) on the right and left sides of mobility device 120 (FIG. 1A). Wheels 101/102 (FIG. 1A) can be coupled to drive together. Turning can be accomplished by driving left wheel motors A/B 87/93 and right wheel motors A/B 85/91 at different rates. Cluster motor drive A/B 1050/27 can drive cluster motors A/B 83/89 that can rotate the wheel base in the fore/aft direction which can allow mobility device 120 (FIG. 1A) to remain level while front wheels 101 (FIG. 1A) are higher or lower than rear wheels 102 (FIG. 1A). Cluster motors A/B 83/89 can keep mobility device 120 (FIG. 1A) level when climbing up and down curbs, and can rotate the wheel base repeatedly to climb up and down stairs. Seat motor drive A/B 25/37 can drive seat motors A/B 45/47 that can raise and lower seat 105 (FIG. 1A).

Continuing to further refer to FIG. 2C/D, cluster position sensors A/B 55/71 can sense the position of cluster 121 (FIG. 1B) of wheels 101/102 (FIG. 1A). The signals from cluster position sensors A/B 55/71 and seat position sensors A/B 67/81 can be communicated among processors 43A-43D and can be used by processor set A/B 39/41 to determine signals to be sent to, for example, right wheel motor drive A/B 19/31, cluster motor drive A/B 15/27 and seat motor drive A/B 25/37. The independent control of clusters 121 (FIG. 1B) and drive wheels 101/102 (FIG. 1A) can allow mobility device 120 (FIG. 1A) to operate in several modes, thereby allowing the user or power base 160 to switch between modes, for example, in response to the local terrain.

Continuing to still further refer to FIG. 2C/D, inertial sensor packs 1070, 23, 29, 35 can sense, for example, but not limited to, the orientation of mobility device 120 (FIG. 1A). Each processor 43A-43D can include, in inertial sensor packs 1070, 23, 29, 35, accelerometers and gyroscopes. In some configurations, each inertial sensor pack 1070, 23, 29, 35 can include, but is not limited to including, four sets of three-axis accelerometers and three-axis gyros. The accelerometer and gyro data can be fused on each of processors 43A-43D. Each processor 43A-43D can produce a gravity vector that can be used to compute the orientation and inertial rotation rates of power base 160 (FIG. 1C). The fused data can be shared across processors 43A-43D and can then be subjected to threshold criteria. The threshold criteria can be used to improve the accuracy of device orientation and inertial rotation rates. For example, fused data from certain of processors 43A-43D that exceed certain thresholds can be discarded. The fused data from each of processors 43A-43D that are within pre-selected limits can be, for example, but not limited to, averaged or processed in any other form. Inertial sensor packs 1070, 23, 29, 35 can include, but are not limited to including, sensors such as, for example, ST® microelectronics LSM330DLC, or any sensor supplying a 3D digital accelerometer and a 3D digital gyroscope, or further, any sensor that can measure gravity and body rates. Sensor data can be subject to processing, for example, but not limited to, filtering to improve control of mobility device 120 (FIG. 1A).

Continuing to still further refer to FIG. 2C/D, power base 160 can include sensors such as, for example, but not limited to, ALLEGRO™ ACS709 current sensor IC, or any sensor that can sense at least a pre-selected number of motor currents, has bi-directional sensing, has user-selectable over-current fault setting, and can handle peak currents above a pre-selected fault limit. Cluster position sensors A/B 55/71, seat position sensors A/B 67/81, and manual brake release sensors A/B 61/75 can include but are not limited to including, Hall sensors.

Figure 3A:
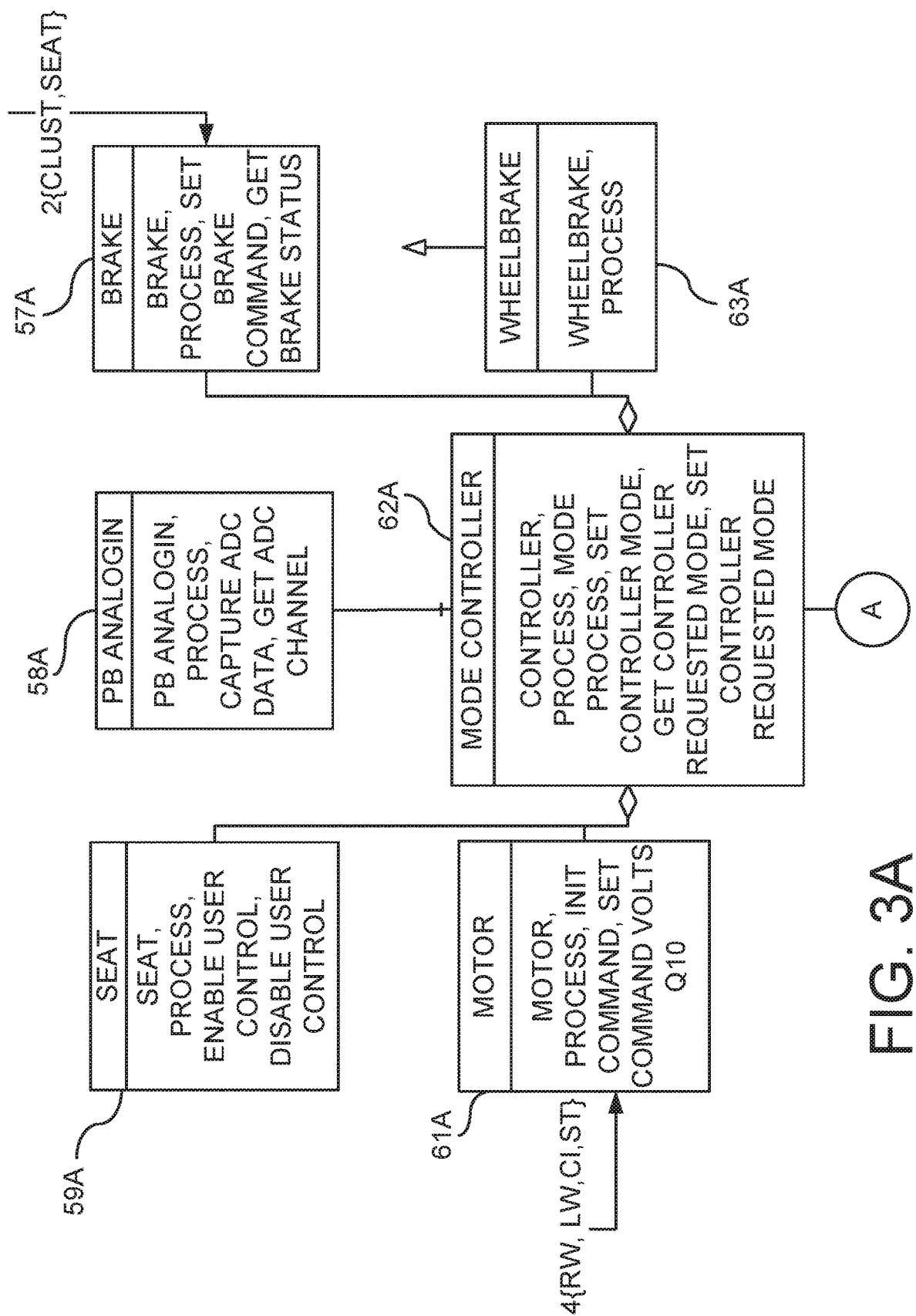
FIGS. 3A-3D are schematic block diagrams of the control structure with respect to modes of the system of the present teachings.

Referring now primarily to FIG. 3A, in some configurations, power base controller 100 (FIG. 3D) can include a structure in which seat controller 59A is communicatively coupled with motor controller 61A and mode controller 62A. Seat controller 59A can, for example, but not limited to, include seat movement process control, and technology to enable and disable user control. Motor controller 61A can, for example, but not limited to, receive data from right and left wheels 101/102 (FIG. 1A), clusters 121 (FIG. 1B), and seat 105 (FIG. 1A), can perform processing on those data, and can set voltage commands. Power base controller 100 (FIG. 3D) can receive analog data, and powerbase analog controller 58A can process those data, and provide the processed data to mode controller 62A. Power base controller 100 (FIG. 2D) can also include brake controller 57A that can receive cluster and seat brake data, process those data and provide them to mode controller 62A, and power base controller 100 (FIG. 2D) can also include wheel brake controller 63A that can process wheel brake data from brake controller 57A and provide those processed data to mode controller 62A. Mode controller 62A can use data received from seat controller 59A, motor controller 61A, analog controller 58A, brake controller 57A, and wheel brake controller 63A, along with requested mode data supplied from, for example, but not limited to, user control module 130 (FIG. 1C), and can set the mode of power base controller 100 (FIG. 2E) among other things. Mode controller 62A can maintain system operating modes. Depending on the current mode and the status of mobility device 120 (FIG. 1A), a requested mode may or may not be available to the user. Motion of mobility device 120 (FIG. 1A) can stop automatically if the user attempts to enter modes that may not be allowed by mode controller 62A.

Figure 3B:
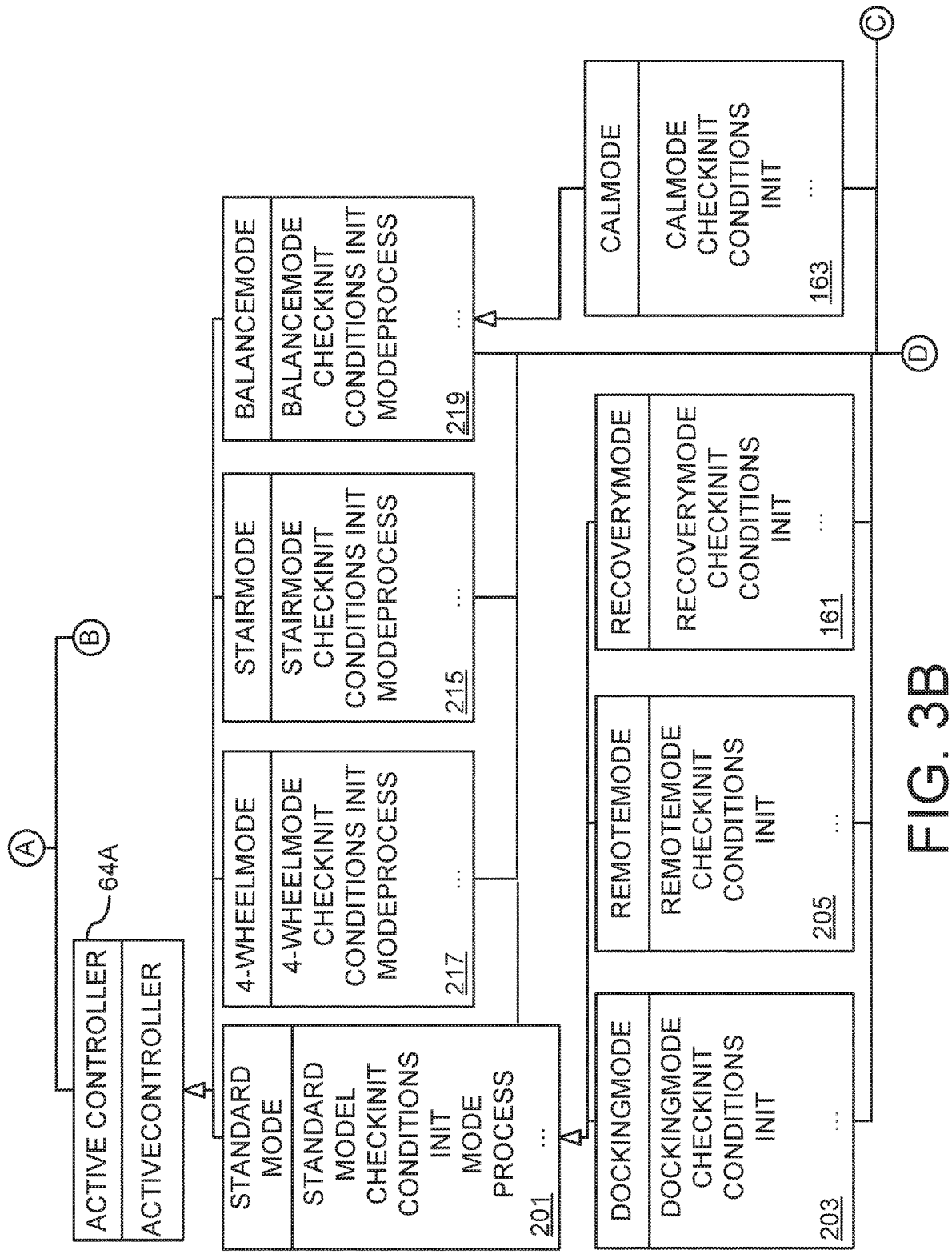
Figure 3C:
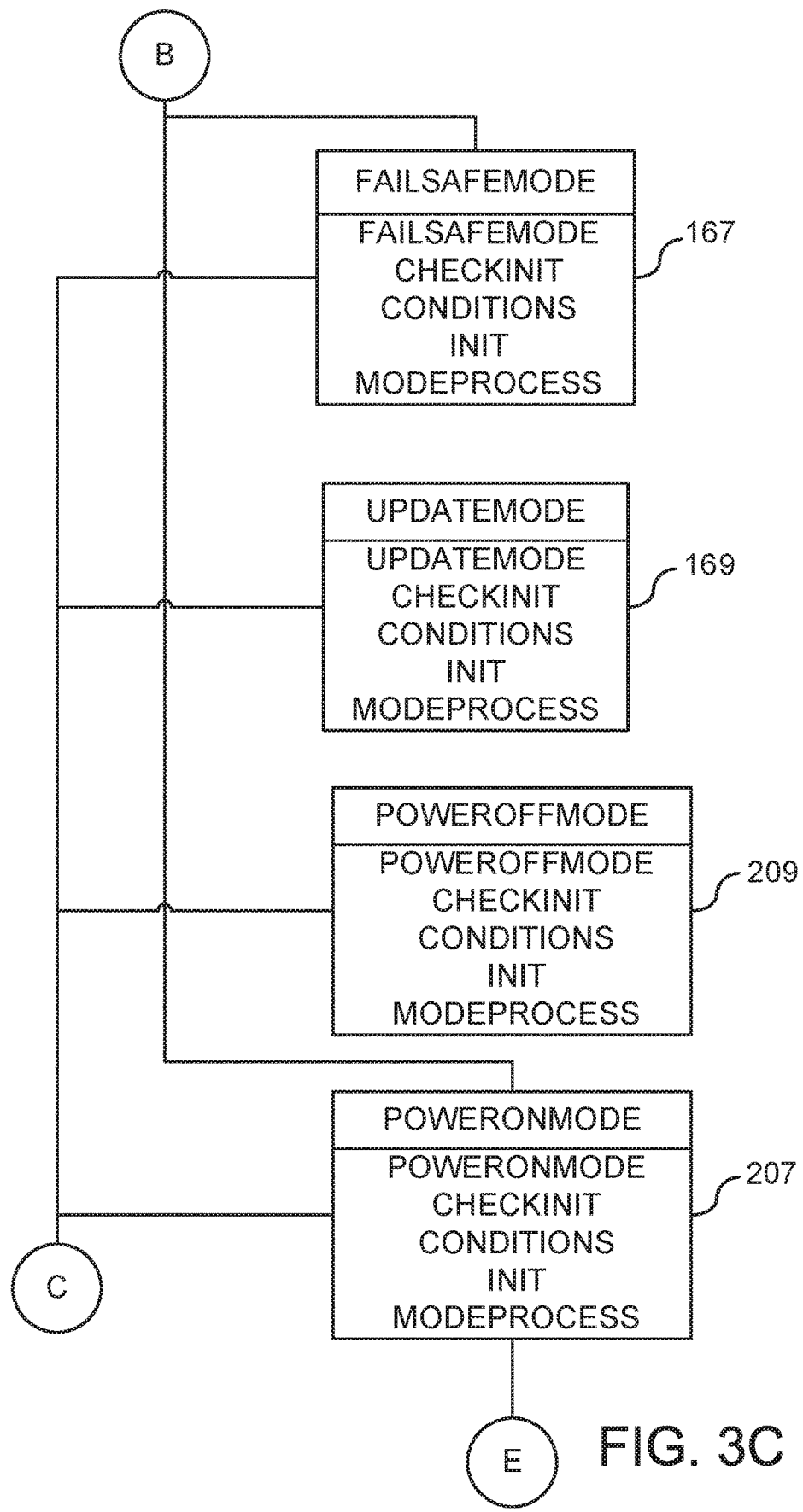

Referring now primarily to FIG. 3B, in some configurations, power base controller 100 (FIG. 3D) can support at least one operating mode that can include, but is not limited to including, standard mode 201 (described with respect to FIG. 1A), enhanced mode 217 (described with respect to FIG. 1A), balance mode 219 (described with respect to FIG. 1A), stair mode 215 (described with respect to FIG. 1A), docking mode 203 (described with respect to FIG. 1A), and remote mode 205 (described with respect to FIG. 1A). Service modes can include, but are not limited to including, recovery mode 161, failsafe mode 167 (FIG. 3C), update mode 169 (FIG. 3C), self-test mode 171 (FIG. 3C), calibrate mode 163, power on mode 207 (FIG. 3C), and power off mode 209 (FIG. 3C). With respect to recovery mode 161, if a power off occurs when mobility device 120 (FIG. 1A) is not in one of a pre-selected set of modes, such as for example, but not limited to, standard mode 201, docking mode 203, or remote mode 205, mobility device 120 (FIG. 1A) can enter recovery mode 161 to safely reposition mobility device 120 (FIG. 1A) into the driving position of standard mode 201. During recovery mode 161, power base controller 100 can select certain components to activate such as, for example, seat motor drive A/B 25/37 (FIG. 2C/D) and cluster motor drive A/B 1050/27 (FIG. 2C/D). Functionality can be limited to, for example, controlling the position of seat 105 (FIG. 1A) and cluster 121 (FIG. 1B). In calibrate mode 163, power base controller 100 (FIG. 3D) can receive data points related to the center of gravity of mobility device 120 (FIG. 1A) from, for example, user control module 130 (FIG. 1C) and use those data to update the center of gravity data. Mode information can be supplied to active controller 64A which can supply the mode information to mode controller 62A (FIG. 3A).

Figure 3D:
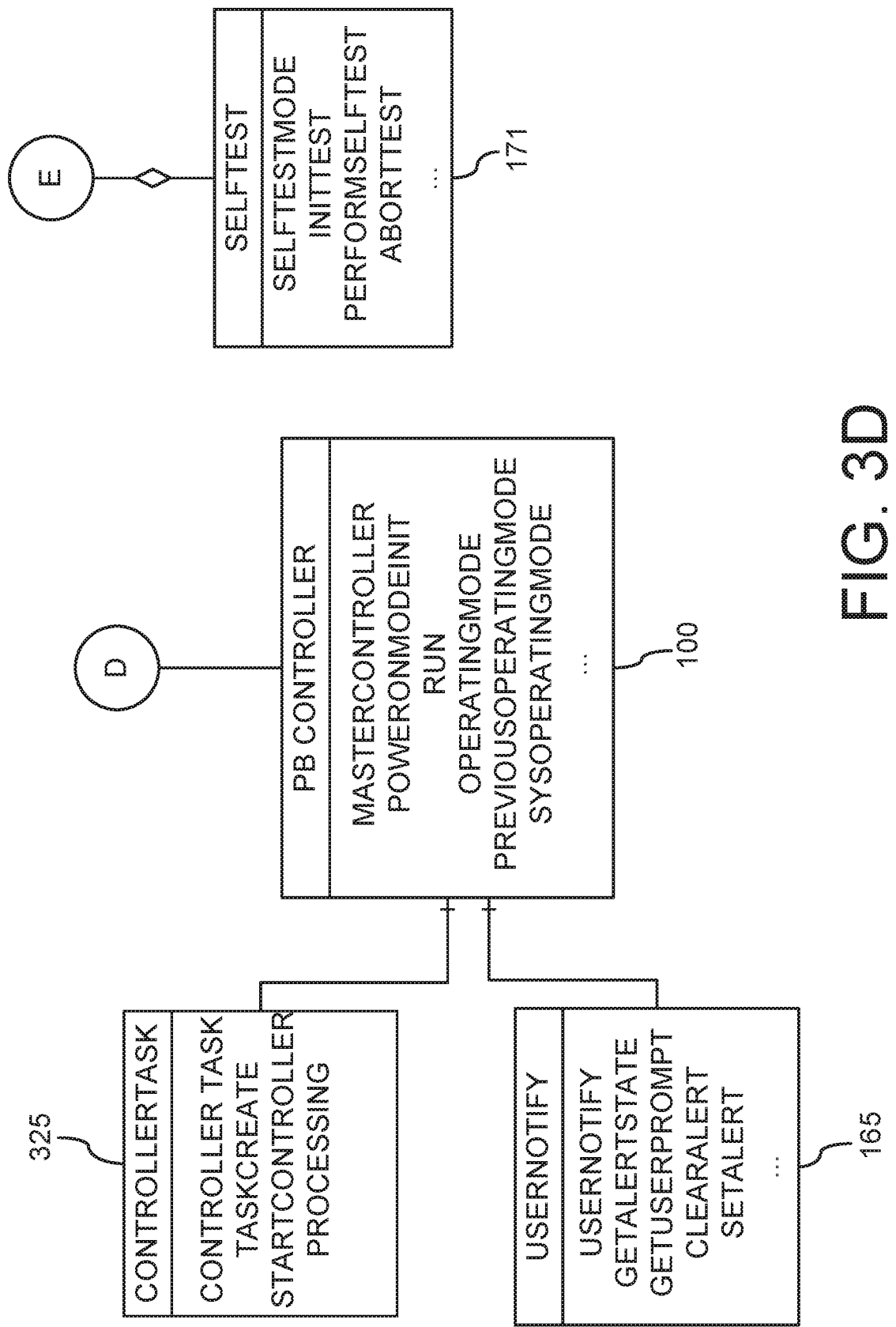

Referring now primarily to FIGS. 3C and 3D, power base controller 100 (FIG. 3D) can transition mobility device 120 (FIG. 1A) into failsafe mode 167 when power base controller 100 (FIG. 3D) determines that mobility device 120 (FIG. 1A) can no longer effectively operate. In failsafe mode 167 (FIG. 3C), power base controller 100 (FIG. 3D) can halt at least some active operations to protect against potentially erroneous or uncontrolled motion. Power base controller 100 (FIG. 3D) can transition from standard mode 201 (FIG. 3B) to update mode 169 (FIG. 3C) to, for example, but not limited to, enable communications with applications that can be executing external to power base 160 (FIG. 1C). Power base controller 100 (FIG. 3D) can transition to self-test mode 171 (FIG. 3C) when mobility device 120 (FIG. 1A) is first powered. In self-test mode 171 (FIG. 3C), electronics in power base 160 (FIG. 1C) can perform self diagnostics and can synchronize with one another. In some configurations, power base controller 100 (FIG. 3D) can perform system self-tests to check the integrity of systems that are not readily testable during normal operation, for example, memory integrity verification tests and disable circuitry tests. While in self-test mode 171 (FIG. 3C), operational functions can be disabled. Mode controller 62A (FIG. 3A) can determine a requested mode and can set the mode into which mobility device 120 (FIG. 1A) can transition. In some configurations, power base controller 100 (FIG. 3D) can calibrate the center of gravity of mobility device 120 (FIG. 1A). Power base controller 100 can control task creation, for example, through controller task 325, and can control user notifications through, for example user notify task 165.

Figure 3E:
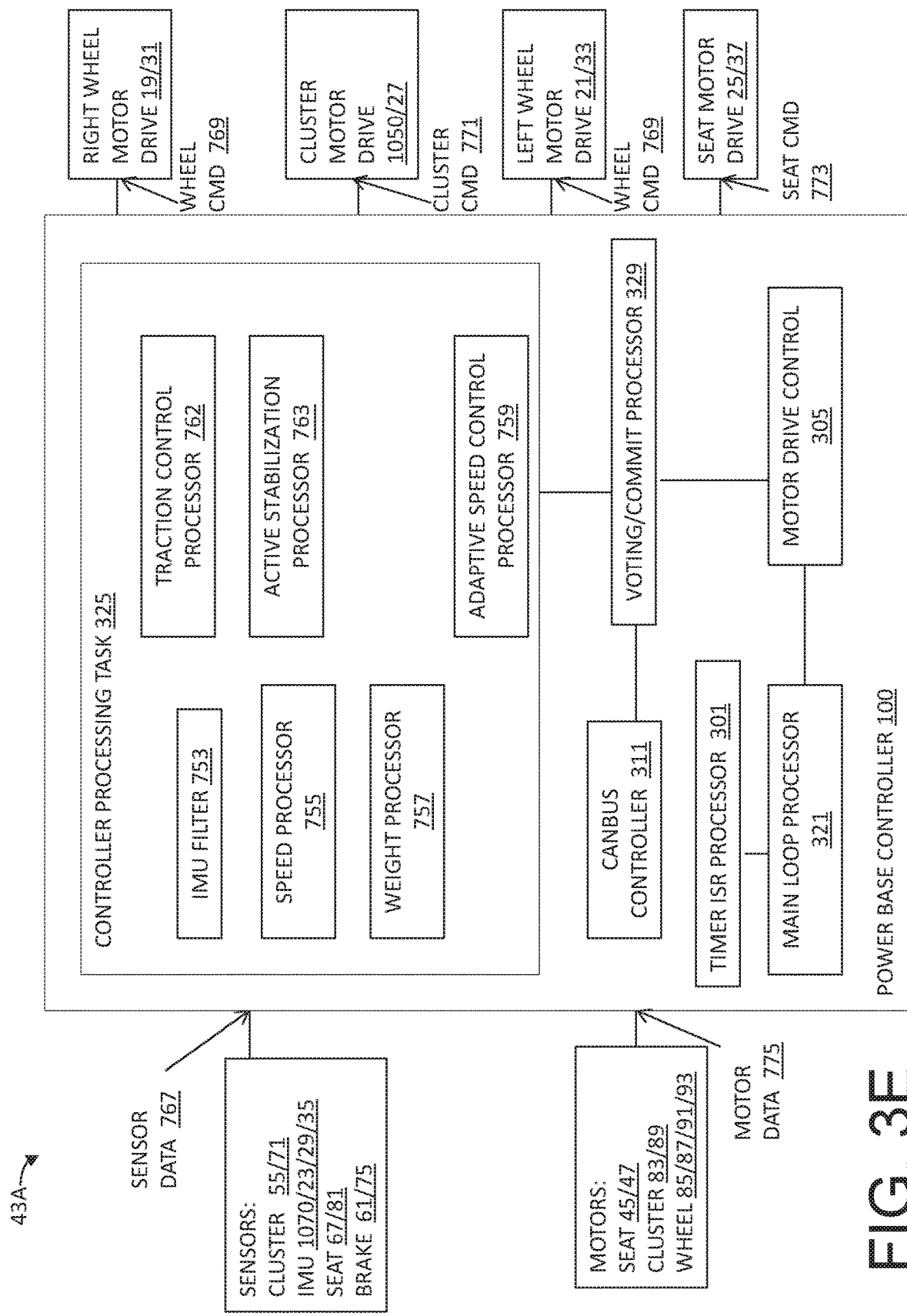
FIG. 3E is a schematic block diagram of a power base controller of the present teachings.
Figure 4:
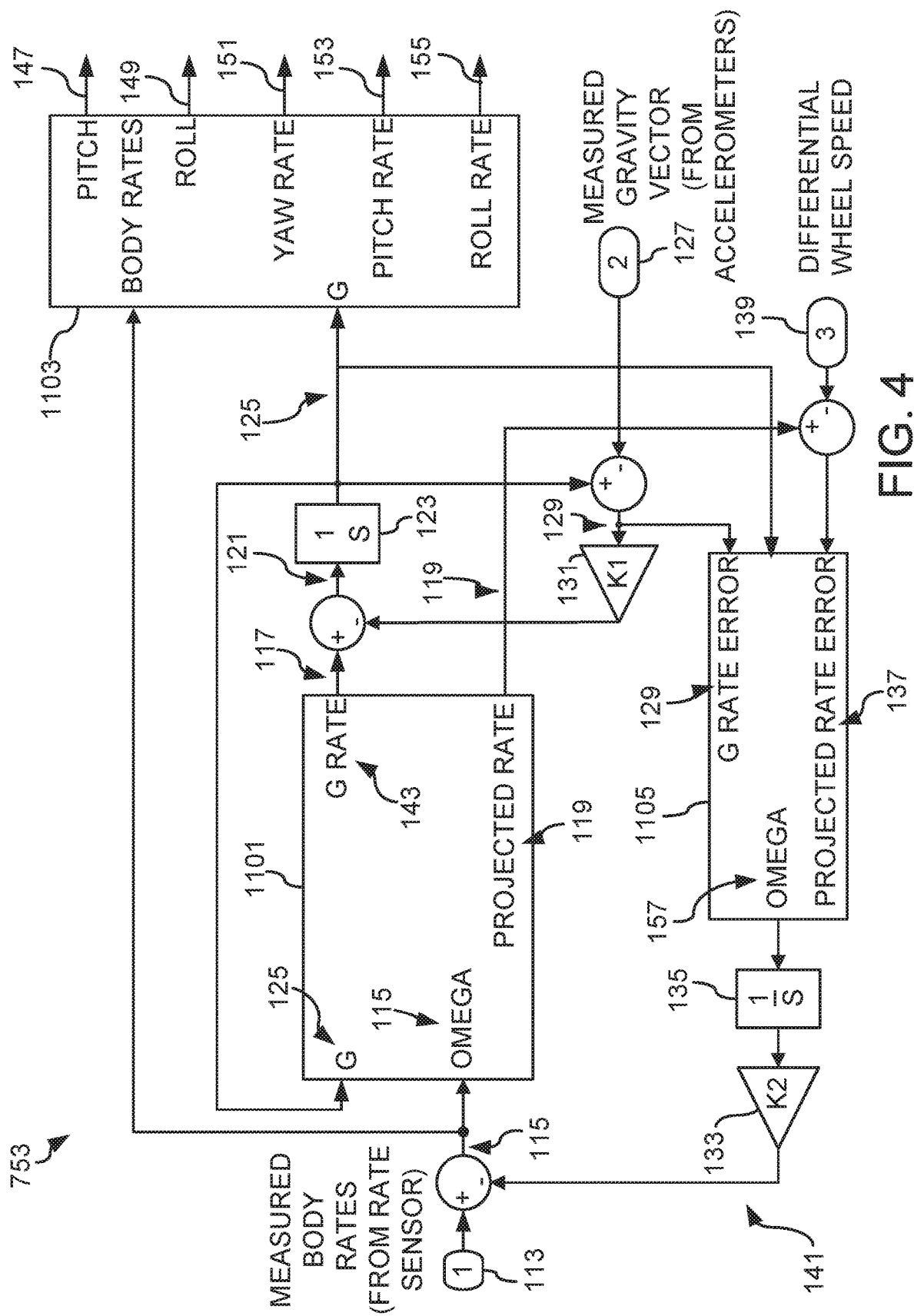
FIG. 4 is a schematic block diagram of the inertial measurement unit filter of the present teachings.

Referring now primarily to FIG. 3E, processors 43A-43D (FIG. 2C/D) can include power base controller 100 that can include, but is not limited to including, CANbus controller 311, motor drive control 305, timer interrupt service request processor 301, voting/commit processor 329, main loop processor 321, and controller processing task 325. Controller processing task 325 can include, but is not limited to including, IMU filter 753, speed-limiting processor 755, weight processor 757, adaptive speed control processor 759, traction control processor 762, and active stabilization processor 763. Inertial sensor pack 1070/23/29/35 can provide IMU data 767 to IMU filter 753 which can provide data that can result in wheel commands 769 to right wheel motor drive 19/31 and left wheel motor drive 21/33. IMU filter 753 can include, but is not limited to including, body rate to gravity rate and projected rate processor 1102 (FIG. 4), body rate and gravity to Euler angles and rates processor 1103 (FIG. 4), and gravity rate error and projected yaw rate error to body rates processor 1106 (FIG. 4). Seat motor 45/47 can provide motor data 775 to weight processor 757. Voting processor 329 can include, but is not limited to including, initial vote processor 873, secondary vote processor 871, and tertiary vote processor 875.

Figure 3F:
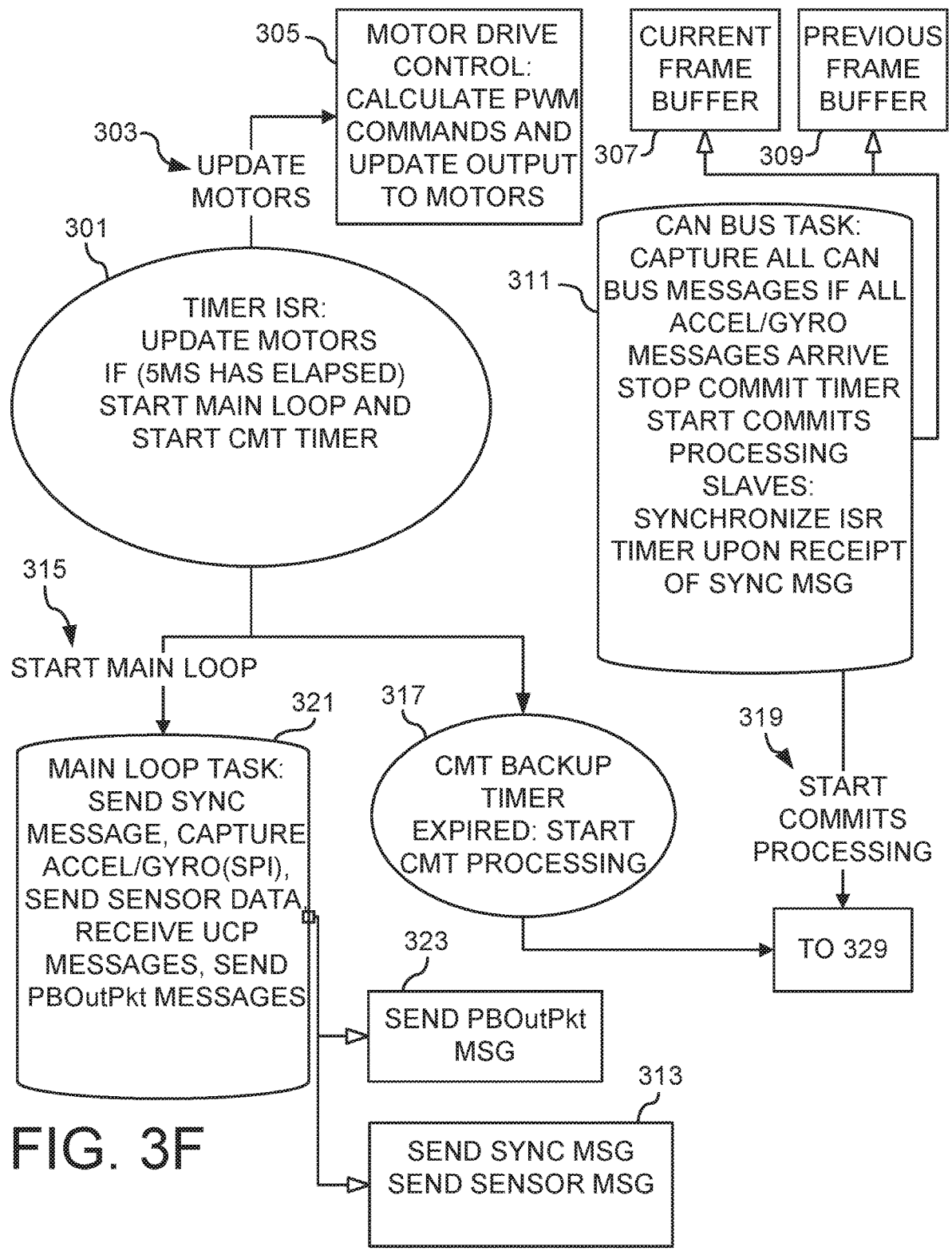
FIGS. 3F-3G are message flow diagrams of the power base controller of the present teachings.
Figure 3G:
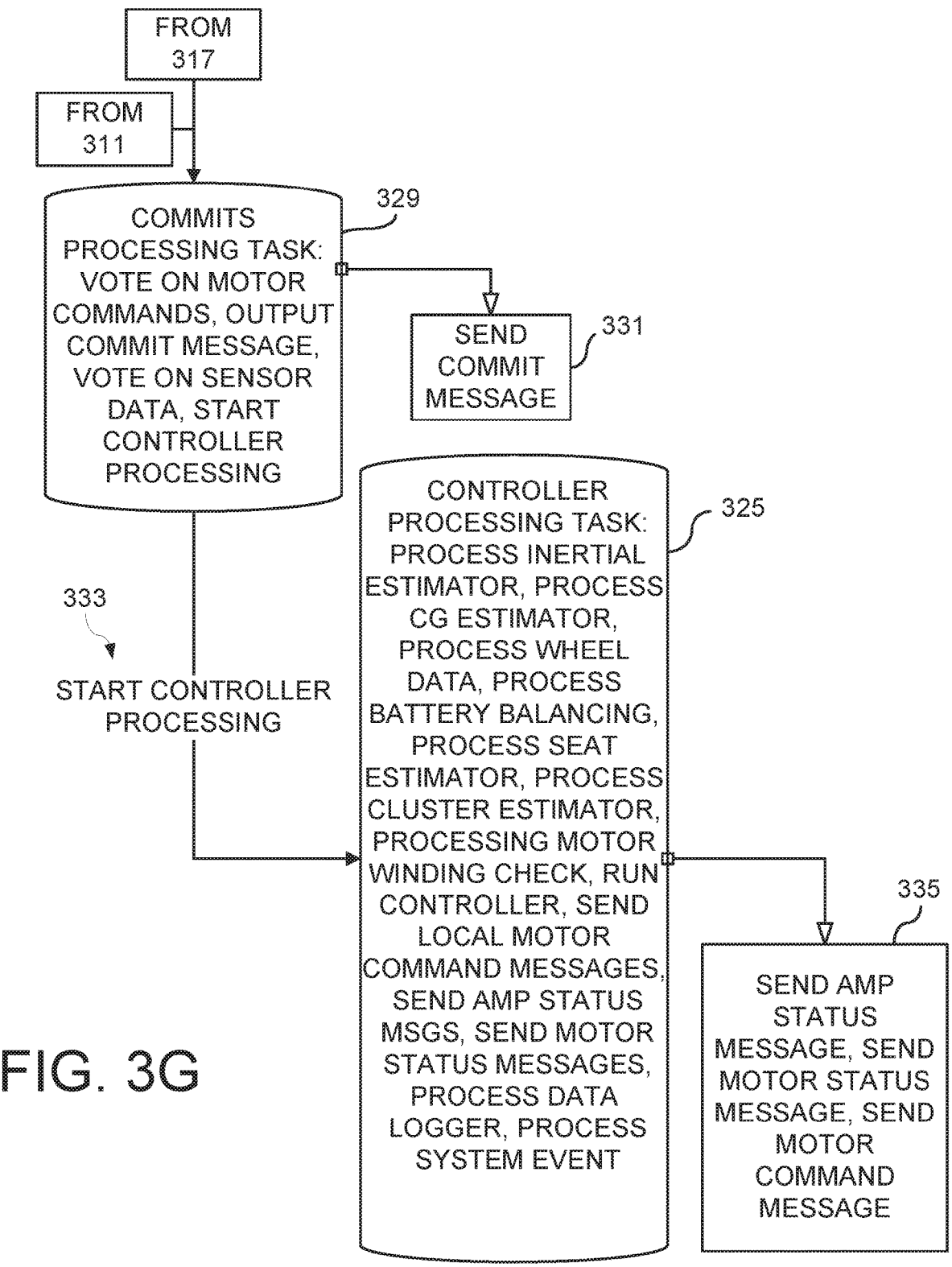

Referring now primarily to FIG. 3F/G, in some configurations, processors A1/A2/B1/B2 43A-43D (FIG. 2C/D) can share, through, for example, CANbus 53A/B (FIG. 2B), as controlled by CANbus controller task 311 (FIG. 3F), accelerometer and gyro data from inertial sensor packs 1070/23/29/35 (FIG. 3E). Power base serial buses 53A/B (FIG. 2B) can communicatively couple processors A1/A2/B1/B2 43A-43D (FIG. 2C/D) with other components of power base controller 100 (FIG. 3E). CANbus controller 311 (FIG. 3F) can receive interrupts when CANbus messages arrive, and can maintain current frame buffer 307 (FIG. 3F) and previous frame buffer 309 (FIG. 3F). When accelerometer and gyro data (sensor data 767 (FIG. 3E)) have arrived from processors A1/A2/B1/B2 43A-43D (FIG. 2C/D), CANbus controller 311 (FIG. 3F) can send a start commits processing message 319 (FIG. 3F) to voting/commit processor 329 (FIG. 3G). Voting/commit processor 329 (FIG. 3G) can send a commit message 331 (FIG. 3G) that can include the results of the voting process, for example, but not limited to, the voting processes of, for example, method 150 (FIGS. 6B/6C), applied to motor data 775 (FIG. 3E) and IMU data 767 (FIG. 3E), and can send start controller processing message 333 (FIG. 3G) to controller processing task 325 (FIG. 3G). Controller processing task 325 (FIG. 3G) can compute estimates based at least on, for example, received IMU data 767 (FIG. 3E) and motor data 775 (FIG. 3E), and can manage traction (traction control processor 762 (FIG. 3E)), speed (speed processor 755 (FIG. 3E), adaptive speed control processor 759 (FIG. 3E)), and stabilization (active stabilization processor 763 (FIG. 3E)) of mobility device 120 (FIG. 1A) based at least on the estimates, and can send motor-related messages 335. If CANbus controller 311 (FIG. 3F) has not received messages from processors A1/A2/B1/B2 43A-D (FIG. 2C/D) within a timeout period, such as, for example, but not limited to, 5 ms, timer interrupt service request processor 301 (FIG. 3F) can start commit backup timer 317 (FIG. 3F) that can, when the timer expires, start commits processing by sending a starts commits processing message 319 (FIG. 3F) to commits processing task 329 (FIG. 3G). Timer interrupt service request processor 301 (FIG. 3F) can also send start main loop message 315 (FIG. 3F) to main loop processor 321 (FIG. 3F) and update motors message 303 (FIG. 3F) to motor drive control 305 (FIG. 3F) when a timer has elapsed, for example, every 5 ms, and main loop processor 321 (FIG. 3F) can capture sensor data and data from user control module 130 (FIG. 1C). Main loop processor 321 (FIG. 3F) can send a synchronization message 313 (FIG. 3F) over CANbus 53A/B (FIG. 2B), if main loop processor 321 (FIG. 3F) is executing on a master of processors A1/A2/B1/B2 43A-D (FIG. 2C/D). Main loop processor 321 (FIG. 3F) can keep track of timed activities across power base 160 (FIG. 1B), can start other processes, and can enable communications through power base output packet 323 (FIG. 3F).

Figure 14A:
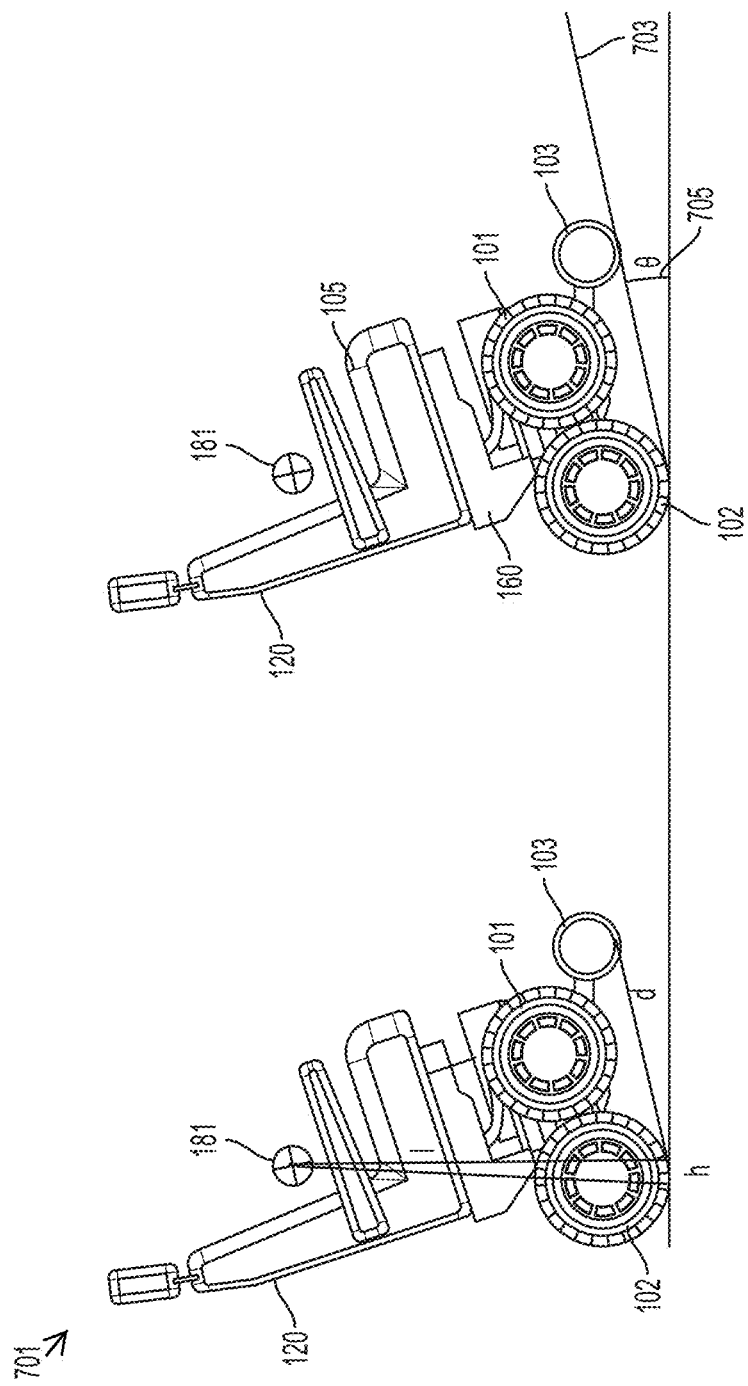
FIG. 14A is a pictorial representation of a comparison of a mobility device of the present teachings tipping versus a mobility device of the present teachings traversing an incline.

Referring now primarily to FIG. 4, with respect to IMU filter 753, a state estimator can estimate dynamic states of mobility device 120 (FIG. 14A) relative to an inertial coordinate system from the sensor information measured in a body coordinate system, that is, the coordinate system associated with mobility device 120 (FIG. 14A). The estimation process can include relating the acceleration and rate measurements as taken by sensors onboard inertial sensor pack 1070/23/29/35 (FIG. 3E) on the axis system in which they are mounted (body coordinate systems) to the inertial coordinate system, to generate dynamic state estimates. The dynamic states relating the body coordinate frame to the inertial coordinate frame can be described with Euler angles and rates, which are computed from an estimate of the earth's gravitational field vector. The gyroscopes can supply rate measurements relative to their mounting reference frame. Pitch Euler angle 147 and roll Euler angle 149 can be estimated as follows.

Mapping rates from the body coordinate frame of reference to the inertial coordinate frame of reference can include evaluating the kinematic equation of the rotation of a vector.

$$\dot{G} = \widehat{G}_f \times \Omega_f$$

where $\dot{G}$ is the gravity rate vector, $\widehat{G}_f$ is the filtered gravity vector, and $\Omega_f$ is the body rate vector.

Integrated over time, $\dot{G}$ provides a gravity vector estimate for a gyro. The projected gravity rate estimate is as follows.

$$\dot{\gamma} = \widehat{G}_f \cdot \Omega_f$$

Where, $\dot{\gamma}$ is the projected gravity rate.

Mapping inertial rates back to the body coordinate frame in order to integrate error to compensate for gyro bias can be accomplished as follows:

$$\dot{G}_e = \widehat{G}_f \times \Omega_e$$

where $\dot{G}_e$ is the gravity rate error and $\Omega_e$ is the body rate error, which is equivalent to:

$$\begin{bmatrix} 0 & -G_{f_z} & G_{f_y} \\ G_{f_z} & 0 & -G_{f_x} \\ -G_{f_y} & G_{f_x} & 0 \end{bmatrix} \begin{bmatrix} \omega_{e_x} \\ \omega_{e_y} \\ \omega_{e_z} \end{bmatrix} = \begin{bmatrix} \dot{G}_{e_x} \\ \dot{G}_{e_y} \\ \dot{G}_{e_z} \end{bmatrix}$$

where $G_{f_{x\text{-}y\text{-}z}}$ are components of filtered gravity vector 125, $\omega_{e_{x\text{-}y\text{-}z}}$ are components of filtered body rate error 157, and $\dot{G}_{e_{x\text{-}y\text{-}z}}$ are components of filtered gravity rate error 129. The projected gravity rate can be computed as follows.

$$\dot{\gamma}_e = \widetilde{G_f} \cdot \Omega_e$$

or $$\dot{\gamma}_e = G_{f_x}\omega_{e,x} + G_{f_y}\omega_{e,y} + G_{f_z}\omega_{e,z}$$

Coupled with the matrix above, this yields a matrix that can be viewed in the Ax=b format:

$$\begin{bmatrix} 0 & -G_{f_z} & G_{f_y} \\ G_{f_z} & 0 & -G_{f_x} \\ -G_{f_y} & G_{f_x} & 0 \\ G_{f_x} & G_{f_y} & G_{f_z} \end{bmatrix} \begin{bmatrix} \omega_{e_x} \\ \omega_{e_y} \\ \omega_{e_z} \end{bmatrix} = \begin{bmatrix} \dot{G}_{e_x} \\ \dot{G}_{e_y} \\ \dot{G}_{e_z} \\ \dot{\gamma}_e \end{bmatrix}$$

To solve for body rate error 157, the pseudo-inverse for the 'A' matrix can be computed as follows:

$$(A^T A)^{-1} A^T A x = (A^T A)^{-1} A^T b$$

The transpose 'A' matrix multiplied with the 'A' matrix yields the following matrix:

$$\begin{bmatrix} G_{f_x}^2 + G_{f_y}^2 + G_{f_z}^2 & 0 & 0 \\ 0 & G_{f_x}^2 + G_{f_y}^2 + G_{f_z}^2 & 0 \\ 0 & 0 & G_{f_x}^2 + G_{f_y}^2 + G_{f_z}^2 \end{bmatrix}$$

Since filtered gravity vector 125 is a unit vector, the above matrix simplifies to a 3×3 identity matrix, whose inverse is a 3×3 identity matrix. Therefore, the pseudo-inverse solution to the Ax=b problem reduces to $$A^T A x = A^T b = \begin{bmatrix} \omega_{e_x} \\ \omega_{e_y} \\ \omega_{e_z} \end{bmatrix} = \begin{bmatrix} 0 & G_{f_z} & -G_{f_y} & G_{f_x} \\ -G_{f_z} & 0 & G_{f_x} & G_{f_y} \\ G_{f_y} & -G_{f_x} & 0 & G_{f_z} \end{bmatrix}$$

$$\begin{bmatrix} \dot{G}_{e_x} \\ \dot{G}_{e_y} \\ \dot{G}_{e_z} \\ \dot{\gamma}_e \end{bmatrix} = \begin{bmatrix} G_{f_z}\dot{G}_{e_y} - G_{f_y}\dot{G}_{e_z} + G_{f_x}\Psi_e \\ -G_{f_z}\dot{G}_{e_x} - G_{f_x}\dot{G}_{e_z} + G_{f_y}\Psi_e \\ G_{f_y}\dot{G}_{e_x} - G_{f_x}\dot{G}_{e_y} + G_{f_z}\Psi_e \end{bmatrix}$$

Where $\dot{\psi}_e$ is the difference between the projected gravity rate 9119 and the wheel speed derived from data received from right/left wheel motor A/B 85/87/91/93 (FIG. 2C/2D). The resulting matrix can be written as the following identity:

$$\omega_e = \dot{G}_e \times \widetilde{G_f} + \widetilde{G_f} \dot{\gamma}_e$$

Filtered gravity vector 125 can be translated into Euler pitch 147 and Euler roll 149:

$$\theta = -a\sin(G_{f_y})$$

$$\varphi = -a\tan\left(\frac{G_{f_x}}{G_{f_z}}\right)$$

Filtered body rates can be translated into Euler pitch rate 153 and Euler roll rate 155:

$$\dot{\theta} = \omega_{f_x}\cos\varphi + \omega_{f_z}\sin\varphi$$

$$\dot{\varphi} = \omega_{f_x}\tan\theta\sin\varphi + \omega_{f_y} - \omega_{f_z}\tan\theta\cos\varphi$$

$$\dot{\psi} = \omega_{f_x}\frac{-\sin\varphi}{\cos\theta} + \omega_{f_z}\frac{\cos\varphi}{\cos\theta}$$

Figure 13A:
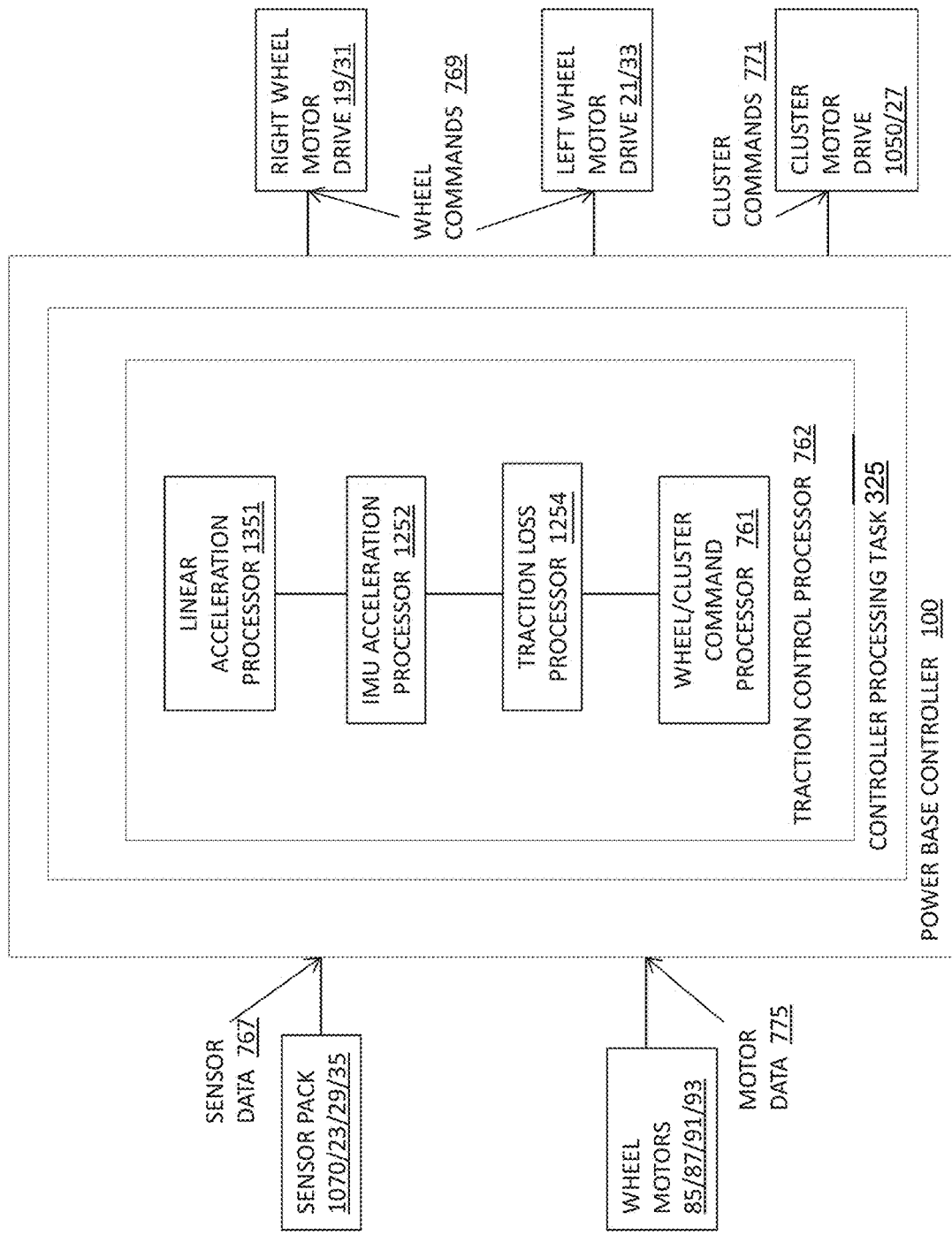
FIG. 13A is a schematic block diagram of the traction control processor of the present teachings.

Continuing to refer to FIG. 4, IMU filter 753 can filter gravity vector 125 which can represent the inertial z-axis. IMU filter 753 can provide a two-dimensional inertial reference in three-dimensional space. Measured body rates 113 (measured, for example, from gyros that can be part of inertial sensor packs 1070/23/29/35 (FIG. 2C/2D)), measured gravity vector 127 computed based on accelerometer data, and differential wheel speed 139 (that can be computed from data received from right/left wheel motor drives A/B 19/21/31/33 (FIG. 2C/2D)) of left and right wheels 101 (FIG. 1A) can be inputs to IMU filter 753. IMU filter 753 can compute pitch 147, roll 149, yaw rate 151, pitch rate 153, and roll rate 155, for example, to be used to compute wheel commands 769 (FIG. 13A). Filtered output (G) and measured input ($G_{meas}$) are compared to produce an error, along with the comparison of gravity projected rate and differential wheel speed. There errors are fed back to the rate measurements to compensate for rate sensor bias. Filtered gravity vector 125 and filtered body rates 115 can be used to compute pitch 147, roll 149, yaw rate 151, pitch rate 153, and roll rate 155.

Referring now to FIG. 5, method 250 for processing data using IMU filter 753 (FIG. 4) can include, but is not limited to including, subtracting 251 gyro bias from gyro readings to remove the offset. Method 250 can further include computing 255 gravity rate vector 143 (FIG. 4) and projected gravity rate estimate 119 (FIG. 4) based at least on filtered body rates 115 (FIG. 4) and filtered gravity vector 125 (FIG. 4). Method 250 can still further include subtracting 257 the product of gain K1 and gravity vector error from gravity rate vector 117 (FIG. 4) and integrating 259 filtered gravity rate 122 (FIG. 4) over time. Gravity vector error 129 (FIG. 4) can be based at least on filtered gravity vector 125 (FIG. 4) and measured gravity vector 127 (FIG. 4). Method 250 can further include computing 261 pitch rate 153 (FIG. 4), roll rate 155 (FIG. 4), and yaw rate 151 (FIG. 4), pitch, and roll based on filtered gravity rate vector 125 (FIG. 4) and filtered body rates 115 (FIG. 4). Gyro bias 141 (FIG. 4) can be computed by subtracting differential wheel speed 139 (FIG. 4) between wheels 101/102 (FIG. 1A) from projected gravity rate estimate 119 (FIG. 4) to produce projected rate error 137 (FIG. 4). Further, the cross product of gravity vector error 129 (FIG. 4) and filtered gravity vector 125 (FIG. 4) can be computed and added to the dot product of filtered gravity vector 125 (FIG. 4) and projected gravity rate estimate error 137 (FIG. 4) to produce body rate error 157 (FIG. 4). Gyro bias 141 (FIG. 4) results from applying gain K2 133 (FIG. 4) to the integration 135 (FIG. 4) over time of body rate error 157 (FIG. 4) to produce the gyro bias that is subtracted in step 251. Equations describing method 250 follow.

$$\dot{G}_m = G \times \omega$$

where $\dot{G}_m$ is the measured gravity rate vector, G is the filtered gravity vector, and $\omega$ is the filtered body rate vector.

$$\dot{\gamma} = G \cdot \omega * \hat{G}$$

where $\dot{\gamma}$ is the projected rate vector, and $\hat{G}$ is the unit gravity vector.

$$\dot{\gamma}_e = \dot{\gamma} - V_{diff}$$

where $\dot{\gamma}_e$ is the projected rate error vector and $V_{diff}$ is the differential wind speed vector.

$$\dot{G} = \dot{G}_m - K1 * G_{error}$$

where $\dot{G}$ is the filtered gravity rate vector, $\dot{G}_m$ is the measured gravity rate vector, K1 is a gain, and $G_{error}$ is the gravity error vector.

$$G_{error} = G - G_m$$

where $G_m$ is the measured gravity vector.

$$\dot{\omega}_e = \dot{G}_e \times G + G * \dot{\gamma}_e$$

where $\dot{\omega}_e$ is the body rate error vector and $\dot{G}_e$ is the gravity rate error vector.

$$\omega_e = K2 * \dot{\omega}_e / s$$

where $\omega_e$ is the integrated body rate error vector and K2 133 (FIG. 4) is a gain.

$$\omega = \omega_m - \omega_e$$

where $\hat{w}_m$ is the measured body rate vector $$G = \dot{G}/s$$

Euler angles:

$$\theta(\text{pitch}) = -a\sin(G_y)$$

$$\varphi(\text{roll}) = -a\tan(G_x / G_z)$$

Euler rates:

Pitch rate: $\dot{\theta} = \omega_x \cos\varphi + \omega_z \sin\varphi$

Roll rate: $\dot{\varphi} = \omega_x \tan\theta \sin\varphi + \omega_y - \omega_z \tan\theta \cos\varphi$ Yaw rate: $\dot{\psi} = \omega_x \dfrac{-\sin\varphi}{\cos\theta} + \omega_z \dfrac{\cos\varphi}{\cos\theta}$ Referring now primarily to FIG. 6A, to enable failsafe operation, power base 160 (FIG. 1C) can include, but is not limited to including, redundant subsystems by which failures can be detected, for example, by comparison of data associated with each subsystem to data associated with the remaining subsystems. Failure detection in redundant subsystems can create fail-operative functionality, wherein mobility device 120 (FIG. 1A) can continue to operate on the basis of the information provided by the remaining non-failing subsystems, if one subsystem is found to be defective, until mobility device 120 (FIG. 1A) can be brought to a safe mode without endangering the user. If a failed subsystem is detected, the remaining subsystems can be required to agree to within prescribed limits in order for operation to continue, and operation can be terminated in case of disagreement between the remaining subsystems. Voting processor 329 can include, but is not limited to including, at least one way to determine which value to use from redundant subsystems, and in some configurations, voting processor 329 can manage different types of data in different ways, for example, but not limited to, calculated command data and inertial measurement unit data.

Figure 6A:
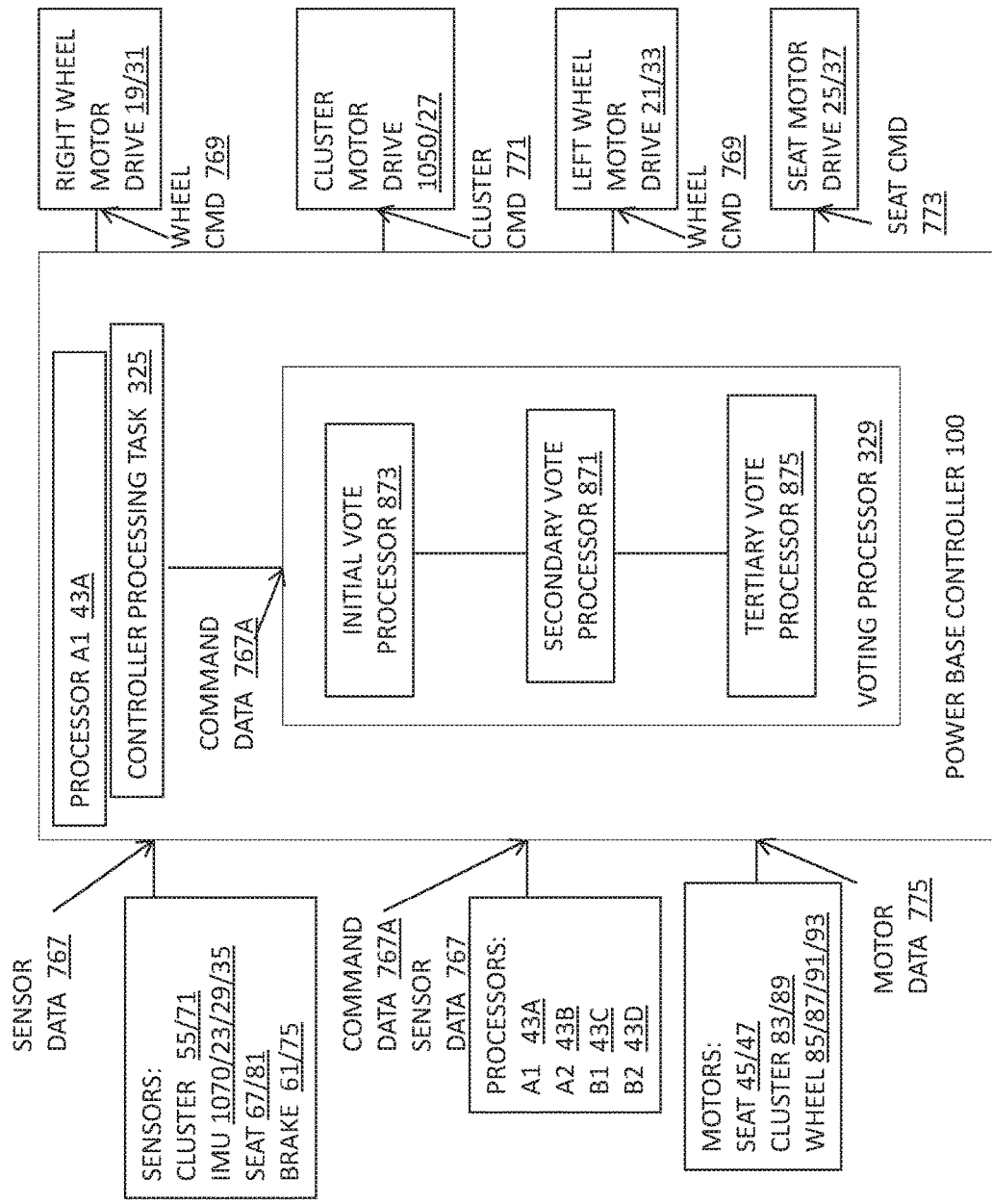
FIG. 6A is a schematic block diagram of the voting processor of the present teachings.

Continuing to refer primarily to FIG. 6A, voting processor 329 can include, but is not limited to including, initial vote processor 873, secondary vote processor 871, and tertiary vote processor 875. Initial vote processor 873 can include, but is not limited to including, computer instructions to average sensor data 767 or command data 767A, from each processor A1/A2/B1/B2 43A-43D (FIG. 2C) (referred to herein as processor values). Initial vote processor 873 can further include computer instructions to compute the absolute value difference between each processor value and the average, and discard the highest absolute value difference leaving three remaining processor values. Secondary vote processor 871 can include, but is not limited to including, computer instructions to compute differences between the remaining processor values and each other, to compare the differences to a preselected threshold, to compare the processor values that have the highest difference between them to the remaining value, to vote out the processor value with the highest difference from the remaining value, to compare the voted out values to the remaining values, to vote out any difference above the pre-selected threshold, if any, and to select a remaining processor values or an average of the processor values, depending, for example, on the type of data the processor values represent. Tertiary vote processor 875 can include, but is not limited to including, computer instructions to, if there are no differences greater than the pre-selected threshold, compare the discarded value to the remaining values, vote out the discarded value if there are any differences greater than the pre-selected threshold, and select one of the remaining processor values or an average of the remaining processor values depending, for example, on the type of data the processor values represent. Tertiary vote processor 875 can also include computer instructions to, if there are no differences greater than the pre-selected threshold, select a remaining processor value or an average of the remaining processor values. It can be possible that the discarded value is not voted out and all processor values remain to be selected from or averaged. Tertiary vote processor 875 can still further include computer instructions to, if a processor value is voted out a pre-selected number of times, raise an alarm, and, if the voting scheme fails to find a processor value that satisfies the selection criteria, increment the frame counter. Tertiary vote processor 875 can also include computer instructions to, if the frame counter has not exceeded a pre-selected number of frames, discard the frame containing the processor values in which the voting scheme failed a processor value that satisfies the selection criteria, and to select the last frame with at least one processor value that could be used. Tertiary vote processor 875 can also include computer instructions to, if the frame counter is greater than a pre-selected number of frames, moving mobility device 120 (FIG. 1A) to a failsafe mode.

Figure 6B:
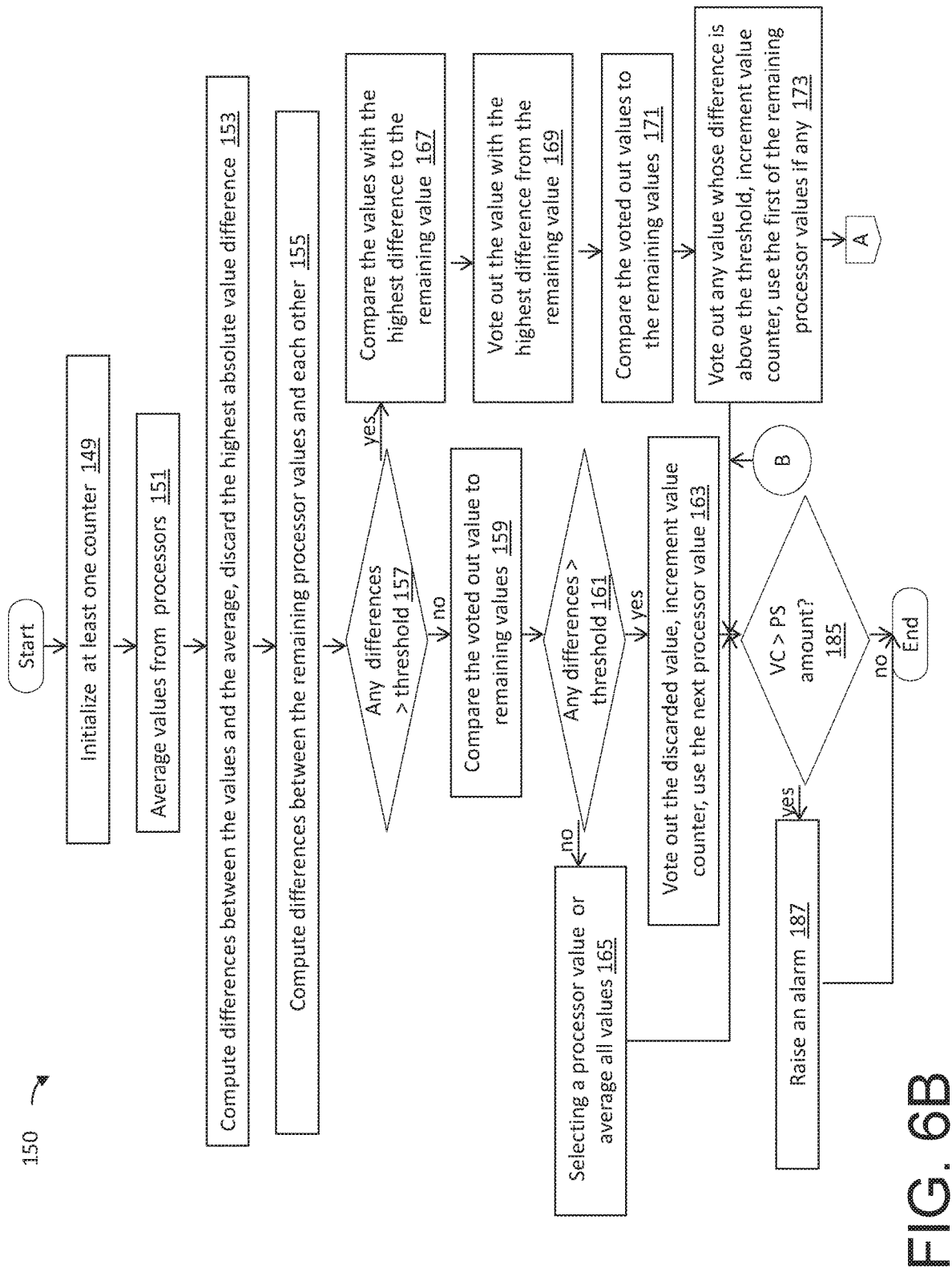
FIGS. 6B and 6C are flowcharts of the method of the present teachings for 4-way voting.
Figure 6C:
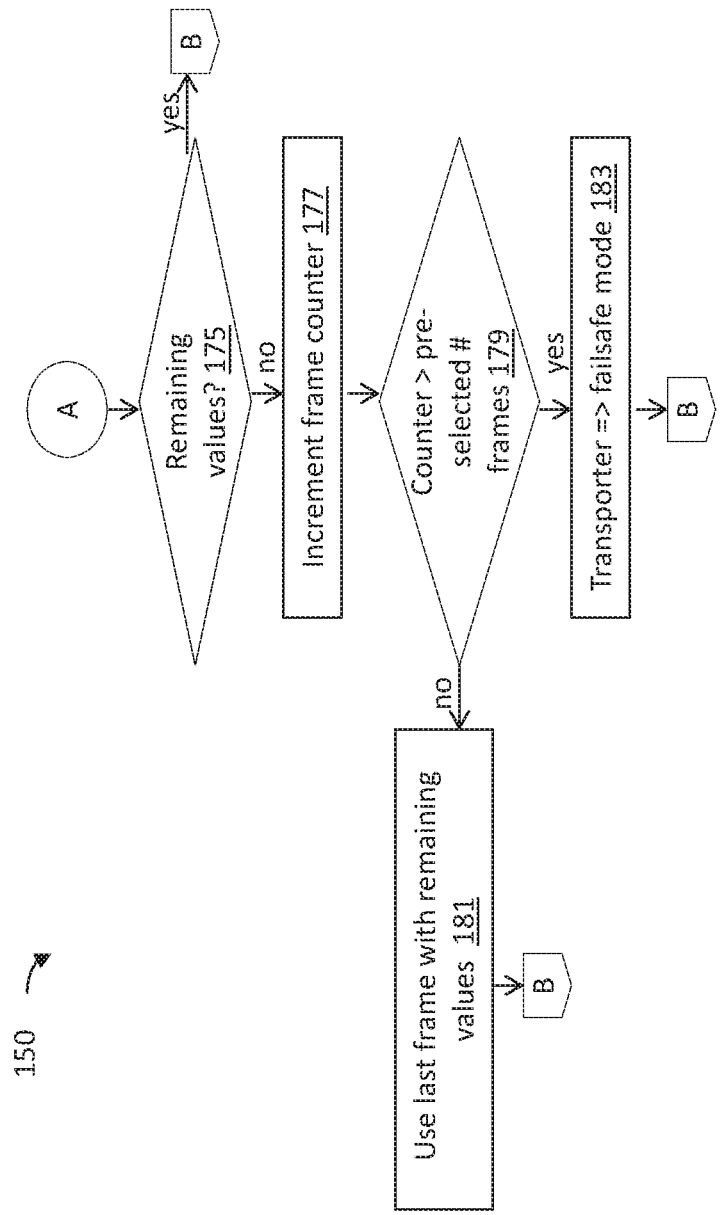

Referring now to FIGS. 6B and 6C, method 150 for resolving which value to use from redundant processors, referred to herein as "voting", can include, but is not limited to including, initializing 149 a counter, averaging 151 values, for example, but not limited to, sensor or command values, from each processor 43A-43D (FIG. 2C/D) (referred to herein as processor values), computing 153 the absolute value difference between each processor value and the average, and discarding the highest difference. Method 150 can further include computing 155 differences between the remaining processor values and each other. If 157 there are any differences greater than a preselected threshold, method 150 can include comparing 167 the values that have the highest difference between them to the remaining value, voting out 169 the value with the highest difference from the remaining value, comparing 171 the voted out values to the remaining values, and voting out 173 any difference above the pre-selected threshold and selecting one of the remaining processor values or an average of the processor values. For example, if processor values from processors A1 43A (FIG. 2C), B1 43C (FIG. 2D), and B2 43D (FIG. 2D) remain, the processor value (or an average of the processor values) from any of the remaining processors can be chosen. If 157 there are no differences greater than the pre-selected threshold, method 150 can compare 159 the voted out value to the remaining values. If 161 there are any differences greater than the pre-selected threshold, method 150 can include voting out 163 the value voted out in the compare 159 step, and selecting one of the remaining processor values or an average of the remaining processor values. If 161 there are no differences greater than the pre-selected threshold, method 150 can include selecting 165 one of the remaining processor values or an average of the remaining processor values. If 185 a processor value is voted out a pre-selected number of times, method 150 can include raising 187 an alarm. If 175 the voting scheme fails to find a processor value that satisfies the selection criteria, method 150 can include incrementing 177 the counter. If 179 the counter has not exceeded a pre-selected number, method 150 can include discarding the frame having no remaining processor values and selecting 181 a previous frame having at least one processor value that meets the selection criteria. If 179 the frame counter is greater than the pre-selected number, method 150 can include moving 183 mobility device 120 (FIG. 1A) to a failsafe mode.

Figure 7A:
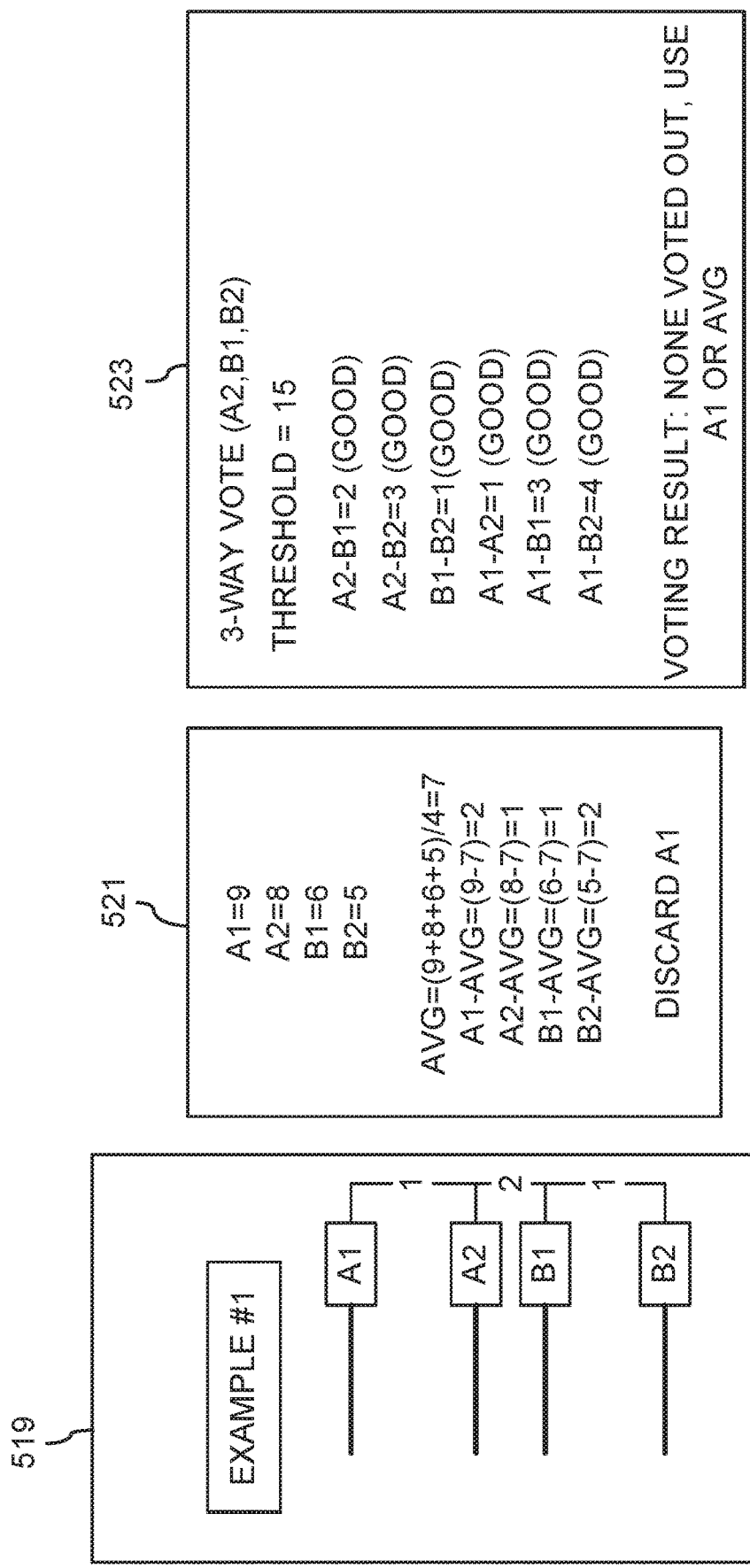
FIGS. 7A-7D are tabular representations of voting examples of the present teachings.

Referring now primarily to FIG. 7A, example1 519 of voting can include first computations 521 in which processor values for processors A1-B2 43A-43D (FIG. 2C/D) can be averaged and can be compared to the computed average. The processor having the largest difference from the average, in example1 519, processor A1 43A (FIG. 2C), can be discarded. Processor values from processor B2 43D (FIG. 2D) could have instead been discarded. Second computations 523 can include comparisons between the processor values of the remaining three processors A2/B1/B2 43B-43D (FIG. 2C/D). In example1 519, none of the differences exceeds the exemplary threshold of fifteen. Comparisons can be taken between the discarded processor value of processor A1 43A (FIG. 2C) and the processor values of the three remaining processors A2/B1/B2 43B-43D (FIG. 2C/D). The voting result from example1 519 is that any of the processor values from processors A1/A2/B1/B2 43A-43D (FIG. 2C) can be selected.

Figure 7B:
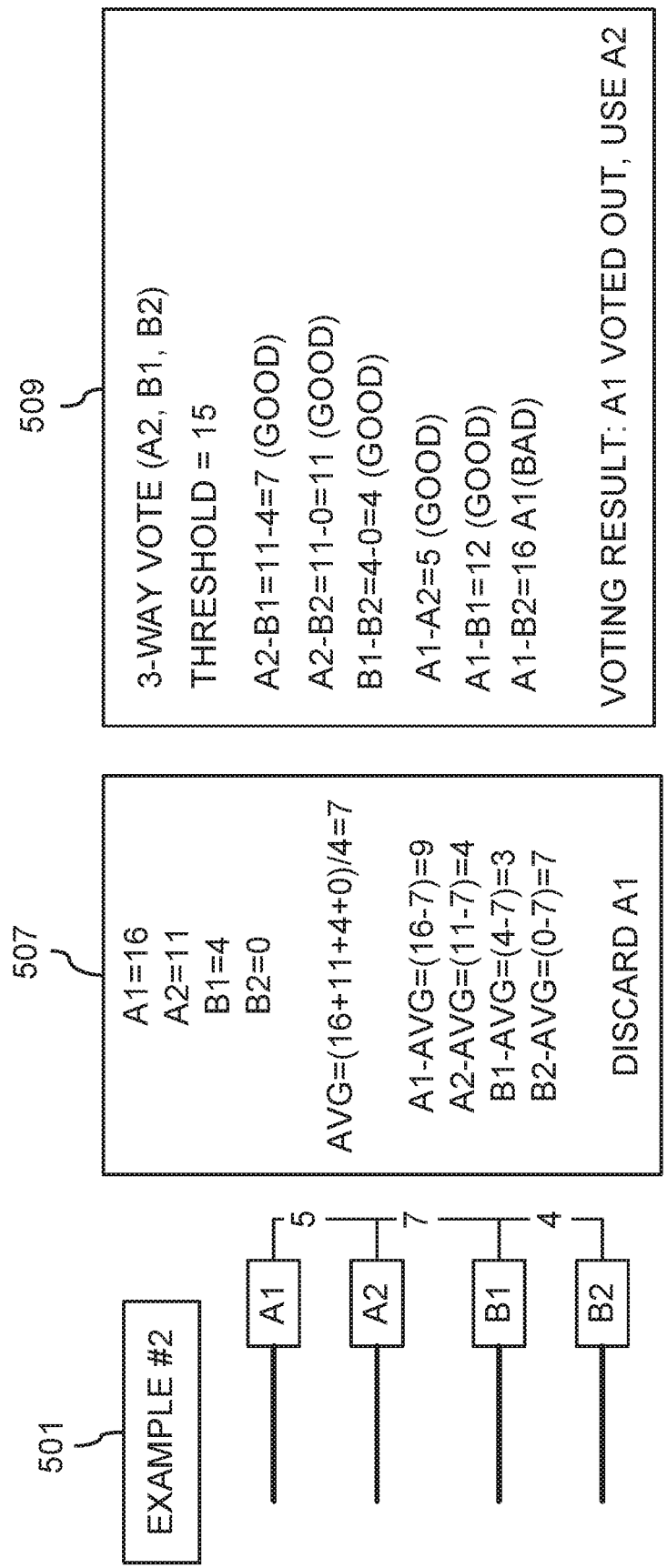

Referring now primarily to FIG. 7B, example2 501 of voting can include first computations 507 in which processor values for processors A1-B2 43A-43D (FIG. 2C/D) can be averaged and can be compared to the computed average. The processor having the largest difference from the average, in example2 501, processor A1 43A (FIG. 2C), is discarded. Second computations 509 can include comparisons between processor values of the remaining three processors A2/B1/B2 43B-43D (FIG. 2C/D). In example2 501, none of the differences exceeds the exemplary threshold of fifteen. Comparisons can be taken between the processor value of discarded processor A1 43A (FIG. 2C) and the processor values of the three remaining processors A2/B1/B2 43B-43D (FIG. 2C/D). In example2 501, one of the differences, the difference between the processor values of processor A1 43A (FIG. 2C) and processor B2 43D (FIG. 2D), exceeds the exemplary threshold of fifteen. Since one difference exceeds the exemplary threshold, the processor value from discarded processor A1 43A (FIG. 2C) can be voted out. The voting result from example2 501 is that any of processor values from processors A2/B1/B2 43A-43D (FIG. 2C/D) can be selected because processor A1 43A (FIG. 2C) was voted out.

Figure 7C:
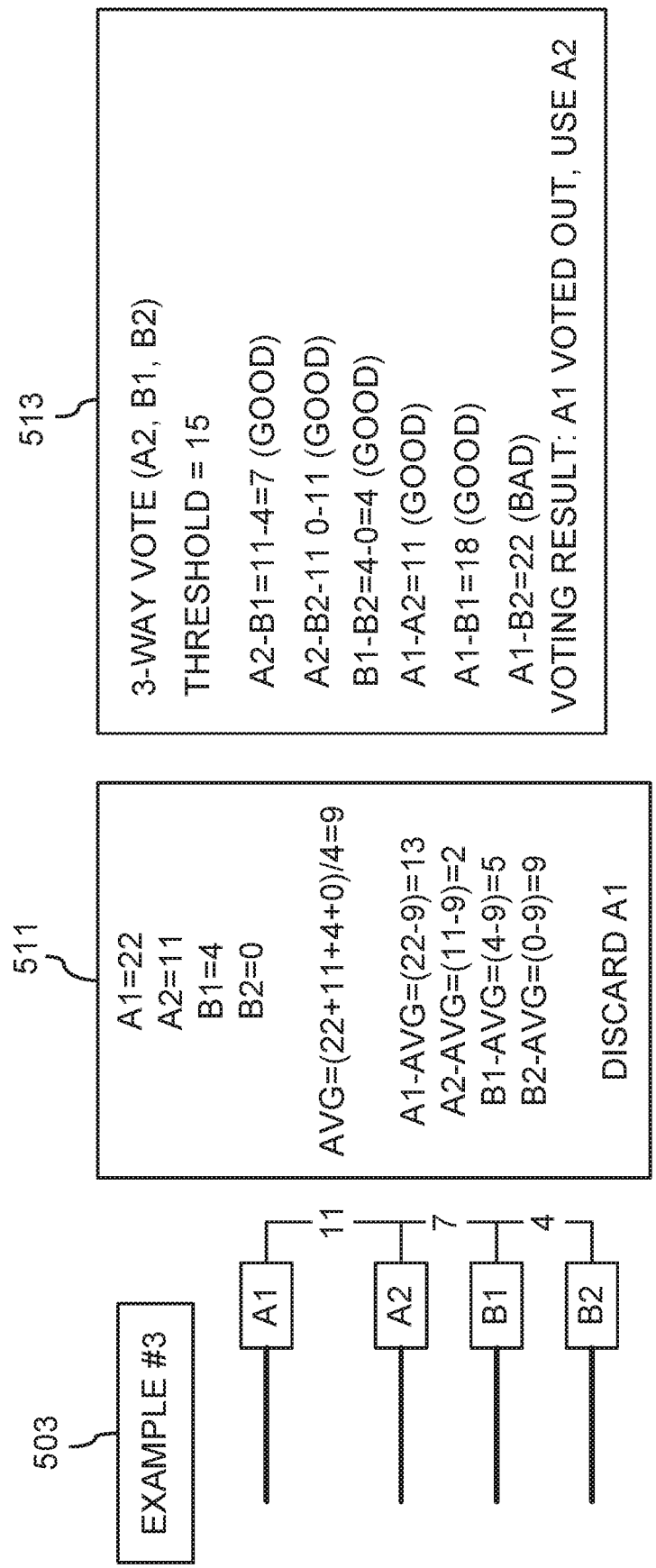

Referring now primarily to FIG. 7C, example3 503 of voting can include first computations 511 in which processor values for processors A1-B2 43A-43D (FIG. 2C/D) can be averaged and can be compared to the computed average. The processor having the largest difference from the average, in example3 503, processor A1 43A (FIG. 2C), is discarded. Second computations 513 can include comparisons between processor values of the remaining three processors A2/B1/B2 43B-43D (FIG. 2C/D). In example3 511, none of the differences exceeds the exemplary threshold of fifteen. Comparisons can be taken between the processor value of discarded processor A1 43A (FIG. 2C) and the processor values of the three remaining processors A2/B1/B2 43B-43D (FIG. 2C/D). In example3 511, two of the differences, the differences between processor A1 43A (FIG. 2C) and processors B1/B2 43C/43D (FIG. 2C/D), exceed the exemplary threshold of fifteen. Since at least one difference exceeds the exemplary threshold, the processor value from discarded processor A1 43A (FIG. 2C) can be voted out.

Figure 7D:
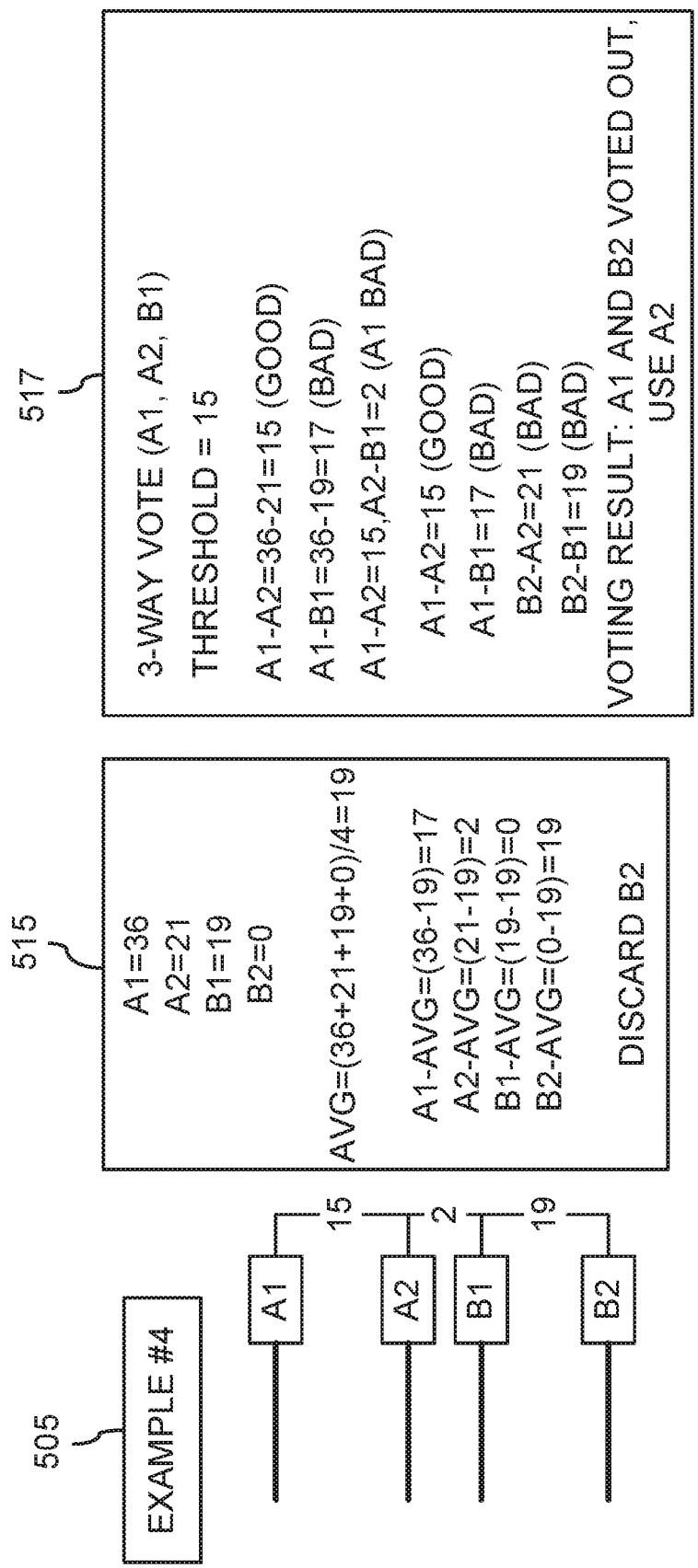

Referring now primarily to FIG. 7D, example4 505 of voting can include first computations 515 in which processor values for processors A1-B2 43A-43D (FIG. 2C/D) can be averaged and can be compared to the computed average. The processor having the largest difference from the average, in example4 515 processor B2 43D (FIG. 2D), is discarded. Second computations 517 can include comparisons between processor values of the remaining three processors A1/A2/B1 43A-43C (FIG. 2C/D). In example4 505, the difference between processor values of processors A1/B1 43A/C (FIG. 2C/d) exceeds the exemplary threshold of fifteen. Comparisons can be taken between the processor values of processors A1/B1 43A/C (FIG. 2C/D) with remaining processor A2 43B (FIG. 2C). In example4 505, the difference between the processor values of processors A1/A2 43A/B (FIG. 2C) equals the threshold value of fifteen, therefore, between the two processors, A1/B1 43A/C (FIG. 2C/D), processor A1 43A (FIG. 2C) can be discarded. Comparisons can be taken between the processor values of discarded processors A1/B2 43A/43D (FIG. 2C/D) and the processor values of the two remaining processors A2/B1 43B-43C (FIG. 2C/D). In example4 505, one of the differences, the difference between the processor values of processor A1 43A (FIG. 2C) and processor A2 43B (FIG. 2C), does not exceed the exemplary threshold of fifteen. Therefore, the processor value from processors A1 and B2 43A/D (FIG. 2C/D) can be voted out. The voting result from example4 505 is that the processor value from either processor A2 43B (FIG. 2C) or B1 43C (FIG. 2D) can be selected and A2 43B (FIG. 2C) is selected in example4 505.

Figure 8A:
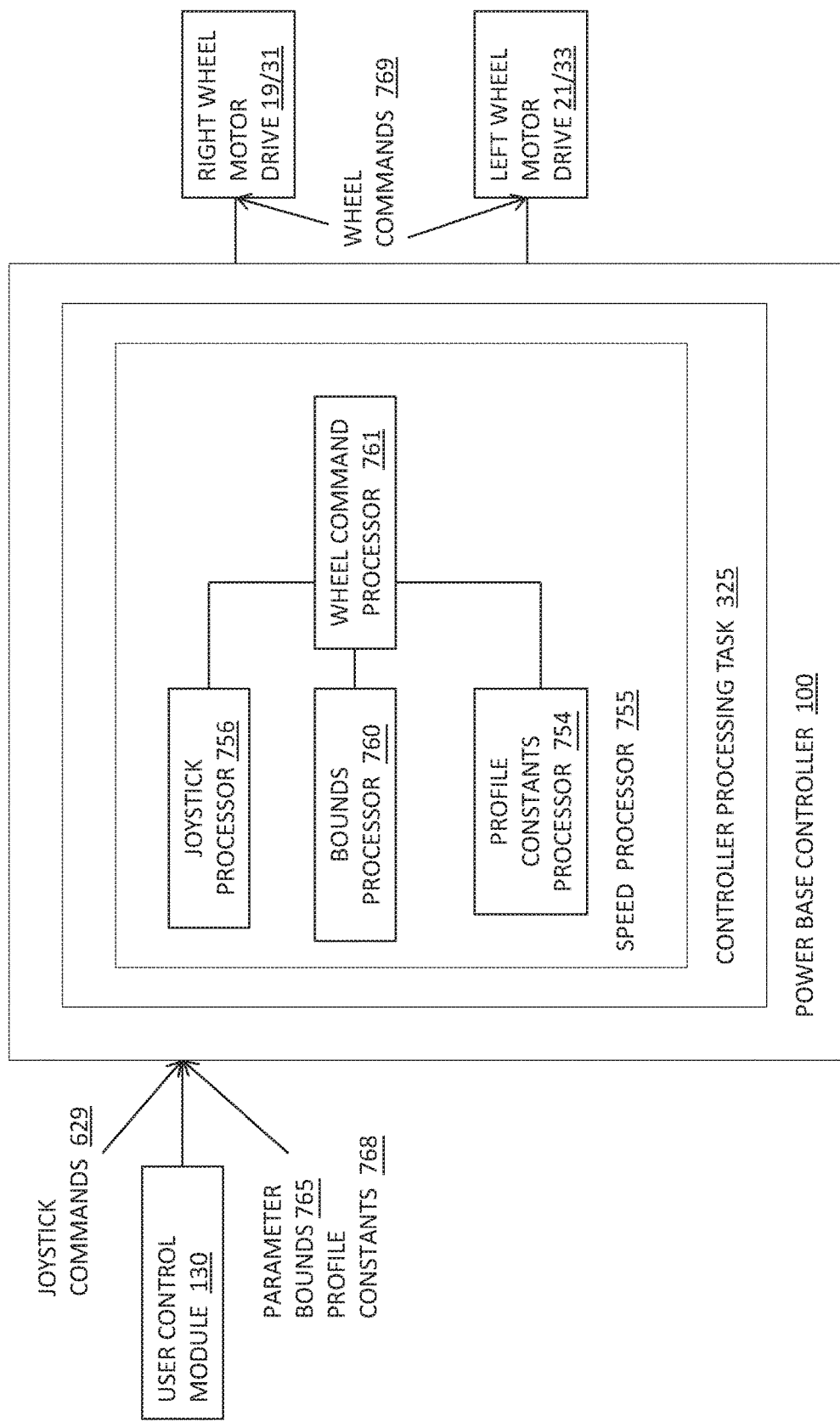
FIG. 8A is a schematic block diagram of the speed processor of the present teachings.

Referring now to FIG. 8A, speed processor 755 can accommodate a continuously adjustable scaled factor to control mobility device 120 (FIG. 1A). A user and/or clinician can set at least one parameter bound 765 that can be adjusted according to the driving needs of the user and/or clinician. Wheel commands 769 can be calculated as a function of joystick input 629 and profile constants 768 that can include, but are not limited to including, $k_s$ 601/607 (FIG. 9A), $k_a$ 603/609 (FIG. 9A), $k_d$ 605/611 (FIG. 9A), and $k_m$ 625 (FIG. 9A), where $k_s$ 601/607 (FIG. 9A) is a maximum speed range, $k_a$ 603/609 (FIG. 9A) is an acceleration range, $k_d$ 605/611 (FIG. 9A) is a deadpan range, $k_m$ 625

(FIG. 9A) is a merge range, and $k_w$ is a conversion from wheel counts to speed. Ranges of profile constants $k_s$, $k_a$, $k_d$, and $k_m$ 625 (FIG. 9A) can vary, ranges provided herein are exemplary. Parameter bounds 765 and profile constants 768 can be supplied by, for example, but not limited to, the user, can be pre-set, and can be determined in any other way. Speed processor 755 can access parameter bounds 765 and profile constants 768. Exemplary ranges for profile constants 768 can include:

$k_s$=Max Speed value, can scale from, for example, but not limited to, 1-4 m/s $k_a$=Acceleration value, can scale from, for example, but not limited to, 0.5-1.5

$k_d$=Deadband value, can scale from, for example, but not limited to, 0-5.5

$k_m$=Merge value, can scale from, for example, but not limited to, 0-1

Figure 9A:
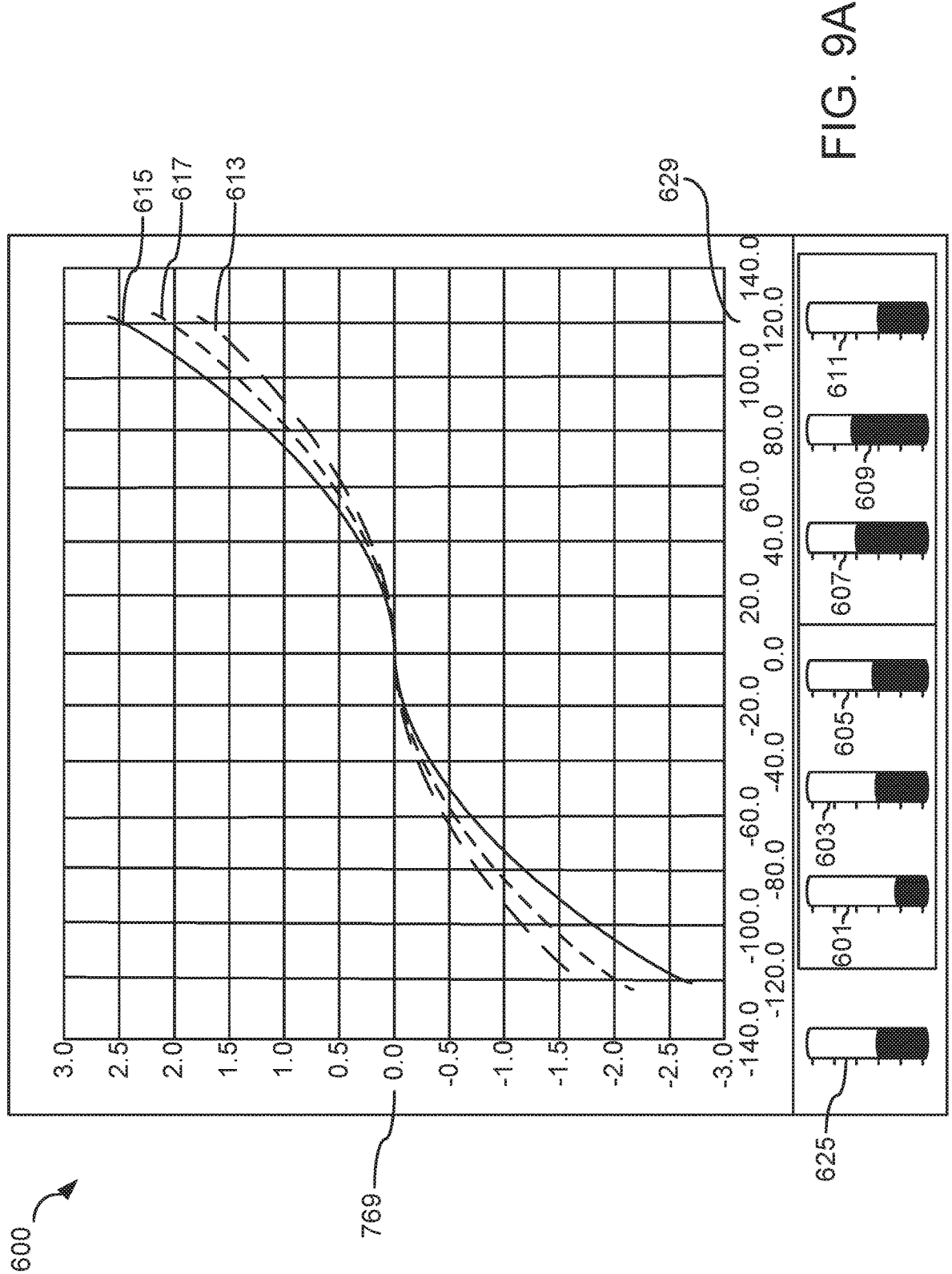
FIGS. 9A and 9B are graphical representations of joystick control profiles of the present teachings.

$k_{s,m} = k_{s,1}(1-k_m) + k_m k_{s,2}$ $k_{a,m} = k_{a,1}(1-k_m) + k_m k_{a,2}$ $k_{d,m} = k_{d,1}(1-k_m) + k_m k_{d,2}$ where $k_{x,1}$ is the minimum of the range of gain $k_x$, and $k_{x,2}$ is maximum of the range of gain $k_x$, where x=s or a or m. Exemplary parameter bounds 765 can include:

$J_{max}$=Max Joystick Cmd $C_1$=First Order Coeff=$k_{d,m}$ $C_3$=Third Order Coeff=$k_{s,m}$ where $k_{d,m}$ is the gain $k_d$ of the merger of profile A 613 (FIG. 9A) and profile B 615 (FIG. 9A), and where $k_{s,m}$ is the gain $k_s$ of the merger of profile A 613 (FIG. 9A) and profile B 615 (FIG. 9A).

$k_w$ = wheel counts per $m/s$ $V_{max}$ = Max Command = $C_1 J_{max} + C_3 J_{max}^3$ $k_p$ = Proportional Gain = $\dfrac{k_w C_s}{V_{max}}$ Exemplary computations for wheel command 769 can include:

$J_i$ = Joystick $Cmd$ $W_i = k_{p,m}(k_{d,m} J_i + C_3 J_i^3)$, wheel $\dfrac{\text{velocity}}{\text{yaw}}$ command where $W_i$ 769 is the velocity or yaw command that is sent to right/left wheel motor drive 19/31, 21/33.

Continuing to refer primarily to FIG. 8A, adjusting $C_3$ can adjust the shape of the curve of the profile and therefore the user experience when user commands, for example, but not limited to, joystick commands 629, are converted to wheel commands 769. In particular, adjusting $C_3$ can adjust the size of deadband 605-611 (FIG. 9A) and the maxima and minima on either side of deadband 605-611 (FIG. 9A). Speed processor 755 can include, but is not limited to including, joystick processor 756 including computer instructions to receive joystick commands 629, and profile constants processor 754 including computer instructions to access profile constants 768 and merge value 625 (FIG. 9A), and to scale profile constants 768 based at least on merge value 625 (FIG. 9A), for example, but not limited to, as shown in equations set out herein. Speed processor 755 can also include bounds processor 760 including computer instructions to compute a maximum velocity based at least on profile constants 768 and a maximum joystick command, and to compute a proportional gain based at least on profile constants 768 and the maximum velocity, as shown, for example, but not limited to, in equations set out herein. Speed processor 755 can also include wheel command processor 761 including computer instructions to compute wheel command 769 based at least on profile constants 768 and joystick commands 629, as shown, for example, but not limited to, in equations set out herein, and provide wheel commands 769 to wheel motor drives 19/31/21/33.

Figure 8B:
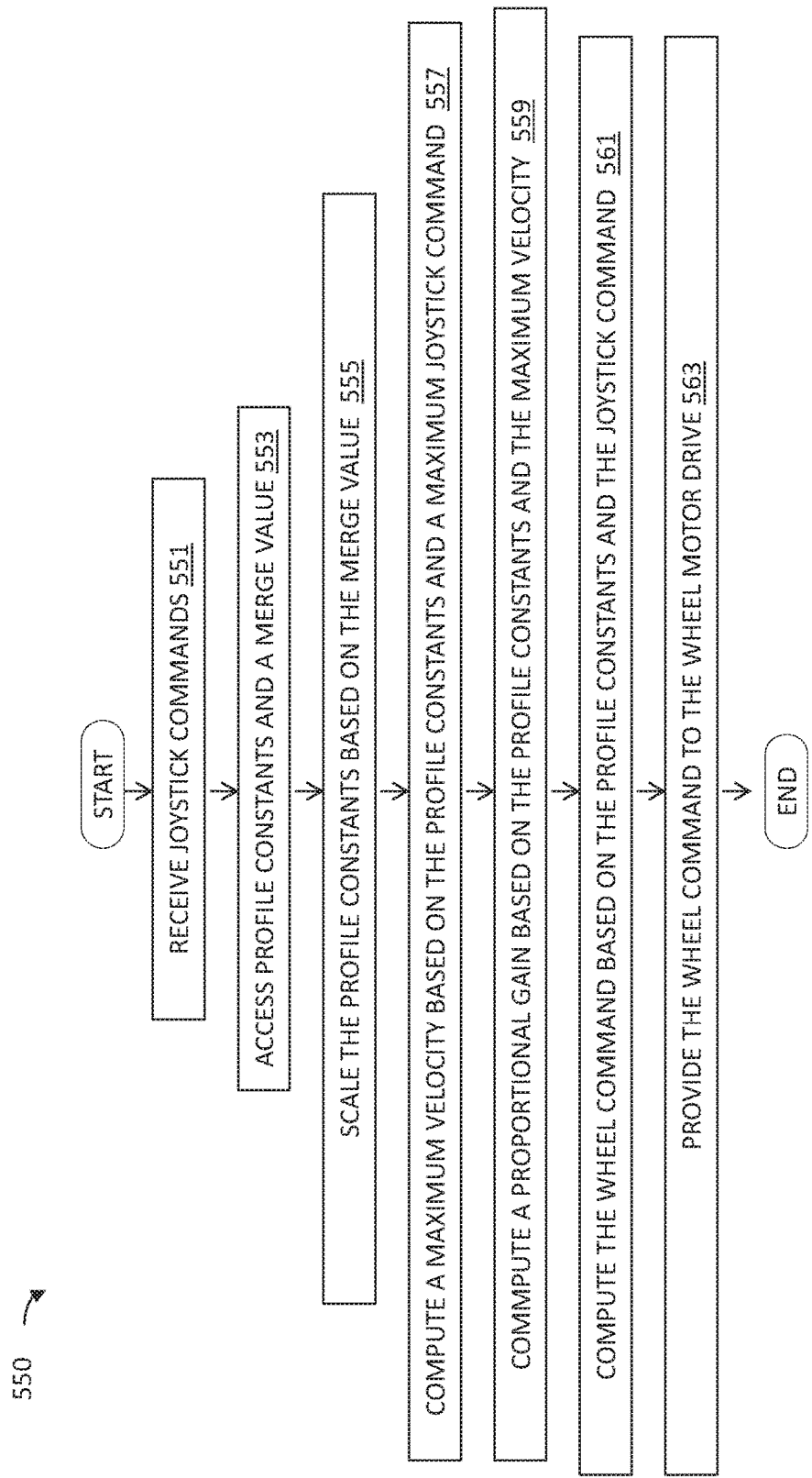
FIG. 8B is a flowchart of a method for modifying the speed of the mobility device based on several factors.

Referring now primarily to FIG. 8B, method 550 for accommodating a continuously adjustable scale factor can include, but is not limited to including, receiving 551 joystick commands 629 (FIG. 8A), accessing 553 profile constants 768 (FIG. 8A) and a merge value (shown exemplarily as merge value 625 (FIG. 9A) which portrays the merger of profile A 613 (FIG. 9A) and profile B 615 (FIG. 9A)), scaling 555 profile constants 768 (FIG. 8A) based at least on the merge value, computing 557 a maximum velocity based at least on profile constants 768 (FIG. 8A) and a maximum joystick command (shown exemplarily as the maximum of speed 601 (FIG. 9A), acceleration 603 (FIG. 9A), and deadband 605 (FIG. 9A)), computing 559 a proportional gain based at least on profile constants 768 (FIG. 8A) and the maximum velocity, computing 561 wheel command 769 (FIG. 8A) based at least on profile constants 768 (FIG. 8A) and joystick commands 629 (FIG. 8A), and providing 563 wheel commands 769 (FIG. 8A) to wheel motor drives 19/31/21/33 (FIG. 8A). In some configurations, power base controller 100 can modify joystick command 629 provided by user control module 130 before joystick commands 629 are provided to joystick processor 756. In some configurations, user control module 130 could be receiving joystick commands 629 from a joystick, whereas in some configurations, user control module 130 can include the joystick.

Referring now primarily to FIG. 9A, a user and/or clinician can use a graphical user interface display that could be, for example, but not limited to, included in user control module 130 (FIG. 2A), to configure drive options in the form of joystick command shaping that can allow the user and/or clinician to configure mobility device 120 (FIG. 1A) for driving preferences. Templates can be provided for the user/clinician to set or pre-set profile constants 768 (FIG. 8A) that can place mobility device 120 (FIG. 1A) in at least one mode, for example, but not limited to, sport mode, comfort mode, or economy mode. In economy mode, for example, speed and acceleration can be limited to reduce power consumption. In sport mode, the user could be allowed to drive aggressively by, for example, but not limited to, achieving maximum speeds. Comfort mode can represent an average between economy and sport modes. Other modes can be possible. Profile constants $k_s$ 601/607, $k_a$ 603/609, $k_d$ 605/611, and $k_m$ 625 can be adjusted through, for example, but not limited to, variable display items, and wheel command velocity W 627 can be computed and graphed based at least on adjusted $k_s$ 601/607, $k_a$ 603/609, $k_d$ 605/611, and $k_m$ 625. For example, profiles A/B 613/615 can result from adjusting speed and deadpan ranges such that $k_s$ 601 and $k_s$ 607 differ, and $k_d$ 605 and $k_d$ 611 are similar.

Wheel command velocity W 627 can be computed and graphed for a range of joystick command counts 629 for both the minimum values (profile A 613) of $k_s$ 601/607, $k_a$ 603/609, $k_d$ 605/611, and $k_m$ 625 and the maximum values (profile B 615) of $k_s$ 601/607, $k_a$ 603/609, $k_d$ 605/611, and $k_m$ 625. Profile A 613 and profile B 615 can be averaged for an easier comparison with other configurations of profile constants $k_s$ 601/607, $k_a$ 603/609, $k_d$ 605/611, and $k_m$ 625. For example, first joystick control graph 600 indicates that an average wheel command 617 of 1.5 m/s at 100 joystick command counts results from a first configuration of $k_s$ 601/607, $k_a$ 603/609, $k_d$ 605/611, and $k_m$ 625.

Figure 9B:
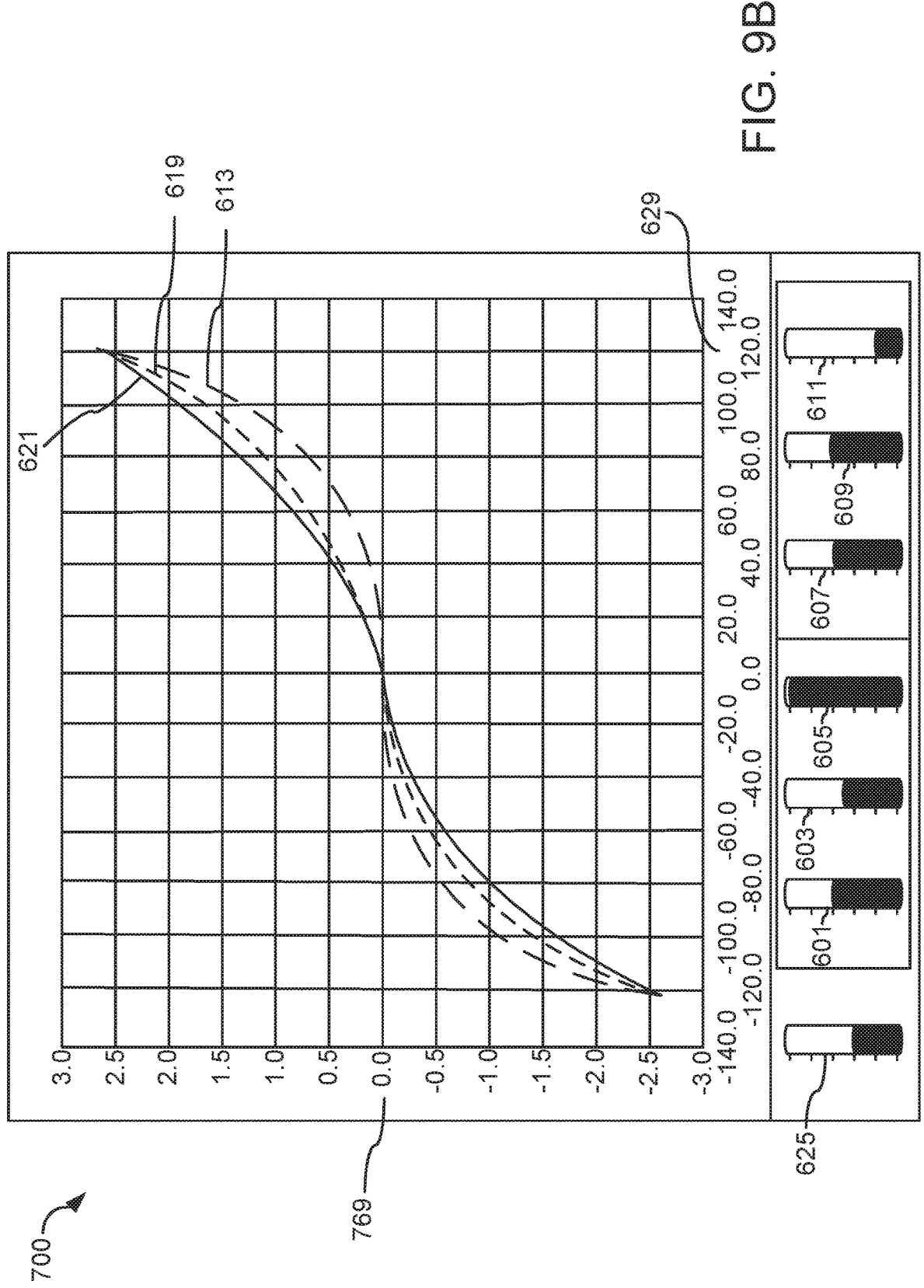

Referring now to FIG. 9B, when $k_s$ 601 and $k_s$ 607 are similar, and $k_d$ 605 and $k_d$ 611 differ, wheel command velocity W 627 can be computed and graphed for a range of joystick command counts 629 for both the minimum values (profile A 623) of $k_s$ 601/607, $k_a$ 603/609, $k_d$ 605/611, and $k_m$ 625 and the maximum values (profile B 621) of $k_s$ 601/607, $k_a$ 603/609, $k_d$ 605/611, and $k_m$ 625. Profile A 623 and profile B 621 can be averaged and compared to other configurations of profile constants $k_s$ 601/607, $k_a$ 603/609, $k_d$ 605/611, and $k_m$ 625. For example, second joystick control graph 700 indicates that an average wheel command 617 of 1.75 m/s at 100 joystick command counts results from a second configuration of profile constants $k_s$ 601/607, $k_a$ 603/609, $k_d$ 605/611, and $k_m$ 625. Changes to $k_a$ 603 and $k_a$ 609 can scale filter constants in each driving sub-mode (driving sub-modes are described, for example, in '664 and '892). Further, joystick command 629 can be filtered by a joystick filter to enable speed-sensitive steering by managing accelerations. For example, a relatively low corner frequency CF of the joystick filter can result in a relatively high damped response between joystick commands 629 and activity of mobility device 120 (FIG. 1A). For example, the corner frequency CF can be an adjustable function of speed which could result in, for example, but not limited to, a relatively high relationship between joystick commands 629 and wheel command velocity $W_1$ 769 when mobility device 120 (FIG. 1A) is traveling at a relatively high speed, and a relatively lower relationship between joystick commands 629 and wheel command velocity $W_i$ 769 when mobility device 120 (FIG. 1A) is traveling at a relatively low speed. For example, wheel command velocity $W_i$ 769 can be compared to a full speed threshold T and the corner frequency CF can be set according to the result of the comparison. In some configurations, if wheel command velocity $W_i$ 769 is less than a value based at least on the threshold T, the corner frequency CF can be set to a first value, or if wheel command velocity $W_i$ 769 is less than the threshold T, the corner frequency CF can be set to another value, for example $(W_i*CF)/T$. Deceleration rate and acceleration rate can be managed separately and can be independent of one another. For example, deceleration rate may not be allowed to be as aggressive as acceleration rate. The deceleration rate can, for example, depend on the acceleration rate or can dynamically vary in some other way, or can be a fixed value. The user can, for example, control the deceleration rate.

Figure 10A:
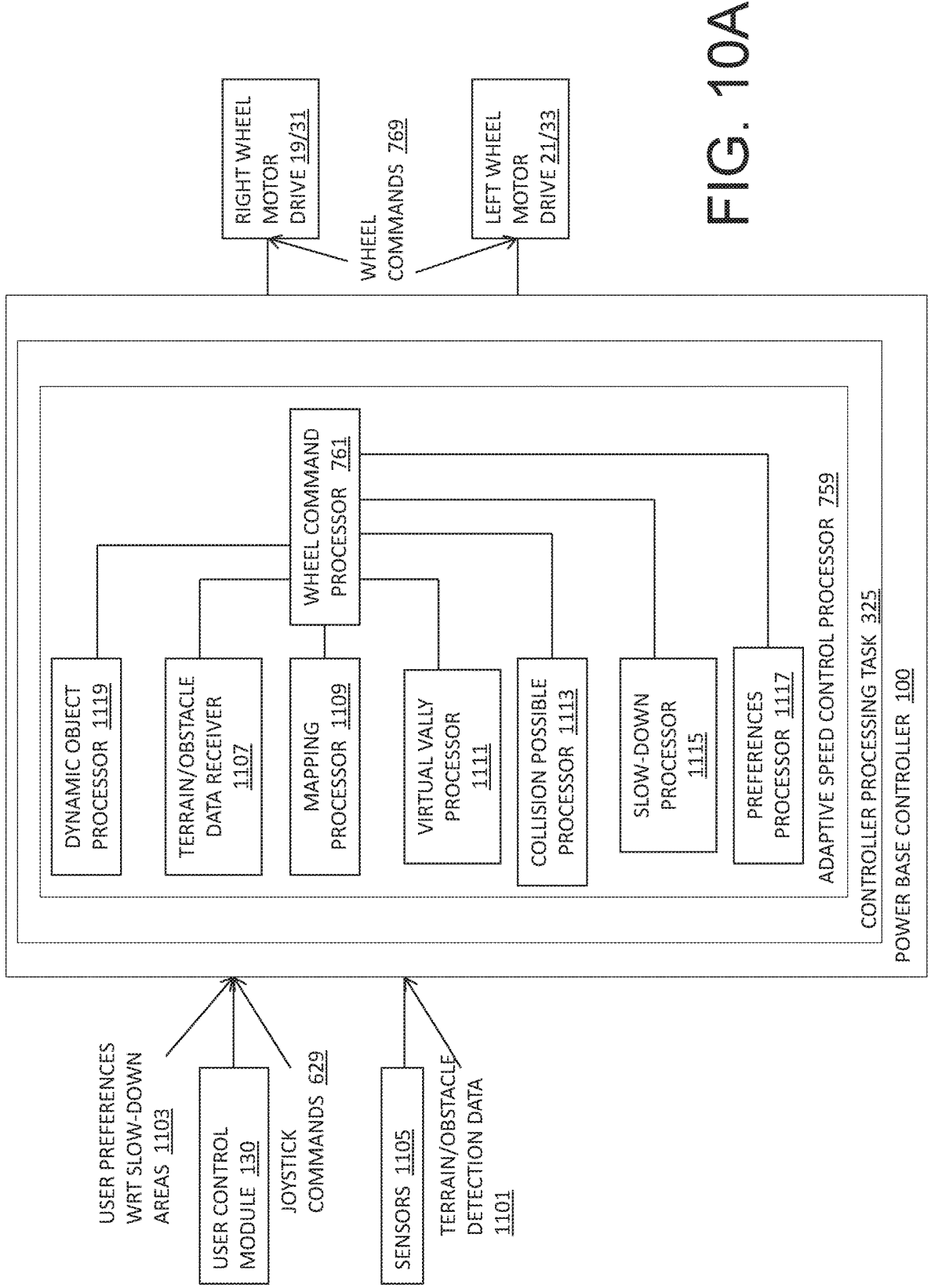
FIG. 10A is a schematic block diagram of the adaptive speed control processor of the present teachings.

Referring now to FIG. 10A, adaptive speed control processor 759 for adaptive speed control of mobility device 120 (FIG. 1A) can include, but is not limited to including, terrain/obstacle data receiver 1107 including computer instructions to receive terrain and obstacle data in the vicinity of mobility device 120 (FIG. 1A). By using terrain and obstacle detection sensors for example, but not limited to, Lidar, remote sensing technology can measure distance by illuminating a target with a laser and analyzing the reflected light, stereo cameras, and radar. Adaptive speed control processor 759 can also include mapping processor 1109 including computer instructions to map obstacles and approaching terrain in real time based at least on the terrain and obstacle data. Adaptive speed control processor 759 can further include virtual valley processor 1111 including computer instructions to compute virtual valleys based at least on the mapped data. Virtual valley processor 1111 can delineate a sub-area referred to herein as a virtual valley in the vicinity of mobility device 120 (FIG. 1A). The virtual valley can include at least one low point, gradual and/or dramatic elevation increases from the at least one low point, and at least one rim surrounding the at least one low point in which the gradual and/or dramatic elevation increases terminate at the rim. In the virtual valley, a relatively high wheel command 769 can be required to turn out of the virtual valley, possibly pre-disposing mobility device 120 (FIG. 1A) to stay in the low point of the virtual valley. Adaptive speed control processor 759 can further include collision possible processor 1113 including computer instructions to compute collision possible areas based at least on the mapped data. Collision possible areas can be sub-areas in which, when in the vicinity of mobility device 120 (FIG. 1A), adaptive speed control processor 759 can make it difficult to steer mobility device 120 (FIG. 1A). Collision possible areas can, for example, prevent mobility device 120 (FIG. 1A) from running into objects. The position of mobility device 120 (FIG. 1A) can be measured from, for example, any part or parts of mobility device 120 (FIG. 1A), for example, the center, the periphery, or anywhere in between. Adaptive speed control processor 759 can further include slow-down processor 1115 including computer instructions to compute slow-down areas based at least on the mapped data and the speed of mobility device 120 (FIG. 1A). Adaptive speed control processor 759 can slow mobility device 120 (FIG. 1A) in the slow-down areas. Adaptive speed control processor 759 can further make it difficult to turn into slow-down areas relative to turning into non-slow-down areas. Adaptive speed control processor 759 can recognize any number of types of slow-down areas, each having a set of characteristics. For example, adaptive speed control processor 759 can adjust the processing of fore-aft commands to mobility device 120 (FIG. 1A) in some types of slow-down areas differently than in others. In some configurations, the size of the different types of slow-down areas can change as the speed of mobility device 120 (FIG. 1A) changes. Adaptive speed control processor 759 can still further include preferences processor 1117 including computer instructions to receive user preferences with respect to the slow-down areas. Adaptive speed control processor 759 can include wheel command processor 761 including computer instructions to compute wheel commands 769 based at least on, for example, but not limited to, the virtual valleys, the collision possible areas, the slow-down areas, and the user preferences, and provide wheel commands 769 to wheel motor drives 19/31/21/33. When adaptive speed control processor 759 detects that mobility device 120 (FIG. 1A) has entered, for example, a collision possible area, adaptive speed control processor 759 can, for example, move mobility device 120 (FIG. 1A) away from the collision possible area and can also move mobility device 120 (FIG. 1A) in an alternate direction to the direction opposite the collision possible area, for example, a direction parallel to the collision possible area, or a direction that moves mobility device 120 (FIG. 1A) into a collision free area.

Figure 10B:
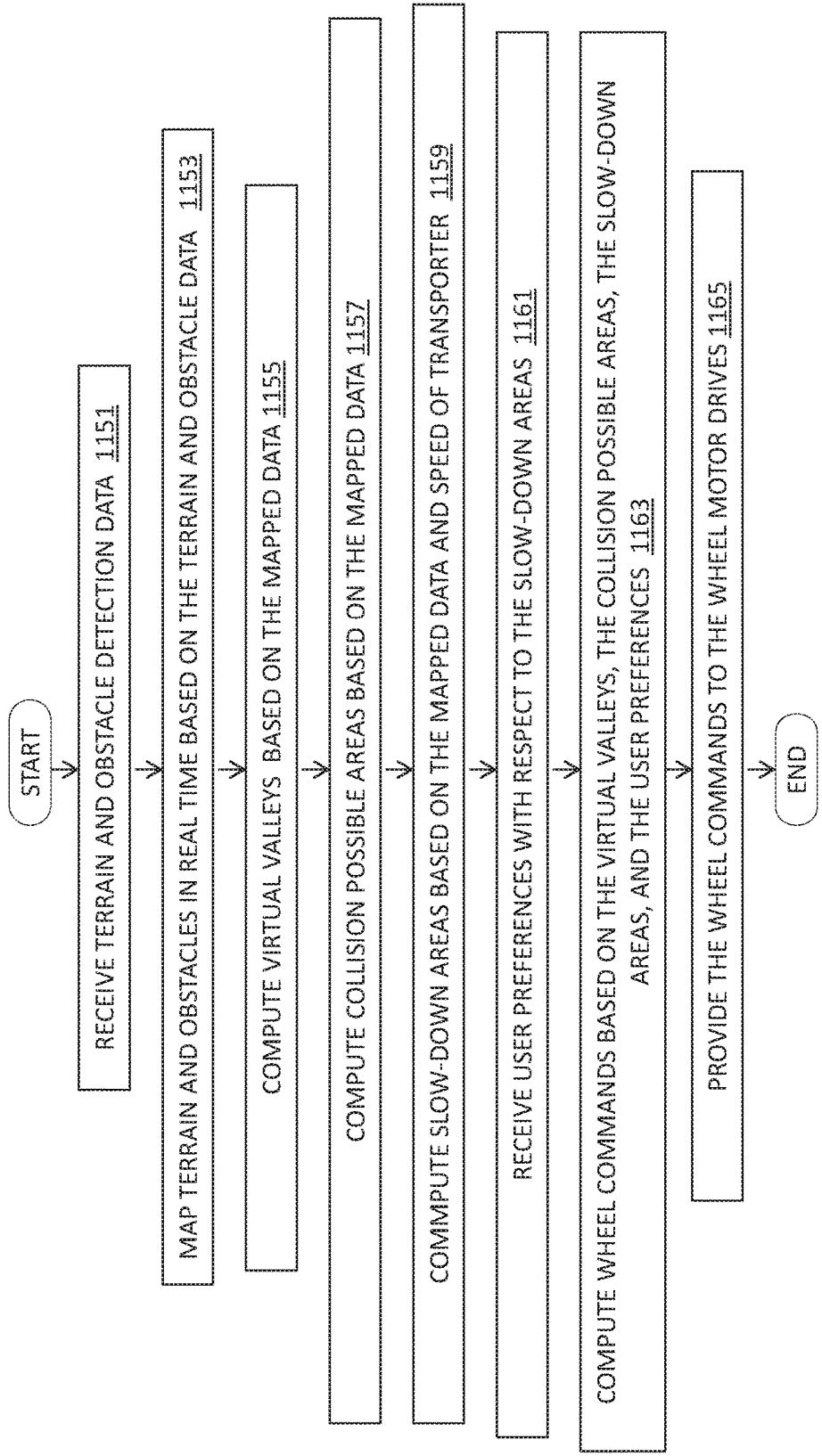
FIG. 10B is a flowchart of a method for modifying the speed of the mobility device based on several factors.

Referring now primarily to FIG. 10B, method 1150 for adaptive speed control of mobility device 120 (FIG. 1A) can include, but is not limited to including, receiving 1151 terrain and obstacle detection data, mapping 1153 terrain and obstacles, if any, in real time based at least on the terrain and obstacle detection data, optionally computing 1155 virtual valleys, if any, based at least on the mapped data, computing 1157 collision possible areas, if any, based at least on the mapped data, computing 1159 slow-down areas if any based at least on the mapped data and the speed of mobility device 120 (FIG. 1A), receiving 1161 user preferences, if any, with respect to the slow-down areas and desired direction and speed of motion, computing 1163 wheel commands 769 (FIG. 10A) based at least on the collision possible areas, the slow-down areas, and the user preferences and optionally the virtual valleys, and providing 1165 wheel commands 769 (FIG. 10A) to wheel motor drives 19/31/21/33 (FIG. 10A). Collision possible areas can include discrete obstacles that can include a buffer that can follow the contour of the discrete obstacle, or can follow a type of outline, for example, but not limited to, a polygon, enclosing the discrete obstacle. Collision possible areas can also include a number of discrete obstacles viewed as a single discrete obstacle. The transition area between one sub-area and another can be, for example, abrupt or gradual. The shape of a virtual valley can be dynamic based at least upon the position of mobility device 120 (FIG. 1A) in the virtual valley.

Figure 10C:
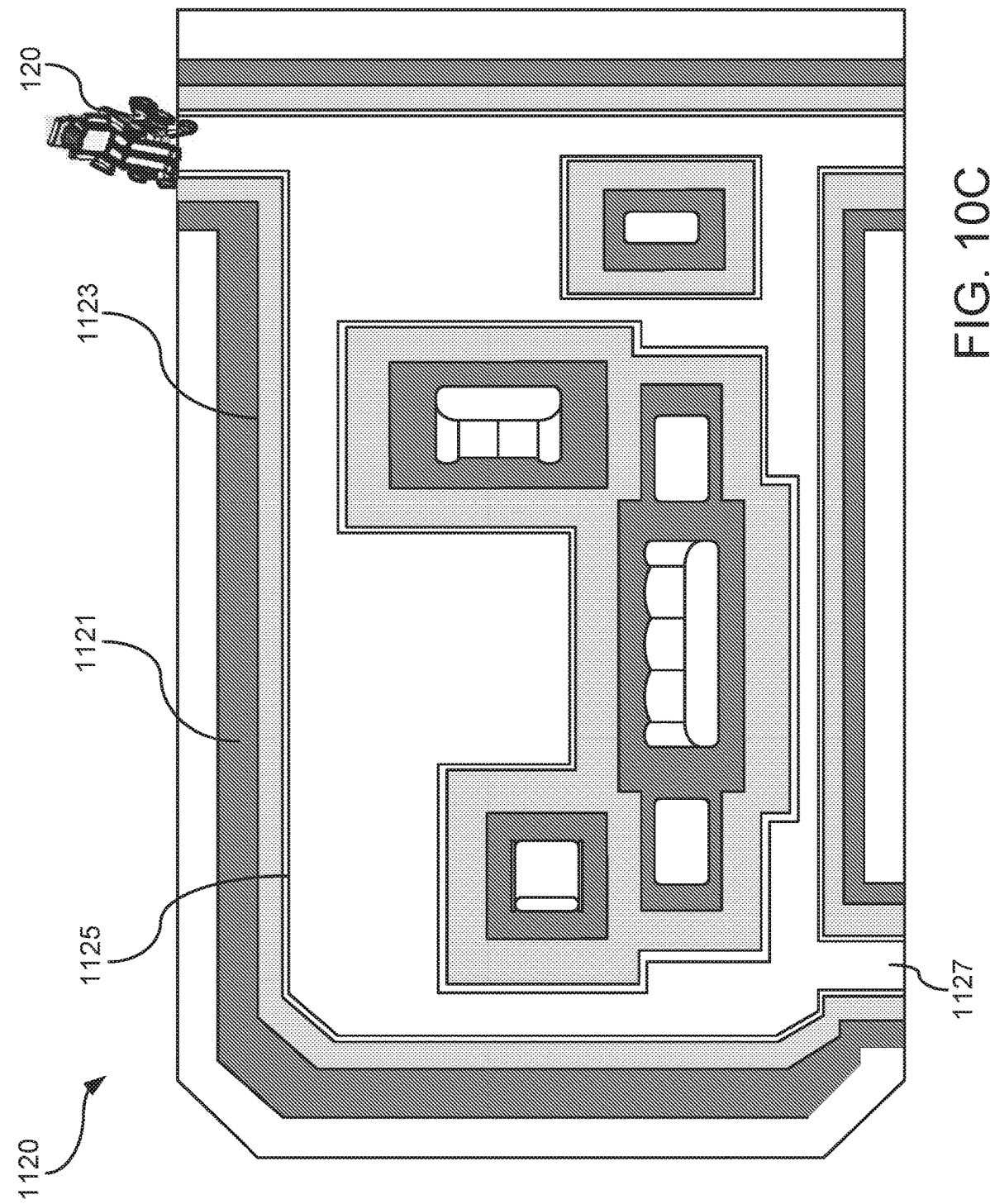
FIGS. 10C-10E are pictorial descriptions of exemplary uses of the adaptive speed control of the present teachings.

Referring now to FIG. 10C, gradient map 1120 can be used to indicate to the user at, for example, but not limited to, user control module 130 (FIG. 2A), either periodically or dynamically updated, the sub-areas in the vicinity of mobility device 120. For example, collision possible areas 1121 can be places in which adaptive speed control processor 759 can make it automatically impossible to steer into and mobility device 120 can be automatically prevented from running into objects and can be, for example, but not limited to, steered to a different direction of travel. In some configurations, the position of mobility device 120 can be measured from the center of mobility device 120 and, in some configurations, the edge of mobility device 120 can be substantially near to the physical objects in the vicinity of mobility device 120. In some configurations, first slow-down areas 1125 can be places in which adaptive speed control processor 759 can automatically slow down mobility device 120 slightly and can make turning into first slow-down areas 1125 more difficult than turning into no-barriers sub-areas 1127. In some configurations, second slow-down areas 1123 can be places in which adaptive speed control processor 759 can automatically slow down fore-aft commands to mobility device 120 more than in first slow-down sub-areas 1125, and adaptive speed control processor 759 can automatically make turning into second slow-down sub-areas 1123 harder than turning into first slow-down sub-areas 1125.

Figure 10D:
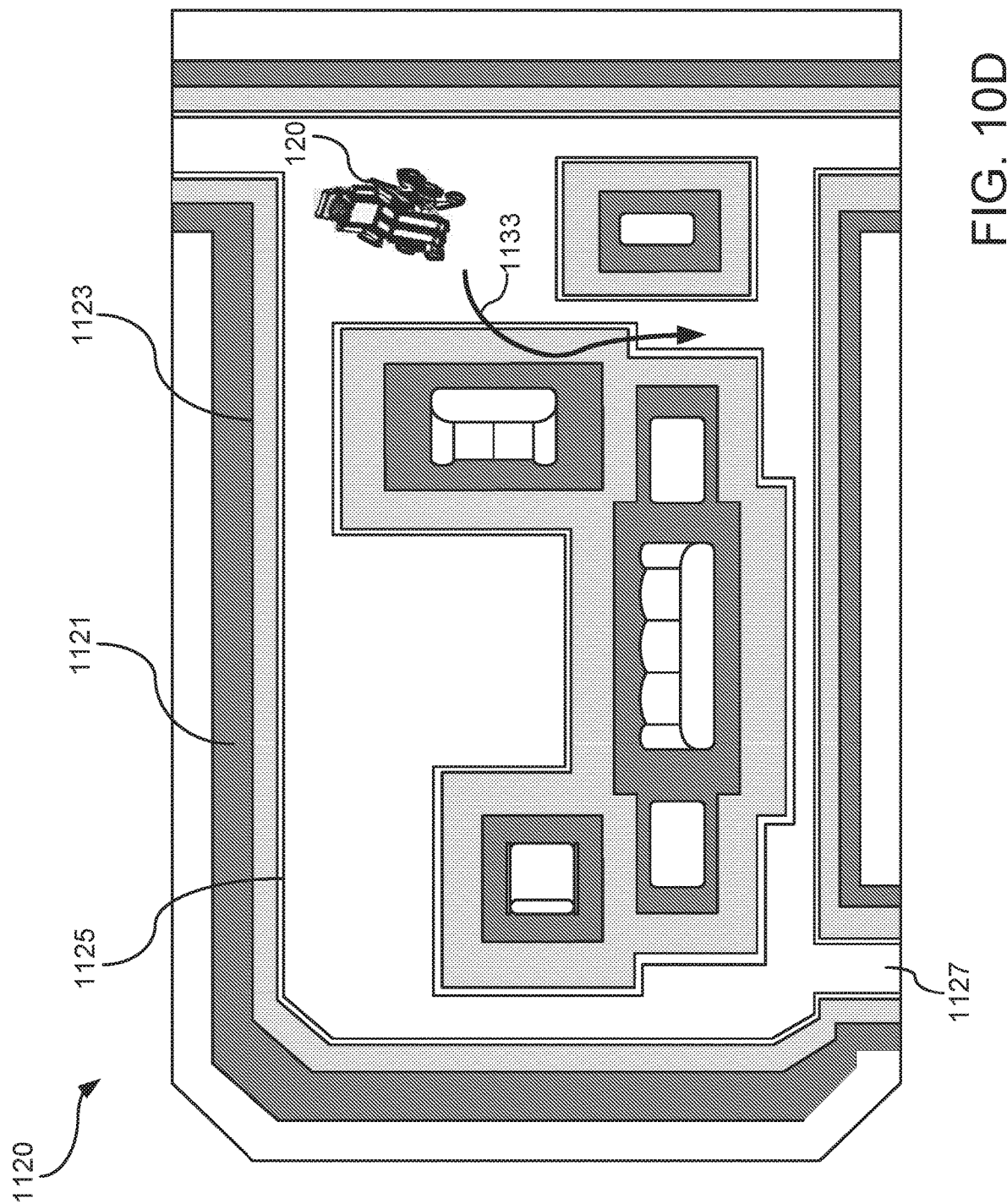

Referring now to FIG. 10D, path map 1130 can indicate path 1133 that mobility device 120 can follow when adaptive speed control processor 759 (FIG. 10A) recognizes special sub-areas in the vicinity of mobility device 120. As user control module 130 (FIG. 2A) receives forward velocity commands, mobility device 120, under the control of adaptive speed control processor 759 (FIG. 10A), can veer according to path 1133 towards no barriers sub-area 1127 and, for example, turn to a less collision-likely direction of travel.

Figure 10E:
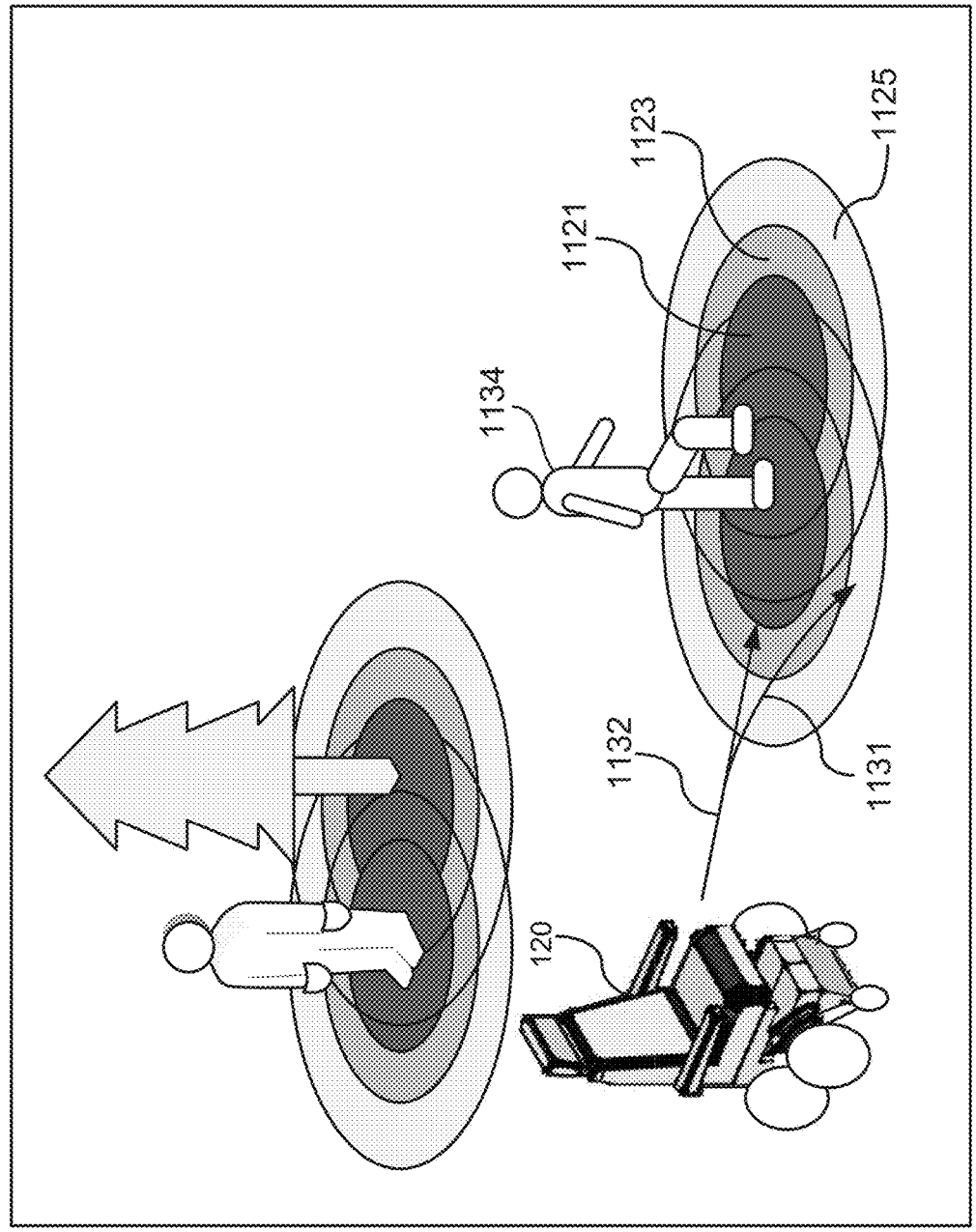

Referring now to FIG. 10E, adaptive speed control processor 759 can recognize objects that are moving (referred to herein as dynamic objects). Terrain/obstacle data receiver 1107 can receive from sensors 1105 terrain/obstacle detection data 1101 that is characteristic of non-stationary (dynamic) object 1134. Preferences processor 1117 can, for example, receive joystick commands 629 that indicate that straight path 1132 is the user-selected direction of travel, but when dynamic object 1134 is ahead of mobility device 120 and straight path 1132 would intersect with dynamic object 1134, dynamic object processor 1119 (FIG. 10A) can designate a set of sub-areas around dynamic object 1134 starting with first slow-down area 1125, then transitioning to second slow-down sub-area 1123, and finally transitioning to collision possible sub-area 1121. When sensors 1105 recognize the sub-areas in the vicinity of dynamic object 1134, slow-down processor 1115 can slow mobility device 120 when entering first slow-down sub-area 1125 and dynamic object processor 1119 can match the pace of dynamic object 1134 in second slow-down sub-area 1123. If preferences processor 1117 receives an aggressive forward command in first slow-down sub-areas 1125 and/or second slow-down sub-area 1123, or an oblique command, dynamic object processor 1119 can adjust path 1132 to veer as, for example, in path 1131, to follow the safest closest path past dynamic object 1134. Forward velocity commands, in the absence of adaptive speed control processor 759 (FIG. 10A), could have mobility device 120 follow path 1132 directly through first slow-down sub-area 1125, second slow-down sub-area 1123, and collision possible subarea 1121.

Figure 11A:
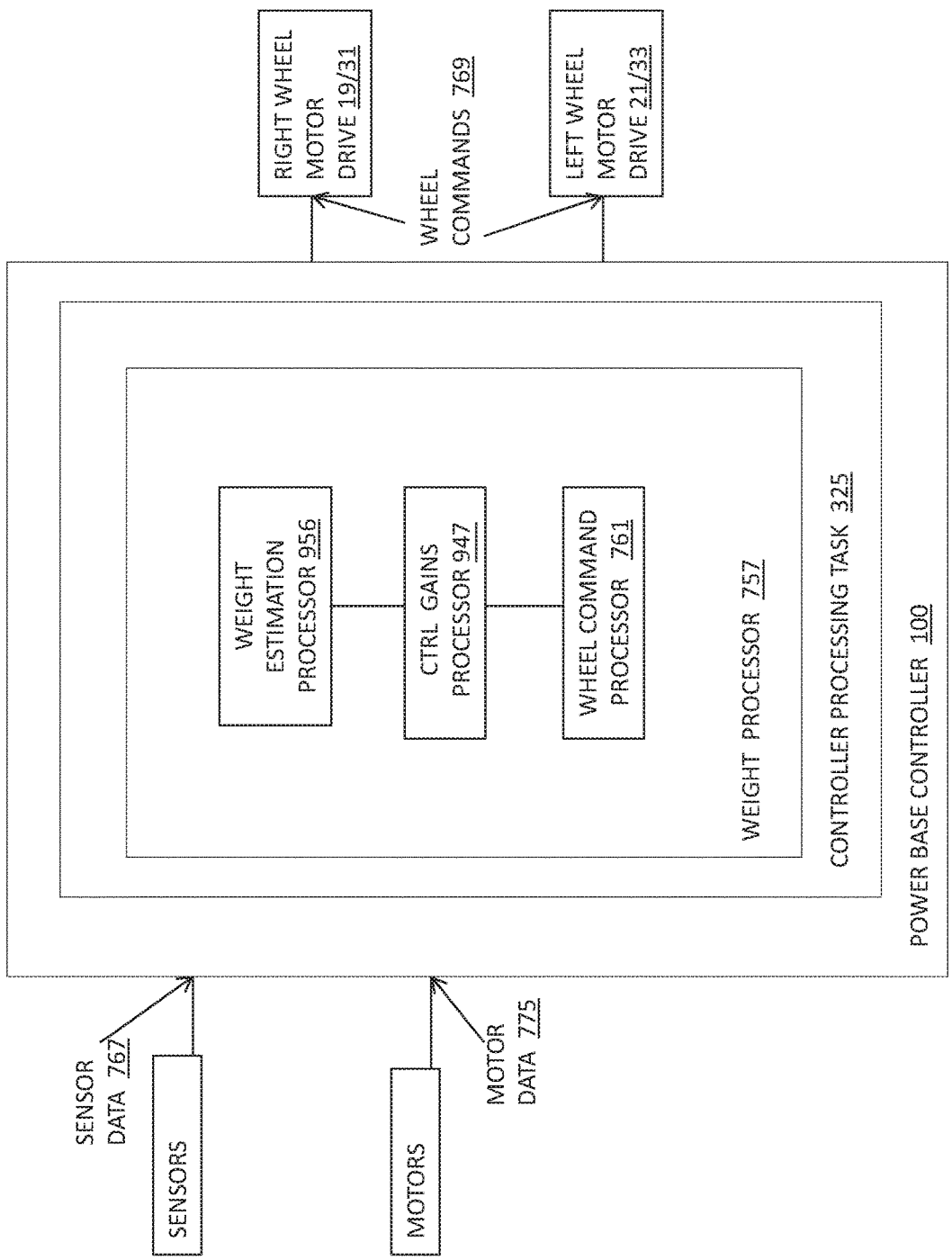
FIG. 11A is a schematic block diagram of the weight processor of the present teachings.

Referring now primarily to FIG. 11A, controller gains, for certain loads on mobility device 120 (FIG. 1A), can be a function of the weight of the load, and stability of mobility device 120 (FIG. 1A) can be a function of the controller gains. Controller gains can include, but are not limited to including, gains applied during enhanced mode 217 (FIG. 3B) to stabilize mobility device 120 when, for example, the load is light, or when transitioning into balance mode 219 (FIG. 3B). Power base controller 100 can include at least one default value for the center of gravity for mobility device 120 (FIG. 1A). The weight of the load on mobility device 120 (FIG. 1A) can determine which default value for the center of gravity is used. The weight of the load, and/or the change of weight of the load, and the chosen default value of the center of gravity can be used to adjust controller gains. Controller gains can include a range of discrete values or analog values. For example, if the load falls out of seat 105 (FIG. 1A), mobility device 120 (FIG. 1A) can experience relatively large accelerations resulting from a relatively small input torque. In some configurations, the change in load weight on seat 105 (FIG. 1A) can change the controller gain based at least on the load weight. Weight processor 757 can adjust the stability of mobility device 120 (FIG. 1A) based at least on the change in load weight. Weight processor 757 can determine the weight of the load based at least on, for example, but not limited to, motor current of seat motor 45/47 (FIG. 2C/D). Weight processor 757 can potentially detect unstable situations by, for example, but not limited to, processing collected pitch rate data using a rolling discrete fast Fourier transform, recognizing values of the resulting pitch rate frequency that could represent instability-generating changes, filtering the pitch rate frequencies based at least on the recognized values, squaring the filtered pitch rate frequencies, and analyzing the squared pitch rate frequencies based at least on known profiles of potential instability. Weight processor 757 for stabilizing mobility device 120 (FIG. 1A) can include, but is not limited to including, weight estimation processor 956 including computer instructions to estimate the weight of a load on mobility device 120 (FIG. 1A), controller gains processor 947 including computer instructions to compute controller gains based at least on the weight, and wheel command processor 761 applying the controller gains to control mobility device 120 (FIG. 1A).

Figure 11B:
FIG. 11B is a flowchart of a method for determining the weight of the load on the mobility device of the present teachings.

Referring now primarily to FIG. 11B, method 800 for stabilizing mobility device 120 (FIG. 1A) can include, but is not limited to including, estimating 851 the weight and/or change in weight of a load on mobility device 120 (FIG. 1A), choosing 853 a default value or values for the center of gravity of mobility device 120 (FIG. 1A), computing 855 controller gains based at least on the weight and/or change in weight and the center of gravity values, and applying 857 the controller gains to control mobility device 120 (FIG. 1A).

Referring now primarily to FIG. 12A, weight-current processor can measure the weight of the load on mobility device 120 (FIG. 1A). Weight-current processor 758 can include, but is not limited to including, position and function receiver 1551, motor current processor 1552, and torque-weight processor 1553. Position and function receiver 1551 can receive sensor data 767 and mode information 776 to determine possible actions that can be taken with respect to the load. Motor current processor 1552 can process measured electrical current to seat motor drive 25/37 (FIG. 2C/D) when, for example, but not limited to, mobility device 120 (FIG. 1A) is transitioning to enhanced mode 217 (FIG. 3B). Since the motor current is proportional to torque, torque-weight processor 1553 can use the current readings to provide an estimate of the torque required to lift the load in seat 105 (FIG. 1A). In some configurations, for an exemplary motor, mobility device geometry, and height of seat 105 (FIG. 1A), the weight of the load on seat 105 (FIG. 1A) can be computed as follows:

$$SC = a*SH + b,$$

where a can be, for example, but not limited to, $-0.00004483$ and b can be, for example, but not limited to, $1.76705835$ for an exemplary motor.

$$MC\ (corrected) = MC\ (measured) + SC$$

If MC (corrected)>T then weight=$c$*MC (corrected)*MC (corrected)+$d$*MC (corrected)−$e$, where c can be, for example, but not limited to, $0.2565$, d can be, for example, but not limited to, $30.151$, e can be, for example, but not limited to, $55.634$, and T can be, for example, but not limited to, a threshold value $1.75$ for an exemplary motor.

If MC (corrected)<T then weight=0, where SC=seat correction, SH=seat height, and MC=motor current.

Continuing to refer primarily to FIG. 12A, when seat 105 (FIG. 1A) reaches a stable position and when the seat brake is engaged, there is no current going through the motor windings. When the seat brake is released, the current that is required to hold the position of seat 105 (FIG. 1A) can be measured. In some configurations, the weight of the load can be estimated by computing a continuous estimate of the weight based at least on continuous monitoring of the current signal from seat motor 45/47 (FIG. 2C/D). Predicting abrupt changes in weight can be based at least on, for example, but not limited to, accelerometer data, current data from other than seat motor 45/47 (FIG. 2C/D), the current required to slew cluster 121 (FIG. 1B), and wheel acceleration. The specific predictor can be based at least on whether mobility device 120 (FIG. 1A) is stationary or moving.

Figure 12B:
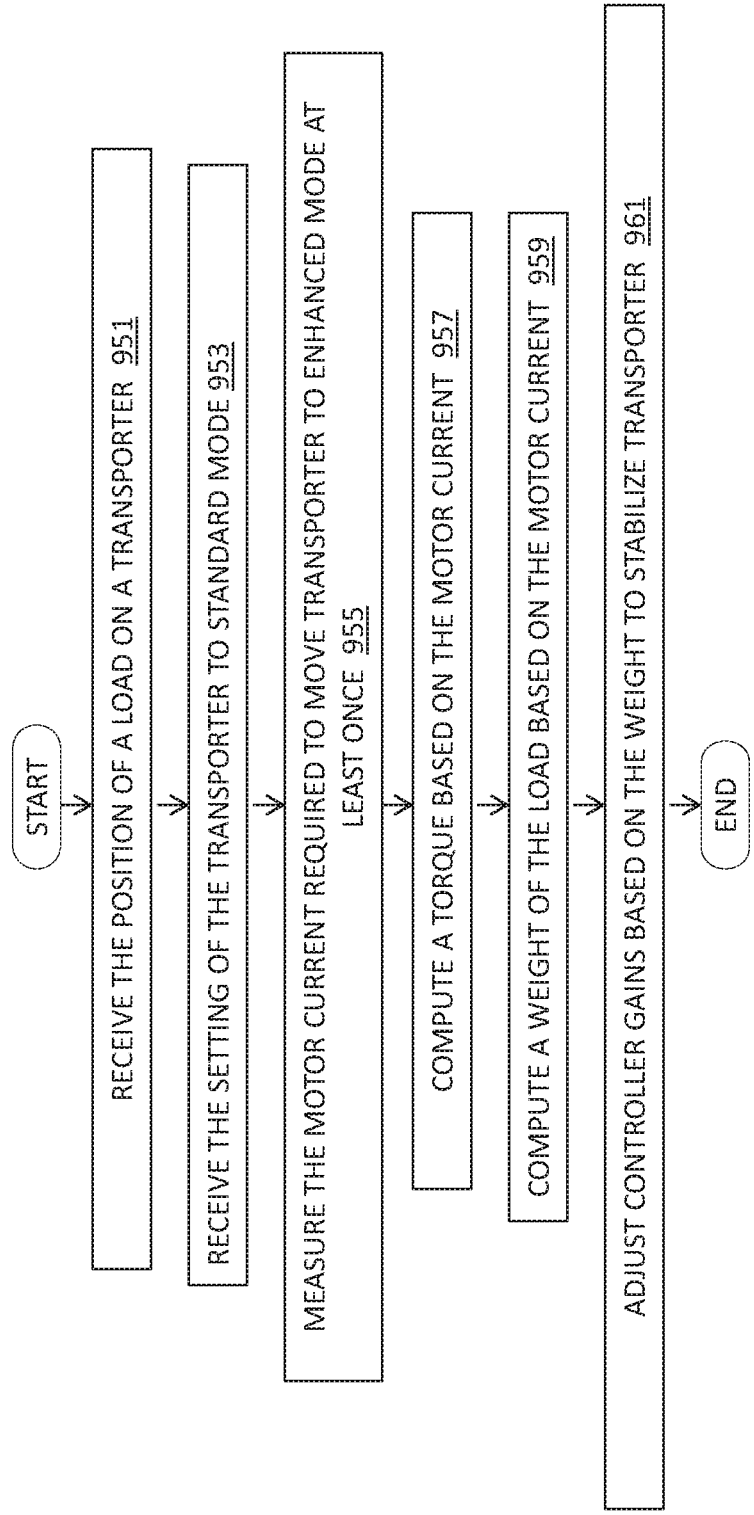
FIG. 12B is a flowchart of a method for determining weight based on motor current data for the mobility device of the present teachings.

Referring now primarily to FIG. 12B, method 900 for computing the weight on mobility device 120 (FIG. 1A) can include, but is not limited to including, receiving 951 the position of a load on mobility device 120 (FIG. 1A), receiving 953 the setting of mobility device 120 (FIG. 1A) to standard mode 201 (FIG. 3B), measuring 955 the motor current required to move mobility device 120 (FIG. 1A) to enhanced mode 217 (FIG. 3B) at least once, computing 957 a torque based at least on the motor current, computing 959 a weight of the load based at least on the torque, and adjusting 961 controller gains based at least on the weight to stabilize mobility device 120 (FIG. 1A).

Referring now primarily to FIG. 13A, traction control processor 762 can adjust the torque applied to wheels 101/102 (FIG. 1A) to minimize slipping. In particular, adjusting the torque can prevent wheels 101/102 (FIG. 1A) from excessive slipping. When the linear acceleration measured by inertial sensor packs 1070/23/29/35 and linear acceleration measured from the wheel velocity disagree by a pre-selected threshold, cluster 121 (FIG. 1B) can drop such that wheels 101/102 (FIG. 1A) and casters 103 (FIG. 1A) are on the ground. Having wheels 101/102 (FIG. 1A) and casters 103 (FIG. 1A) on the ground at once can lengthen the wheelbase of mobility device 120 (FIG. 1A) and can increase the friction coefficient between mobility device 120 (FIG. 1A) and the ground. Linear acceleration processor 1351 can include computer instructions to compute the acceleration of mobility device 120 (FIG. 1A) based at least on the speed of wheels 101/102 (FIG. 1A). IMU acceleration processor 1252 can include computer instructions to compute the IMU acceleration based at least on sensor data 767 from inertial sensor pack 1070/23/29/35. Traction loss processor 1254 can compute the difference between the mobility device acceleration and the IMU acceleration, and compare the difference to a pre-selected threshold. If the threshold is exceeded, wheel/cluster command processor 761 can send cluster commands 771 (FIG. 3E) to cluster 121 (FIG. 1B) to drop such that wheels 101/102 (FIG. 1A) and casters 103 (FIG. 1A) are on the ground. Wheel/cluster command processor 761 can adjust the torque to wheel motor drives 19/21/31/33 by dynamically adjusting drive current limits if traction loss is detected. In some configurations, wheel/cluster command processor 761 can compute torque values for wheels 101 (FIG. 1A) and wheels 102 (FIG. 1A) that can be independent of each other and based at least on the speed of mobility device 120 (FIG. 1A) and the speed of wheels 101/102 (FIG. 1A). In some configurations, traction loss processor 1254 can include computer instructions to dynamically adjust the center of gravity of mobility device 120 (FIG. 1A), for example, but not limited to, backwards and forwards to manage traction for mobility device 120 (FIG. 1A).

Continuing to still further refer to FIG. 13A, in standard mode 201 (FIG. 3B), cluster 121 (FIG. 1B) can be rotated to affect traction so that wheels 101/102 (FIG. 1A) can come in contact with the ground when aggressive and/or quick braking is requested. Aggressive braking can occur when mobility device 120 (FIG. 1A) is traveling forward and receives a reverse command from, for example, user control device 130 (FIG. 1C), that exceeds a pre-selected threshold. In enhanced mode 217 (FIG. 3B), traction control processor 762 can accomplish traction control by (1) detecting the loss of traction by taking the difference between a gyro measured device rotation and differential wheel speed of predicted device rotation, and (2) reducing the torque to wheel motors drives A/B 19/21/31/33 by dynamically reducing the drive current limits when loss of traction is detected.

Figure 13B:
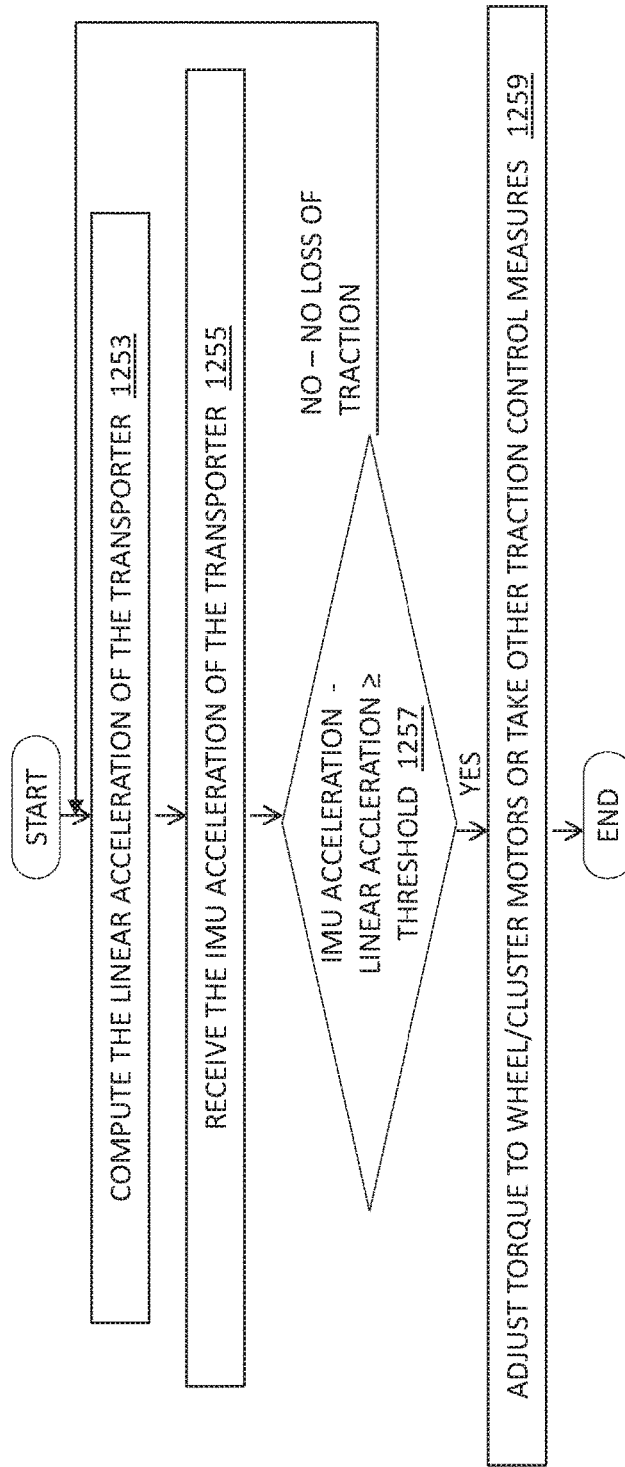
FIG. 13B is a flowchart of the method for traction control of the present teachings.

Referring now primarily to FIG. 13B, method 1250 for controlling traction of mobility device 120 (FIG. 1A) can include, but is not limited to including, computing 1253 the linear acceleration of mobility device 120 (FIG. 1A), and receiving 1255 the IMU measured acceleration of mobility device 120 (FIG. 1A). If 1257 the difference between an expected linear acceleration and a measured linear acceleration of mobility device 120 (FIG. 1A) is greater than or equal to a preselected threshold, adjusting 1259 the torque to cluster/wheel motor drives 19/21/31/33 (FIG. 2C/D). If 1257 the difference between an expected linear acceleration and a measured linear acceleration of mobility device 120 (FIG. 1A) is less than a preselected threshold, method 1250 can continue testing for loss of traction (step 1253).

Continuing to refer to FIG. 14A, tipping of mobility device 120 can be controlled to actively stabilize mobility device 120 and to protect against, for example, a rearward fall. In some configurations, standard mode 201 (FIG. 3B) may not be actively stabilized. If caster wheels 103 are against an obstacle such that forward motion does not occur, a continuous forward command can build up. Excess command in this scenario could lead to a rearward fall. In some configurations, an overall command limit can be placed on the wheel command to prevent excessive wheel command from building up when the wheels are unable to move. In some configurations, if mobility device 120 is tipped rearward more than, for example, between about 5° and 30° from the configuration of mobility device 120 while driving in standard mode 201 (FIG. 3B), tipping control can be activated. Tipping control can be disabled when caster wheels 103 are raised during frame lean adjustments, or when mobility device 120 is transitioning to 4-Wheel mode 217 (FIG. 3B), or when there are faults in an IMU.

Continuing to refer to FIG. 14A, when mobility device 120 is tipped backwards on rear wheels 102, mobility device 120 can drive rear wheels 102 backwards to attempt recovery from a potential rearwards fall. Tipping control can be implemented through ramp functions that can be used to integrate tipping control with wheel control. Wheel speed proportional and integral errors and pitch proportional and derivative errors can be multiplied by the ramp functions (based on pitch error) to change the behavior of mobility device 120 on a rearward pitch angle. Pitch error can be computed relative to a nominal pitch of, for example, but not limited to, −6.0°. Pitch rate can be filtered to smooth erroneous measurements, and can be filtered with, for example, but not limited to, a 0.7 Hz filter. Deadband can be located, negative values can be located, and a negative pitch rate with deadband can result. Position error, the integral of wheel velocity error, can be multiplied by, for example, the fast ramp-down ramp function. Controller gains can be applied as variable functions, for example, that vary between 0 and 1 over the range of the pitched back error. The ramp functions can be used continuously in standard mode 100-1.

Continuing to refer to FIG. 14A, the wheel controller computes commands based on desired wheel velocity from the joystick input while simultaneously responding to rearward pitch values in order to prevent the chair from falling over backwards. A PI loop can be used to compute a command based on the wheel velocity error, and a PD loop may operate on rearward pitch error. The dynamic state of the PT, as characterized by the value of the pitched back error, can be used to determine which of the terms are used to compute the wheel fore/aft command.

Ramp functions can be based on the pitch of the PT. The ramp functions are sliding gains that operate on pitch, pitch rate, and wheel errors. The ramp functions can allow the wheel controller and the anti-tipping controller to interact to maintain stability and controllability of the PT. Tipping control can also be disabled if, for example, but not limited to, inertial sensors on the PT have not been initialized or if the inertial estimator has faulted, and if the PT has tipped over.

Continuing to refer to FIG. 14A, the tipping angle can be found by locating the point where center of gravity 181 lies directly over wheel 102. The rear tipping angle limit can depend on, but is not limited to depending on, the physical configuration of mobility device 120. Active stabilization processor 763 (FIG. 14C) can distinguish, for example, between rearward fall 701 and driving up incline 703 based on sensor data.

Figure 14B:
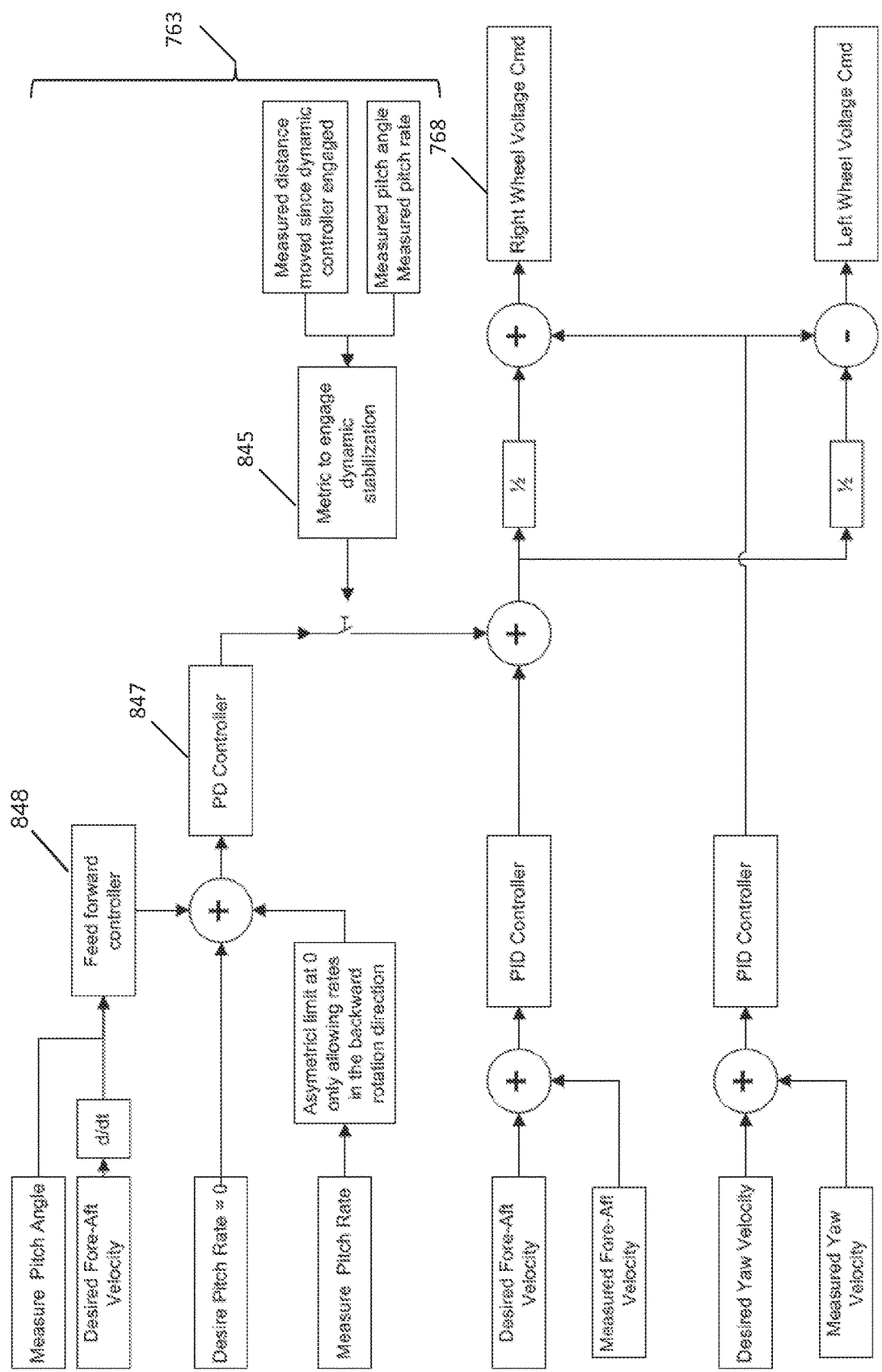
FIG. 14B is a data flow block diagram of a system including the active stabilization processor of the present teachings.

Active stabilization processor 763 can be a closed loop controller that can control the rearwards pitch rate of mobility device 120 (FIG. 14A) by automatically decelerating forward motion and accelerating backward motion when mobility device 120 (FIG. 14A) hits an obstacle while in motion. Dynamic metric 845, that can be based at least on, for example, but not limited to, at least current pitch angle and pitch rate, can control whether to include the pitch rate feedback in wheel voltage commands 768. Dynamic metric 845 can meter the application of active stabilization based at least on the pitch angle and the measured rate at which mobility device 120 (FIG. 14A) is pitching backwards. If center of gravity 181 (FIG. 14A) is at or beyond the rear tipping point, PD controller 847 can augment the fore-aft wheel controller command with a rate controller command to modify voltage command 768. Dynamic metric 845 (FIG. 14B) can capture the wheel position when the pitch rate controller is engaged. If wheels 101 (FIG. 14A) move further back than a specified distance from the captured position, wheel motor drives 19/21/31/33 (FIG. 14C) can disengage the controller to prevent mobility device 120 (FIG. 14A) from running back beyond a pre-selected distance.

Figure 14C:
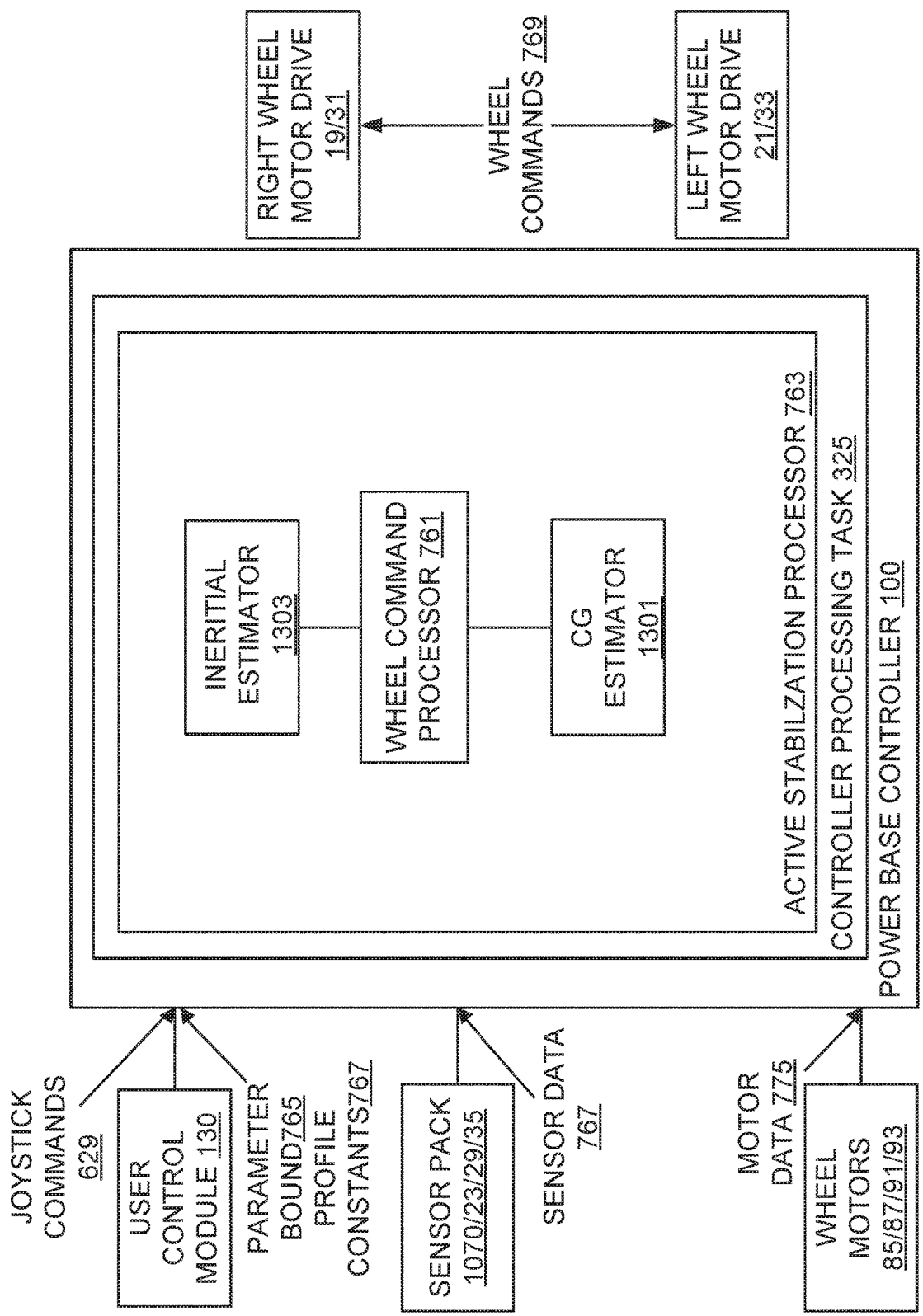
FIG. 14C is a schematic block diagram of the center of gravity fit process of the active stabilization processor of the present teachings.

Referring now to FIG. 14C, active stabilization processor 763 can include, but is not limited to including, center of gravity estimator 1301 including computer instructions to estimate the center of gravity based at least on the mode, and an inertial estimator 1303 to estimate the pitch angle required to maintain balance based at least on the center of gravity estimate. In some configurations, the location of center of gravity 181 can be used to set the frame lean limits. In some configurations, an estimate of the location of center of gravity 181 (FIG. 14A) can be used to, for example, but not limited to, actively stabilize mobility device 120 (FIG. 14A) and regulate transitions between modes. The location of center of gravity 181 (FIG. 14A) can vary with each user and seat setup combination, and is a function of the height of seat 105 (FIG. 14A) and the position of cluster 121 (FIG. 1B). An estimate of center of gravity 181 (FIG. 14A) over a range of seat heights and cluster positions that can occur during normal operation of mobility device 120 (FIG. 14A) can be calculated. Calibration parameters can be calculated that can be used to determine various reference angles. The reference angles can relate the location of center of gravity 181 (FIG. 14A) to the pitch angle of power base 160 (FIG. 14A). The calibration parameters can allow the reference angles to be calculated every control cycle as the seat height and the cluster position change. Estimating center of gravity 181 (FIG. 14A) can provide an estimate of the pitch angle of power base 160 (FIG. 14A) that can be required to balance mobility device 120 (FIG. 14A). The estimation process can include balancing mobility device 120 (FIG. 14A) and its load at various different angles of cluster 121 (FIG. 1B) and various different heights of seat 105 (FIG. 14A), and collecting data at each location including the height of seat 105 (FIG. 14A), the position of cluster 121 (FIG. 1B), and the pitch angle of power base 160 (FIG. 14A) with respect to gravity. These data can be used to error check the result of the estimation process. Power base controller 100 can compute reference variables based at least on the location of center of gravity 181 (FIG. 14A), for example, but not limited to, (1) the angle of power base 160 (FIG. 1C) that places center of gravity 181 (FIG. 14A) over the axis of cluster 121 (FIG. 1B), a function of the height of seat 105 (FIG. 14A), used in enhanced mode (FIG. 3B), stair mode (FIG. 3B), and standard mode (FIG. 3B); (2) the angle of power base 160 (FIG. 14A) that can place center of gravity 181 (FIG. 14A) over one set of wheels 101 (FIG. 14A), a function of the height of seat 105 (FIG. 14A) and the position of cluster 121 (FIG. 1B), used in balance mode (FIG. 3B); and (3) the distance from cluster pivot 121A (FIG. 1B) to an estimated center of gravity, a function of the height of seat 105 (FIG. 14A), used in standard mode (FIG. 3B) and stair mode (FIG. 3B). These values can allow the controllers to maintain active balance.

Figure 14D:
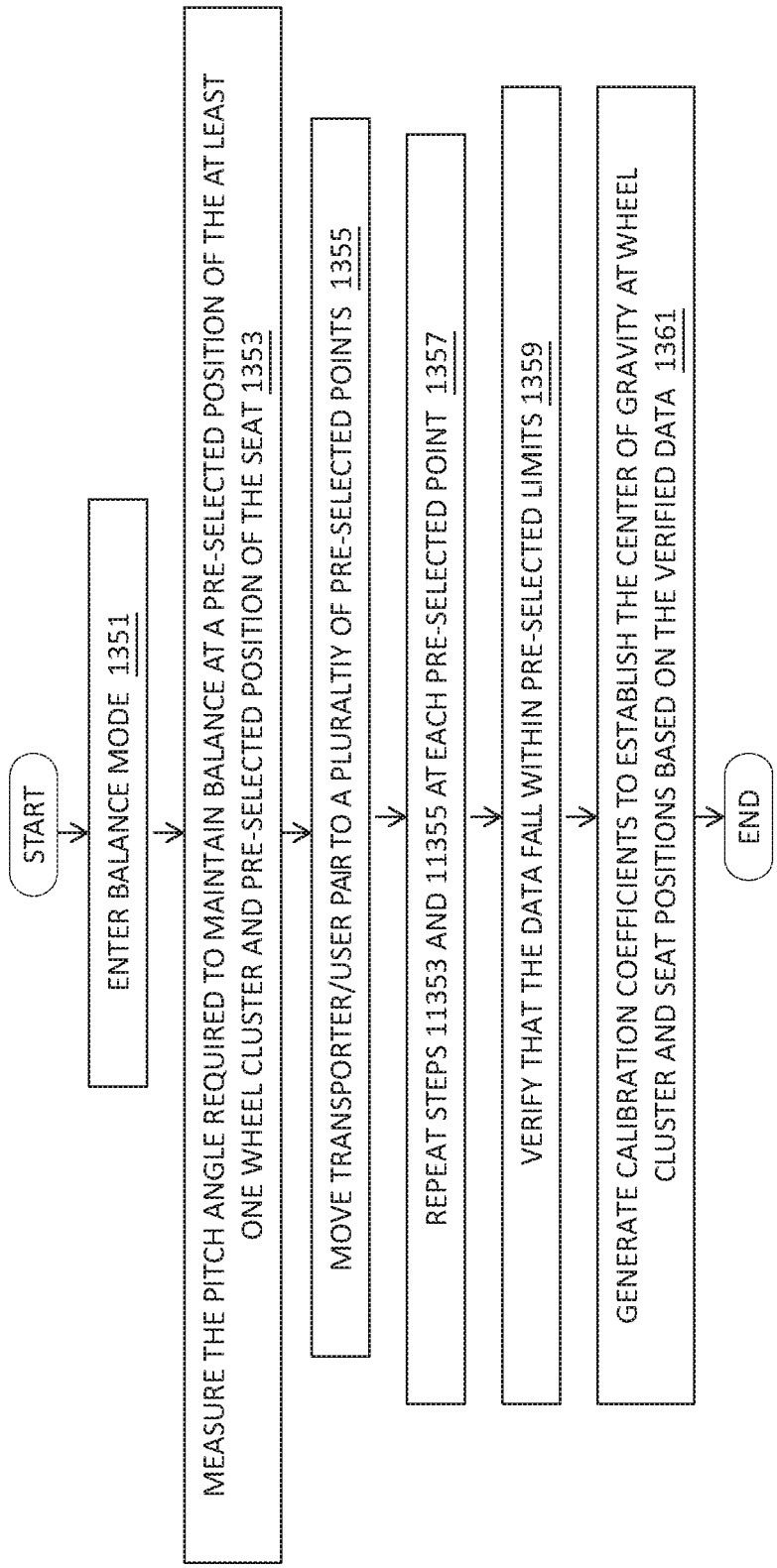
FIG. 14D is a flowchart of a method for active stabilization of the mobility device of the present teachings.

Referring now to FIG. 14D, method 1350 for computing center of gravity fit (CG fit) can include, but is not limited to including, (1) entering the balancing mode, (2) measuring data including a pitch angle required to maintain the balancing at a pre-selected position of the at least one wheel cluster and a pre-selected position of the seat, (3) moving the mobility device/user pair to a plurality of pre-selected points, (4) collecting calibration data at each of the plurality of pre-selected points, (5) repeating step (2) at each of the plurality of pre-selected points, (6) verifying that the measured data fall within pre-selected limits, and (7) generating a set of calibration coefficients to establishing the center of gravity at any usable cluster and seat position during machine operation based on the verified measured data. Method 1350 can optionally include storing the coefficients into, for example, but not limited to, non-volatile memory for use during operation of mobility device 120 (FIG. 14A).

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software for accomplishing the methods discussed herein, and computer readable media storing software for accomplishing these methods. The various modules described herein can be accomplished on the same CPU, or can be accomplished on different CPUs.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for reducing braking distance of a mobility device, the mobility device having caster wheels and drive wheels, the drive wheels having wheel motors, each pair of the drive wheels being coupled by a cluster, each of the clusters having a cluster motor, the method comprising:
   computing an expected linear acceleration of the mobility device based on a difference between speeds of the drive wheels;
   receiving, from at least one inertial measurement unit (IMU) associated with the mobility device, a measured linear acceleration of the mobility device;
   if the difference between the expected linear acceleration and the measured linear acceleration exceeds a pre-selected threshold, sending commands to the cluster motor to lower the drive wheels to a surface, the caster wheels lowering with the drive wheels; and
   dynamically adjusting drive current limits of the wheel motors and each of the cluster motors based at least on the difference.

2. The method as in claim 1 further comprising:
   adjusting a center of gravity of the mobility device based at least on the difference.

3. The method as in claim 1 further comprising:
   receiving desired actions for the mobility device;
   receiving sensor data from at least one sensor, and motor data from at least one motor, the at least one motor associated with the wheel motors;
   filtering data from the at least one IMU, the at least one IMU including a rate sensor and an accelerometer, the filtering including
      (a) receiving and filtering a gravity vector of the mobility device from the accelerometer, the filtering based at least on a gravity rate,
      (b) receiving and filtering a body rate vector of the mobility device from the rate sensor, the filtering based at least on a gravity rate error and a projected body rate error,
      (c) receiving a differential wheel speed representing the difference;

(d) estimating a projected gravity rate based at least on the filtered gravity vector and the filtered body rate vector;
(e) computing the projected body rate error based at least on the projected gravity rate and the differential wheel speed;
(f) computing a pitch and a roll based at least on the filtered body rate vector and the filtered gravity vector; and
(g) repeating steps (a)-(f) using the computed projected body rate error;
computing at least one value based at least on the desired actions, sensor data, the motor data, the pitch, and the roll; and
applying the at least one value to at least one of the drive wheels to control the mobility device.

4. The method as in claim 3 further comprising:
resolving which of the at least one value to use to control the mobility device.

5. The method as in claim 3 further comprising:
automatically modifying the at least one value depending on obstacles encountered in a path of the mobility device.

6. The method as in claim 3 further comprising:
computing the at least one value based at least on parameters adjusted according to at least one user preference.

7. The method as in claim 3 further comprising:
automatically adjusting the at least one value based at least on a comparison between inertial and linear accelerations of the mobility device.

8. The method as in claim 3 further comprising:
automatically estimating a weight of a load on the mobility device;
determining a center of gravity for the mobility device and the load;
computing gains based at least on the load and the center of gravity; and
computing the at least one value based at least on the gains.

9. The method as in claim 3 further comprising:
automatically computing at least one value to decelerate forward motion of the mobility device and accelerate backward motion of the mobility device when the mobility device encounters an obstacle; and
controlling a rearwards pitch rate of the mobility device.

10. The method as in claim 3 further comprising:
(1) positioning a load on the mobility device;
(2) moving the mobility device/load into a balance mode, the balance mode characterized by elevating the mobility device/load above a standard seated position;
(3) measuring data including a pitch angle required to maintain the balance mode at a pre-selected position of at least one wheel cluster operably coupled with the mobility device and a pre-selected position of a seat operably coupled with the mobility device;
(4) moving the mobility device/load to a plurality of pre-selected points;
(5) repeating step (3) at each of the plurality of pre-selected points;
(6) verifying that the measured data fall within pre-selected limits; and
(7) generating a set of calibration coefficients to establish a center of gravity at a plurality of positions encountered during operation of the mobility device, the set of calibration coefficients based on the verified measured data.

11. The method as in claim 10 further comprising:
storing the verified measured data in non-volatile memory.

12. A traction control processor for reducing braking distance of a mobility device having an inertial measurement unit (IMU), the mobility device having caster wheels and drive wheels, the drive wheels having wheel motors, each pair of the drive wheels being coupled by a cluster, the cluster having a cluster motor, the traction control processor comprising:
a linear acceleration processor computing a mobility device acceleration of the mobility device based at least on a speed of the drive wheels;
an IMU acceleration processor computing an IMU acceleration based at least on sensor data from the IMU;
a traction loss processor computing a difference between the mobility device acceleration and the IMU acceleration, the traction loss processor comparing the difference to a pre-selected threshold;
a wheel/cluster command processor sending cluster commands to the cluster motor to drop such that the drive wheels and the caster wheels drop to a surface if the pre-selected threshold is exceeded, the wheel/cluster command processor adjusting torque to the wheel motors by dynamically adjusting drive current limits if the pre-selected threshold is exceeded.

13. The traction control processor as in claim 12 wherein the traction loss processor comprises:
dynamically adjusting a center of gravity of the mobility device backwards and forwards to manage the difference.

14. The traction control processor as in claim 12 further comprising:
at least one user control device receiving desired actions for the mobility device;
at least one power base controller operably coupled with the at least one user control device and the at least one IMU, the at least one power base controller receiving the desired actions from the at least one user control device, the at least one power base controller including at least two processors, the at least two processors each including at least one controller processing task, the at least one controller processing task receiving sensor data and motor data associated with sensors, the drive wheels, and the wheel motors operably coupled with the mobility device.

15. The traction control processor as in claim 14 where in the IMU acceleration processor comprises:
executing instructions including:
producing an inertial estimate, the inertial estimate based at least on
filtering data from the at least one IMU, the at least one IMU including a rate sensor and an accelerometer, the filtering including:
(a) receiving and filtering a gravity vector of the mobility device from the accelerometer, the filtering based at least on a gravity rate,
(b) receiving and filtering a body rate vector of the mobility device from the rate sensor, the filtering based at least on a gravity rate error and a projected body rate error,
(c) receiving a differential wheel speed representing the difference;
(d) estimating a projected gravity rate based at least on the filtered gravity vector and the filtered body rate vector;

(e) computing the projected body rate error based at least on the projected gravity rate and the differential wheel speed;

(f) computing a pitch and a roll based at least on the filtered body rate vector and the filtered gravity vector; and (g) repeating steps (a)-(f) using the computed projected body rate error;

the inertial estimate used to compute the pitch and the roll of the mobility device, wherein the at least two processors computing at least one value based at least on the desired actions, the sensor data, the motor data, the pitch and the roll of the mobility device, the at least one value being provided to the drive wheels to control the motion of the mobility device.

16. The mobility device as in claim 15 wherein the at least one controller processing task comprises:

at least one voting/commit processor resolving which of the at least one value to use to compute a wheel command.

17. The mobility device as in claim 14 wherein the at least one controller processing task comprises:

at least one adaptive speed control processor computing at least one wheel command based at least on the sensor data, the at least one wheel command being automatically modified depending on obstacles encountered in a path of the mobility device.

18. The mobility device as in claim 14 wherein the at least one controller processing task comprises:

at least one speed processor computing at least one wheel command based at least on parameters adjusted according to at least one user preference.

19. The mobility device as in claim 14 wherein the at least one controller processing task comprises:

at least one weight processor automatically estimating a load on the mobility device, determining a center of gravity for the mobility device and the load, computing gains based at least on the load and the center of gravity, and computing at least one wheel command based at least on the gains.

20. The mobility device as in claim 14 wherein the at least one controller processing task comprises:

an active stabilization processor automatically computing at least one wheel command to decelerate forward motion and accelerate backward motion when the mobility device encounters an obstacle, the active stabilization processor controlling a rearwards pitch rate of the mobility device.

21. The mobility device as in claim 14 wherein the at least one controller processing task comprises:

a center of gravity fit generating calibration coefficients establishing a center of gravity of the mobility device based on a pitch angle of the mobility device required to maintain balance, the pitch angle measured when the mobility device is in pre-selected positions.

\* \* \* \* \*